United States Patent [19]
Ohtake

[11] Patent Number: 5,999,329
[45] Date of Patent: Dec. 7, 1999

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 08/980,011

[22] Filed: Nov. 26, 1997

Related U.S. Application Data

[63] Continuation-in-part of application No. 08/729,911, Oct. 15, 1996, abandoned.

[30] Foreign Application Priority Data

Dec. 26, 1995 [JP] Japan ..................................... 7-338523
Aug. 1, 1996 [JP] Japan ..................................... 8-219485

[51] Int. Cl.$^6$ .................................................. G02B 15/14
[52] U.S. Cl. ............................................................ 359/686
[58] Field of Search .................................... 359/676, 686, 359/683

[56] References Cited

U.S. PATENT DOCUMENTS 4,054,371 10/1977 Yasukuni ................................. 359/686
5,173,806 12/1992 Ogata ..................................... 359/683
5,416,639 5/1995 Yamanashi .............................. 359/683
5,631,775 5/1997 Shibata ................................... 359/683

Primary Examiner—Scott J. Sugarman
Attorney, Agent, or Firm—Vorys, Sater, Seymour and Pease LLP

[57] ABSTRACT

A variable focal length optical system is constituted by, in succession from an object side, a first lens unit G1 having a negative refractive power, a second lens unit G2 having a positive refractive power, a third lens unit G3 having a negative refractive power, and a fourth lens unit G4 having a positive refractive power. When the focal length of the entire lens system is changed while maintaining a constant image plane position, the second lens unit G2 moves in the optical axis direction, the third lens unit G3 moves in the optical axis direction to compensate for variations in image plane position upon movement of the second lens unit G2, and the first lens unit G1 and the fourth lens unit G4 are fixed in position in the optical axis direction. An aperture stop is disposed at a position on the object side of a position closest to the image side of the third lens unit G3, or each of the first to fourth lens units G1 to G4 is constituted by two or less lens elements.

24 Claims, 57 Drawing Sheets

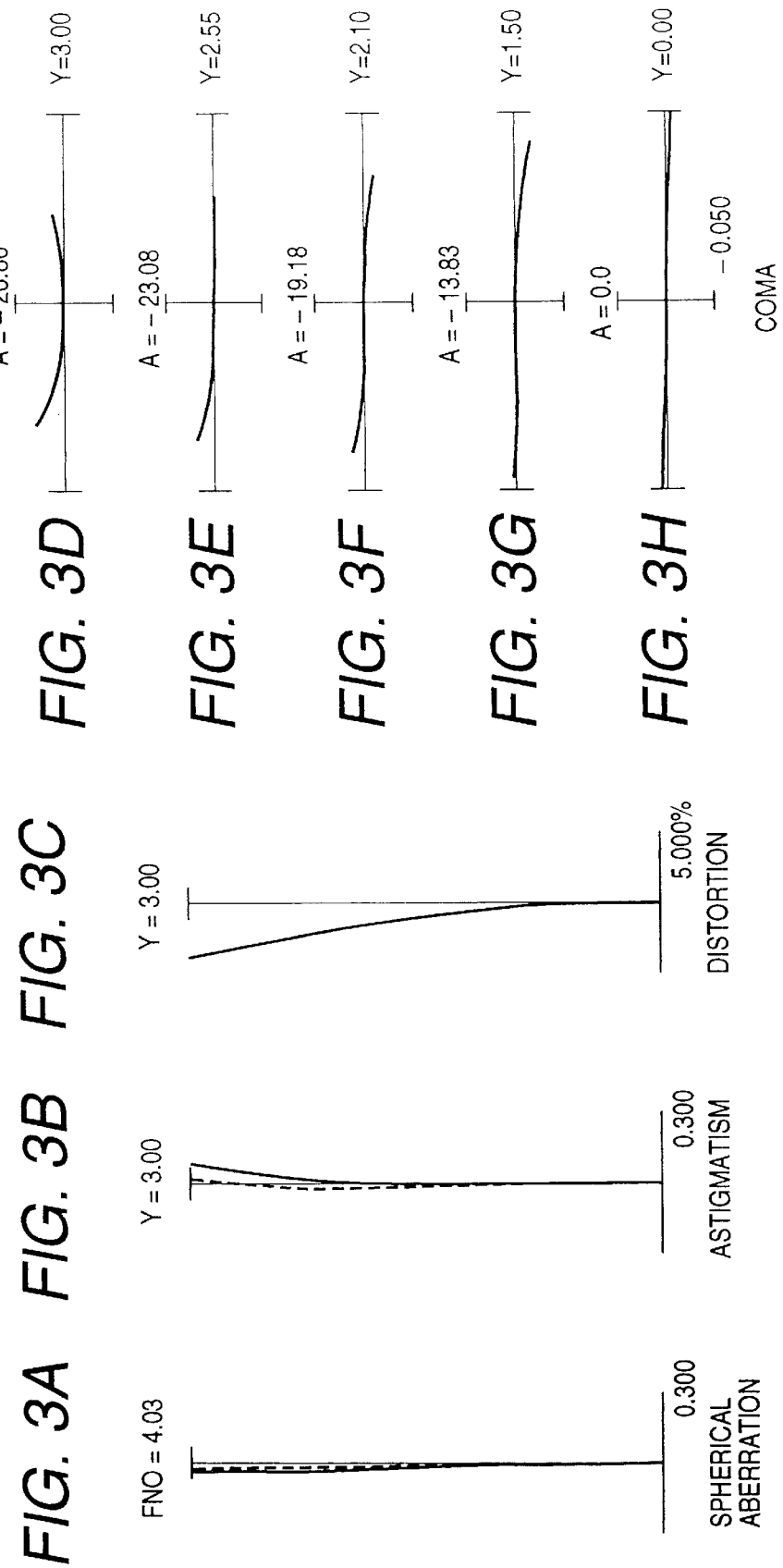

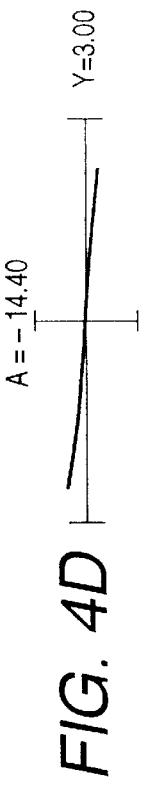

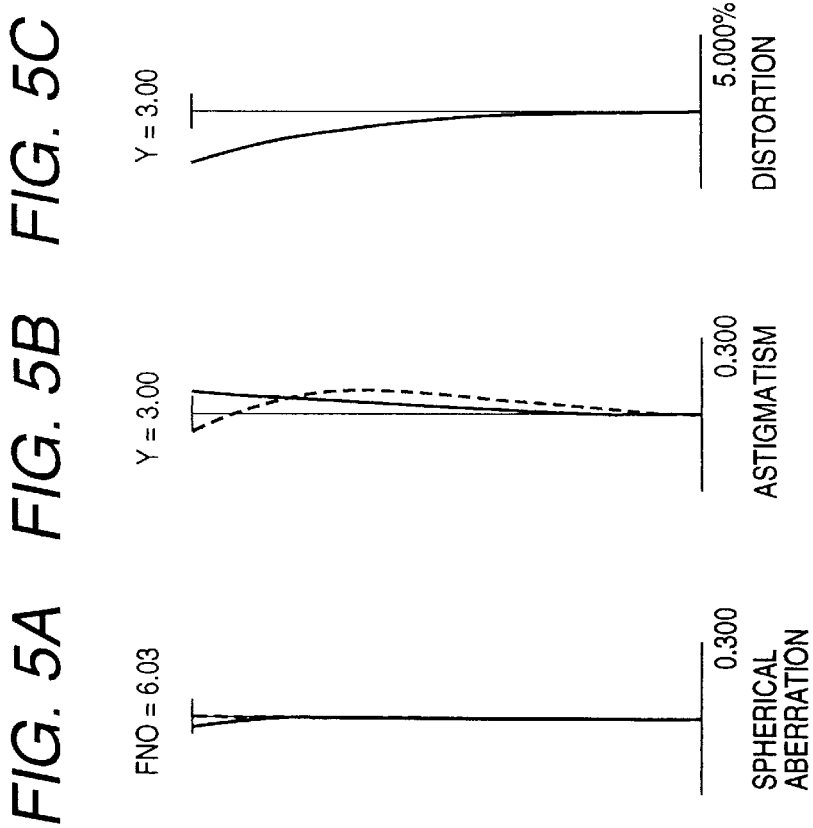

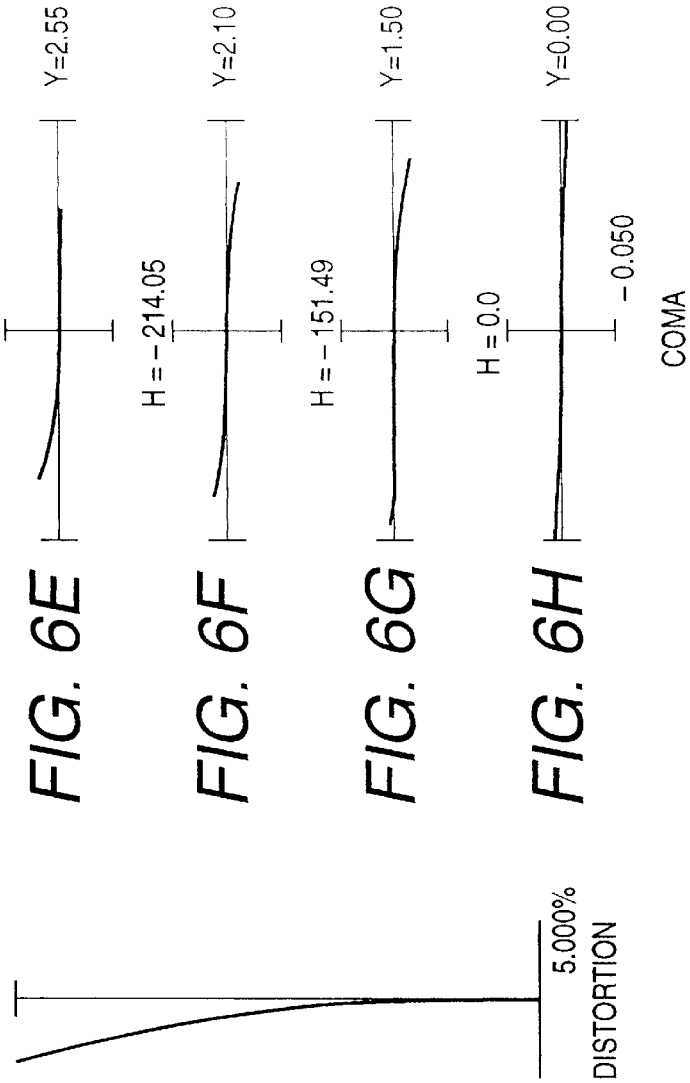

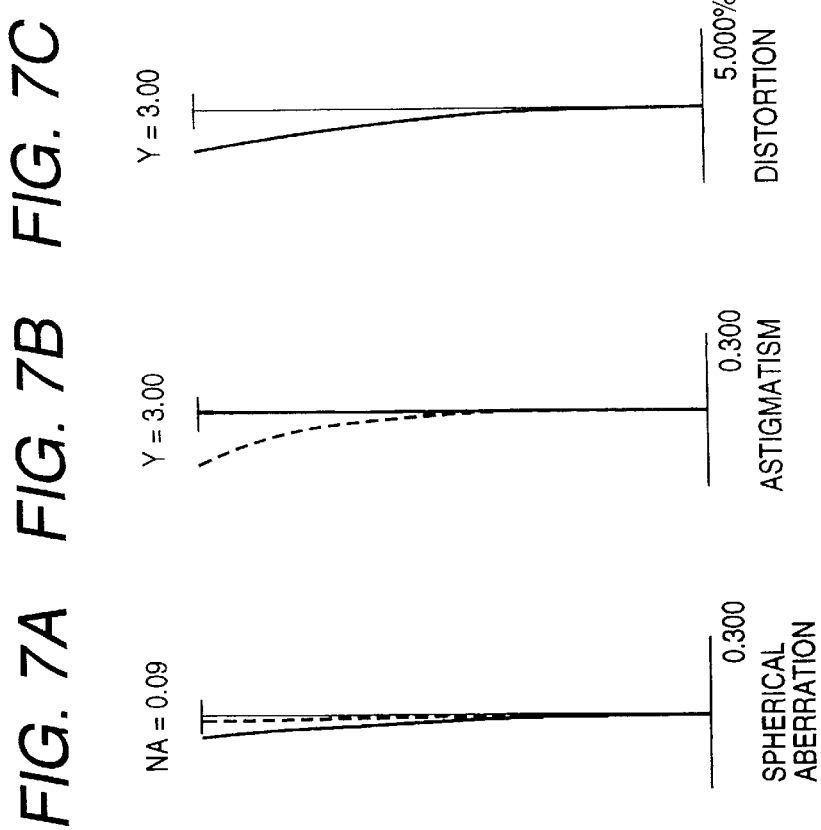

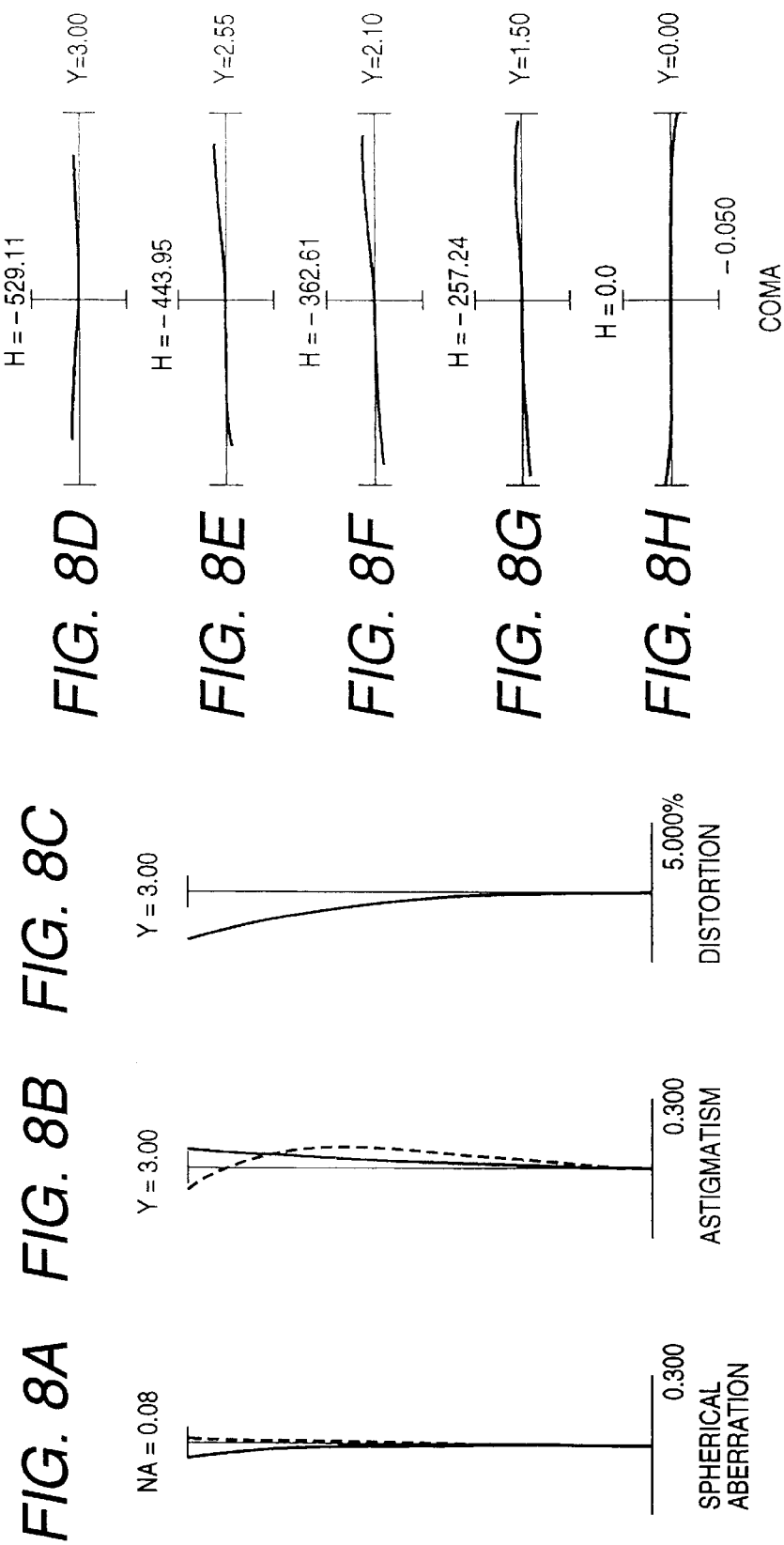

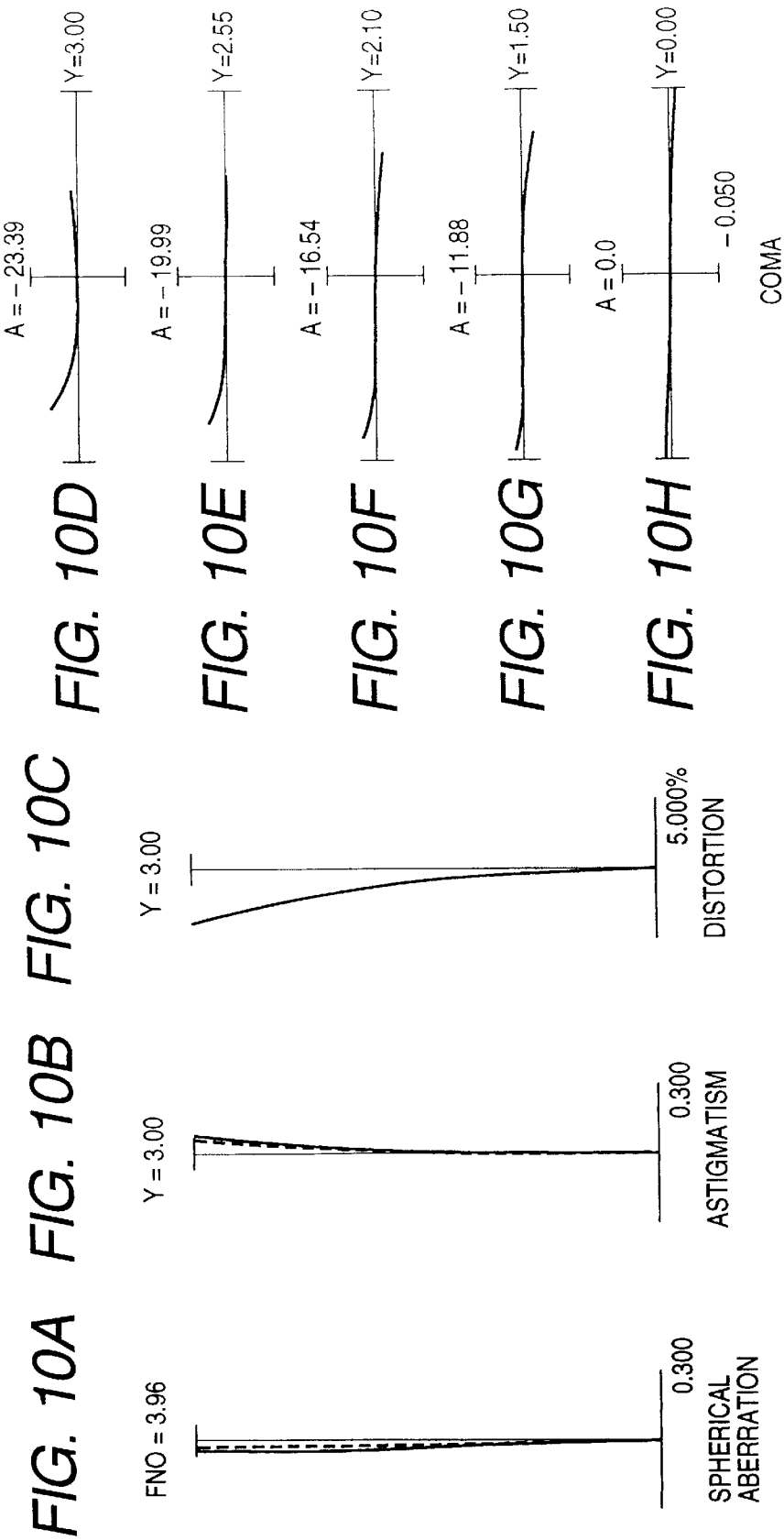

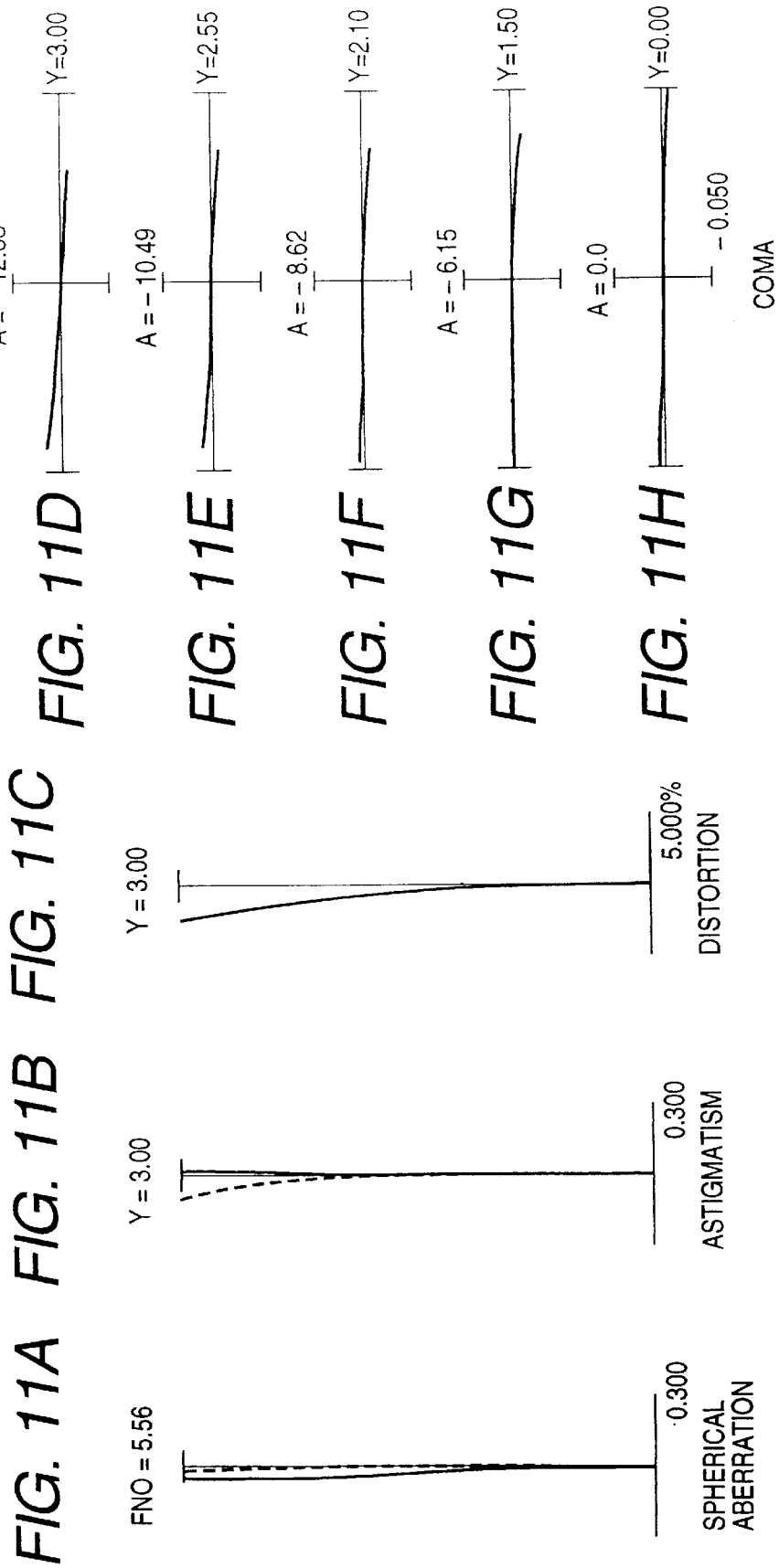

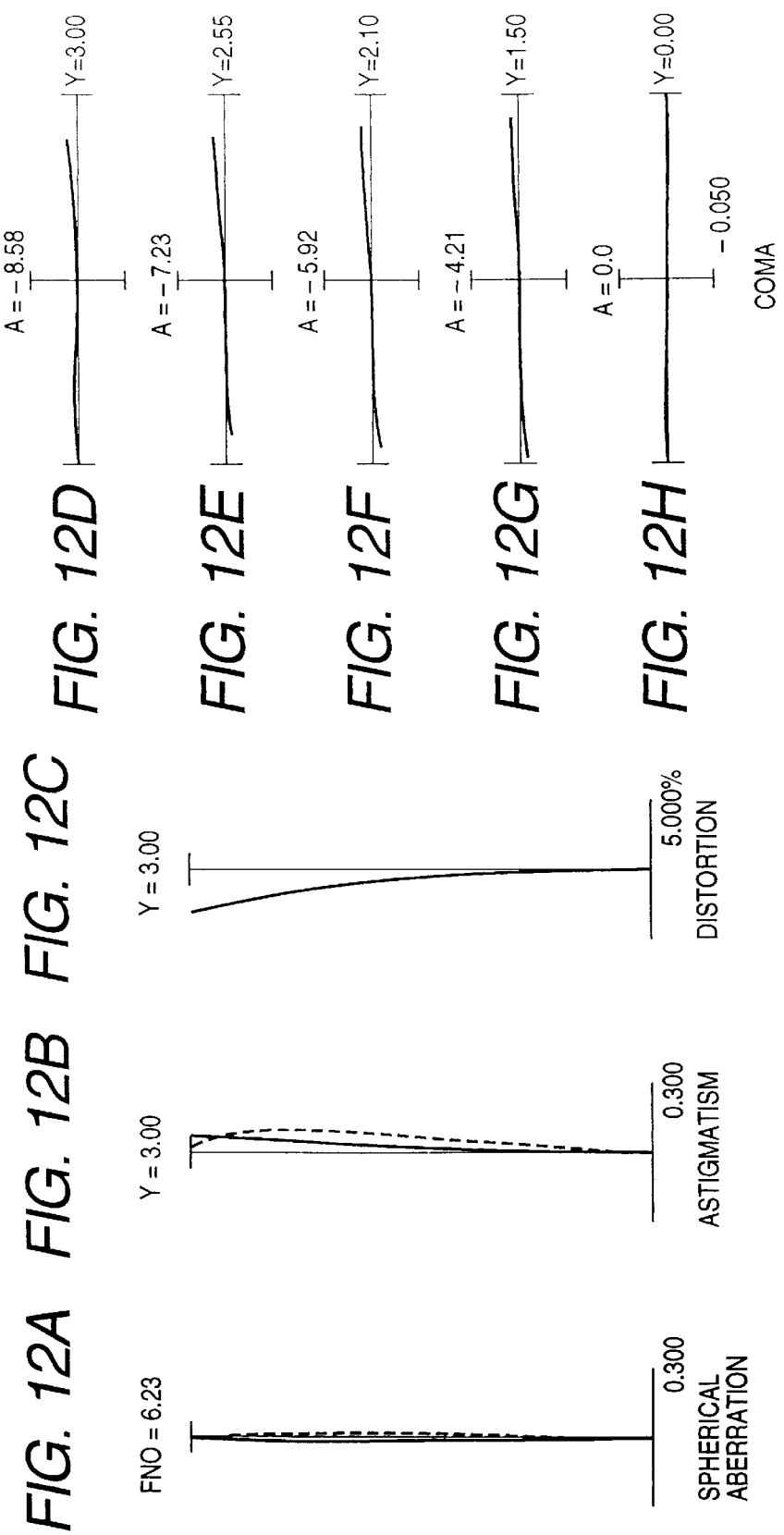

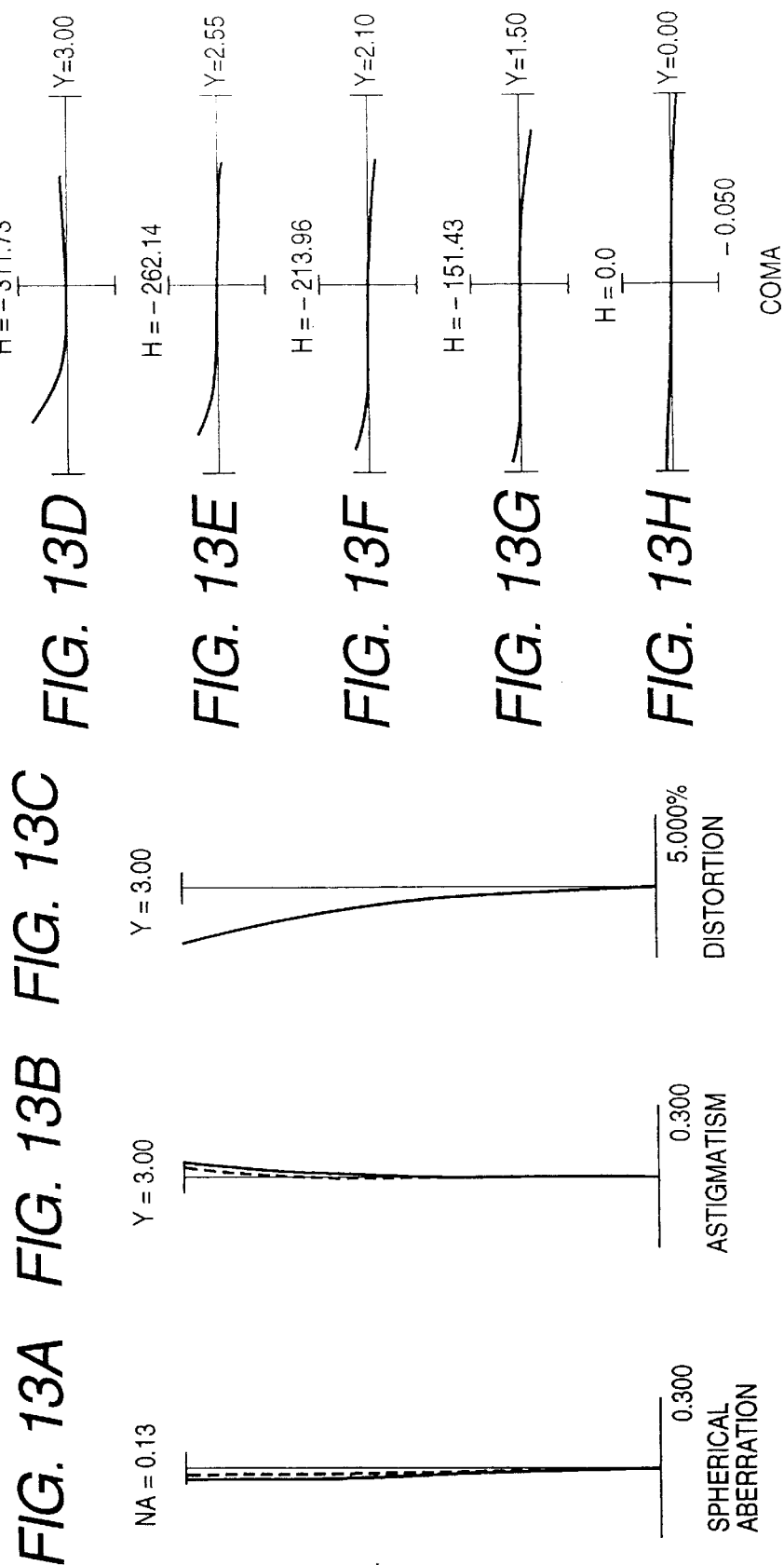

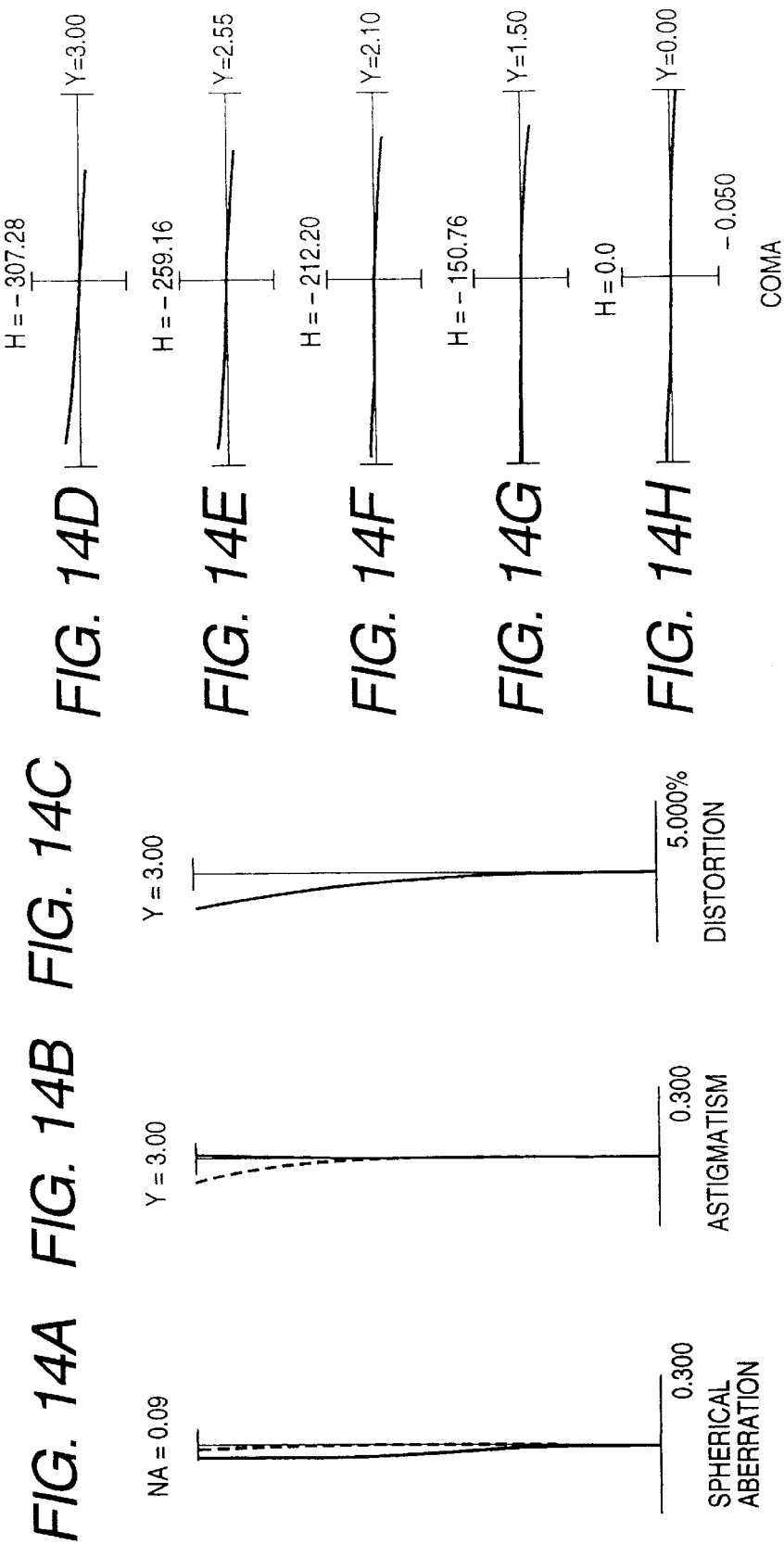

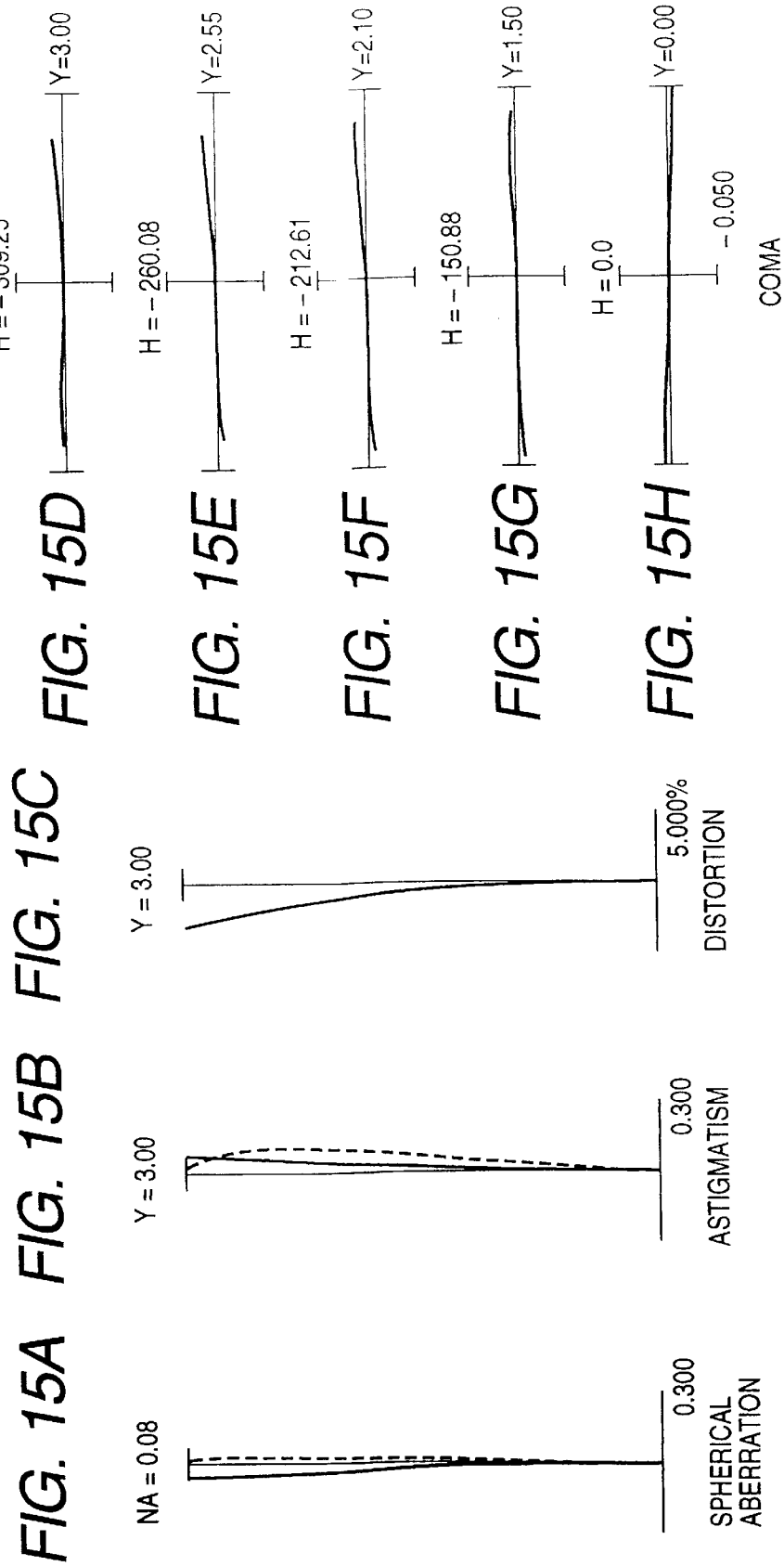

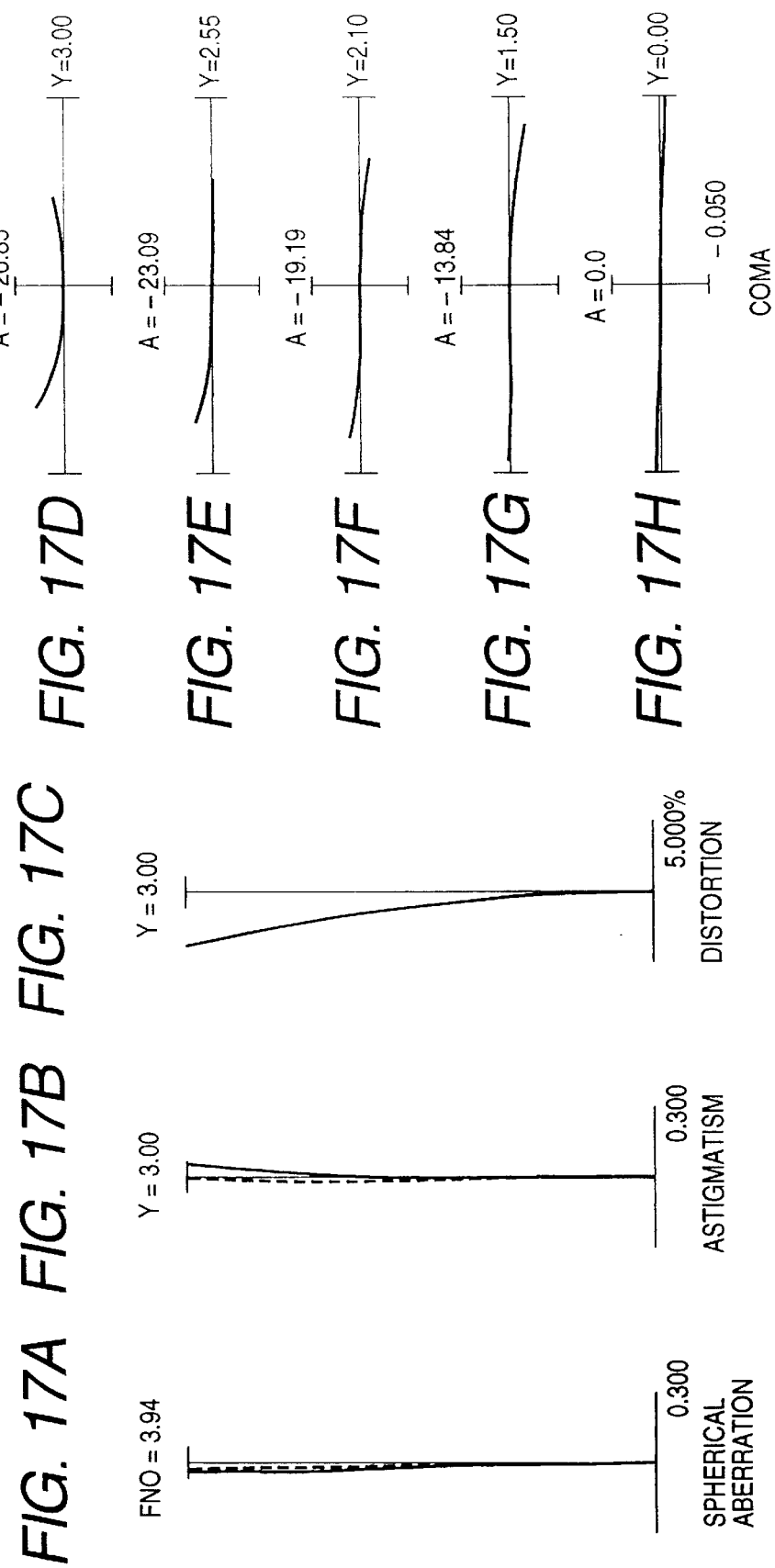

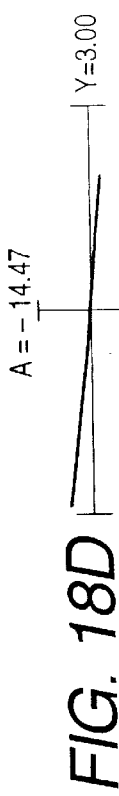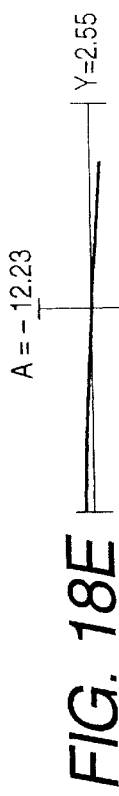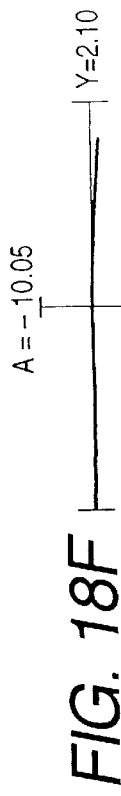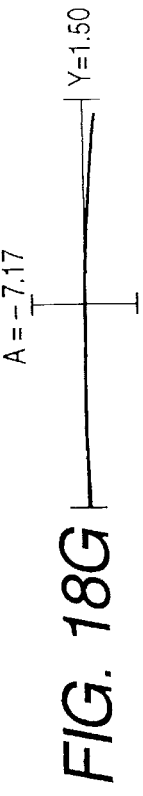
FIG. 18A  FIG. 18B  FIG. 18C  FIG. 18D  FIG. 18E  FIG. 18F  FIG. 18G  FIG. 18H

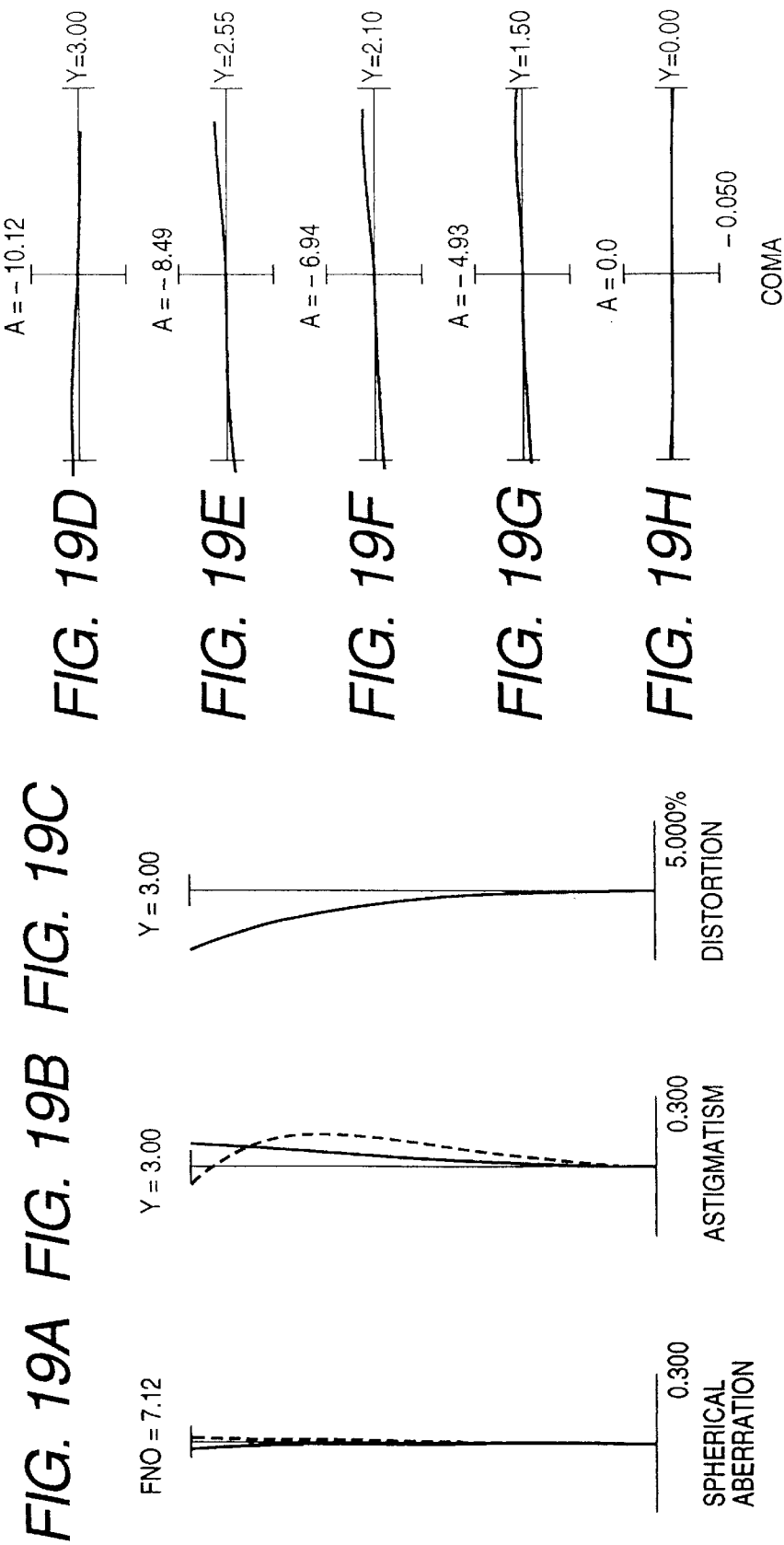

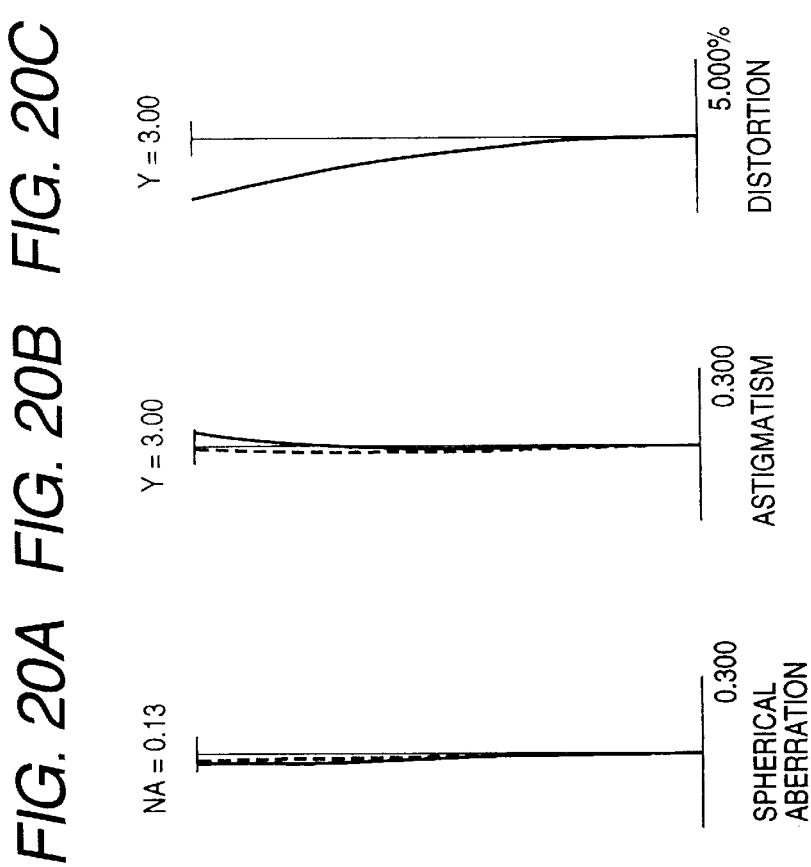

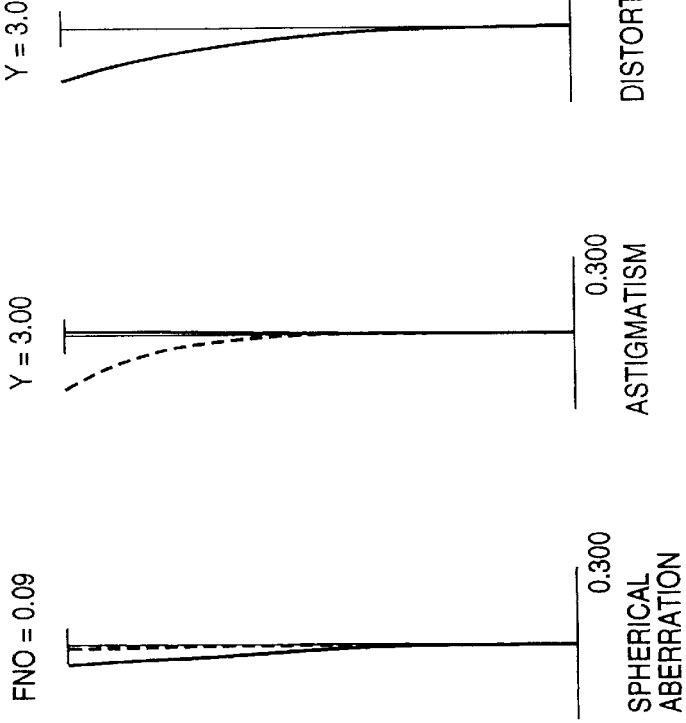

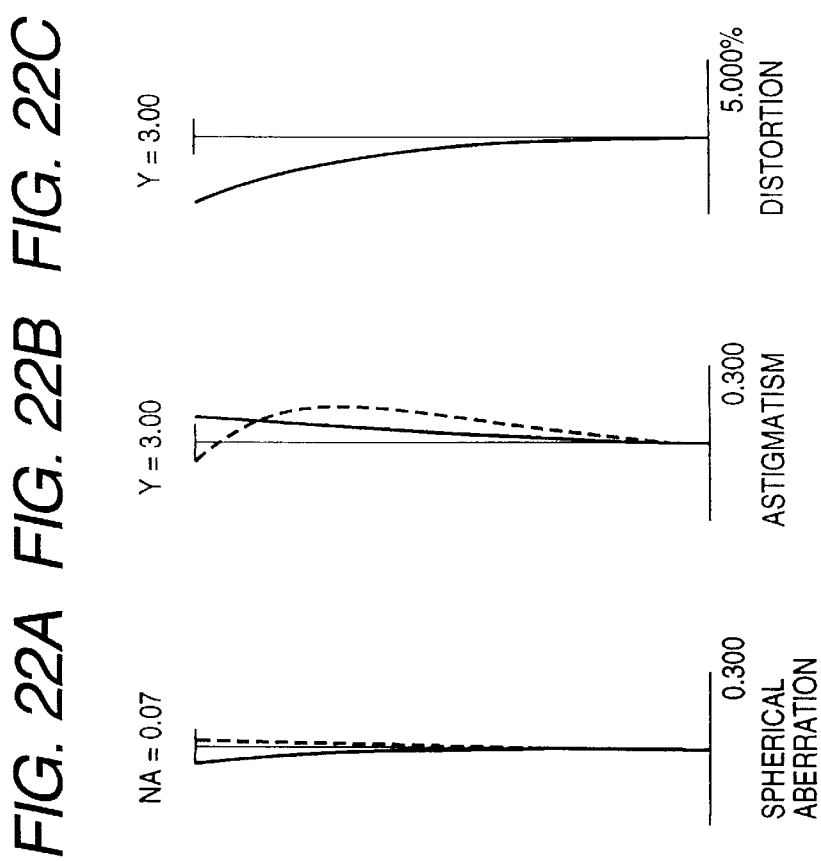

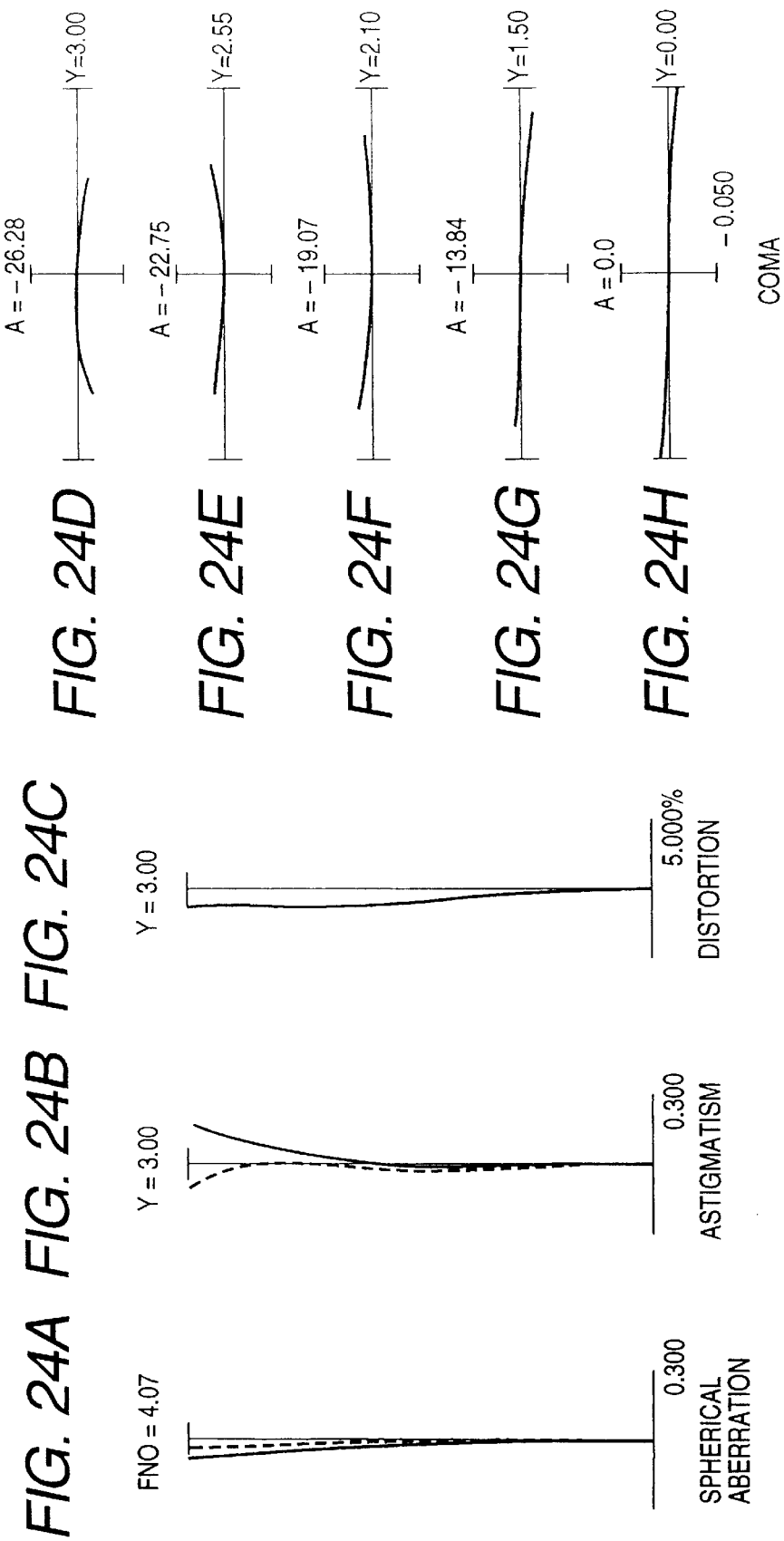

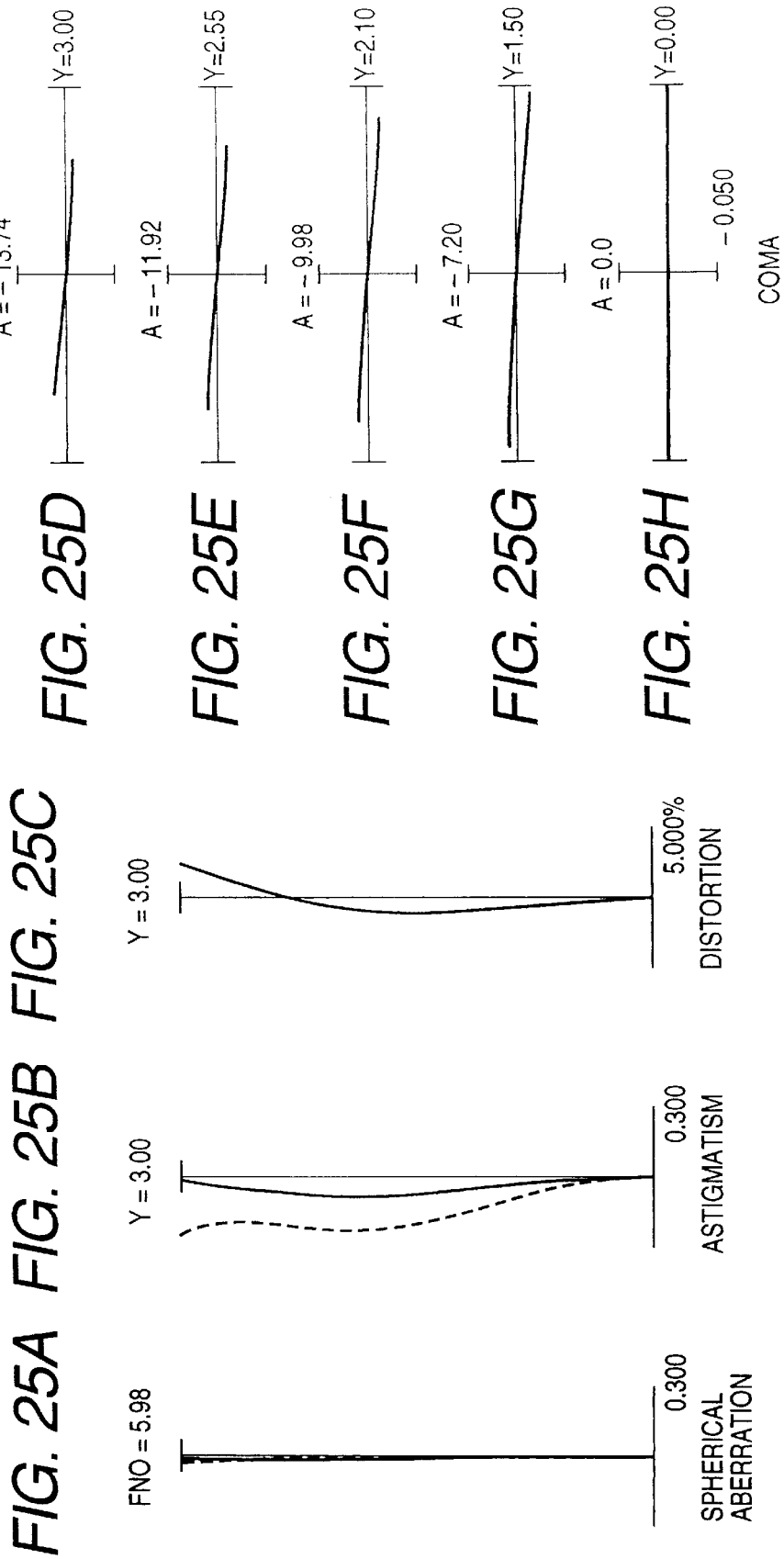

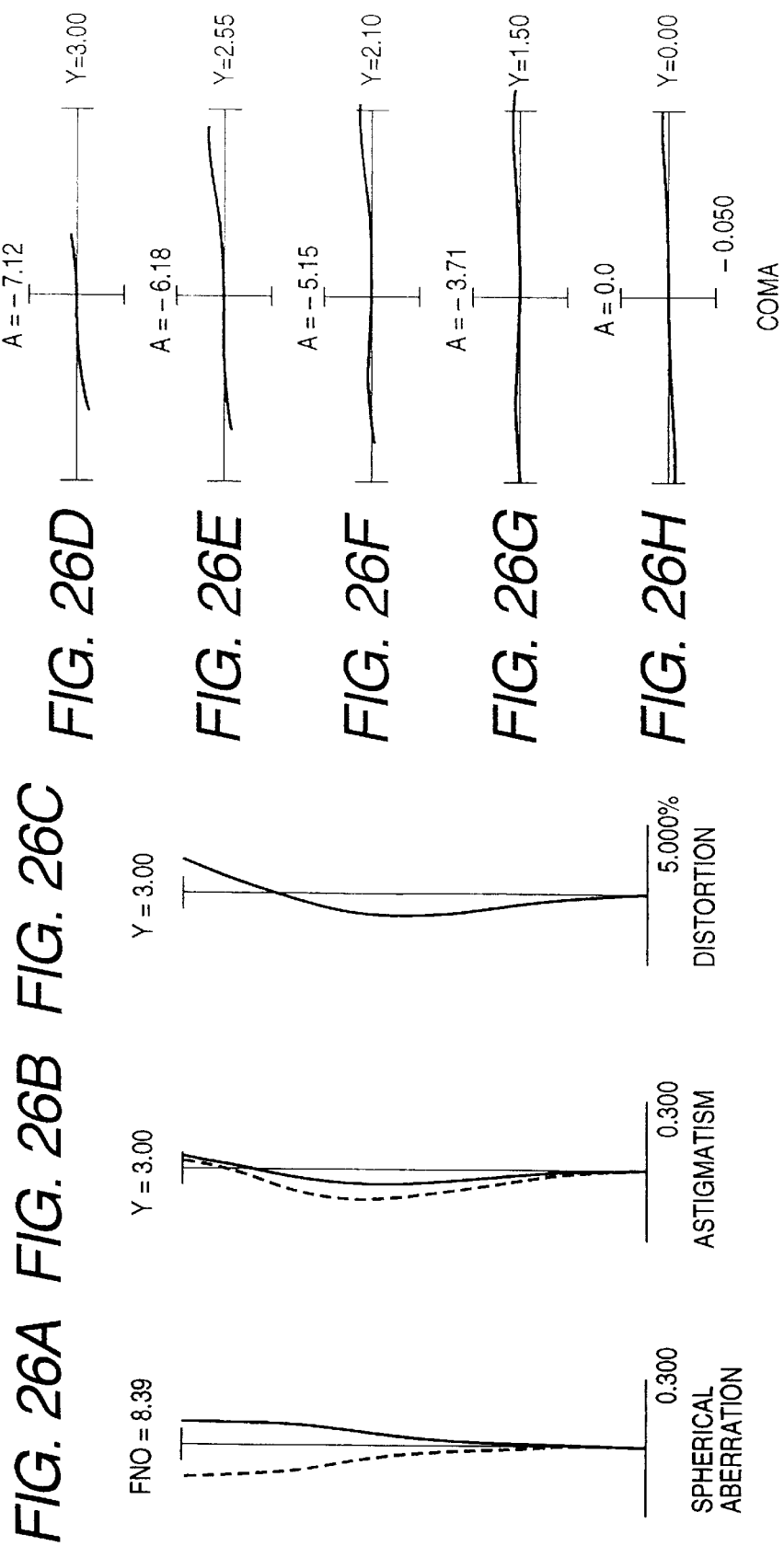

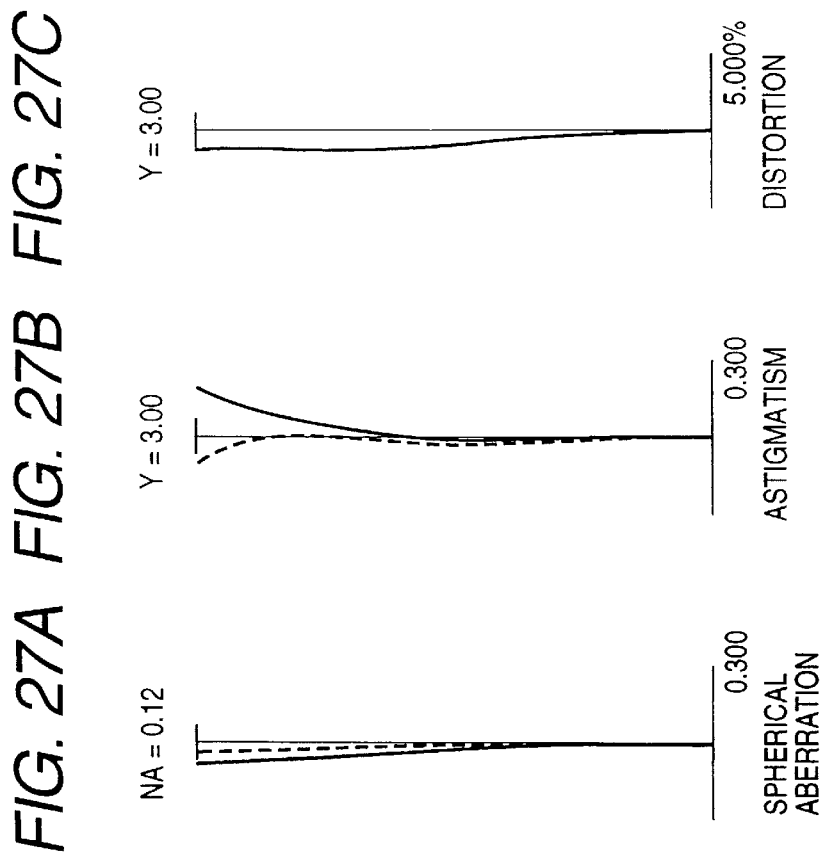

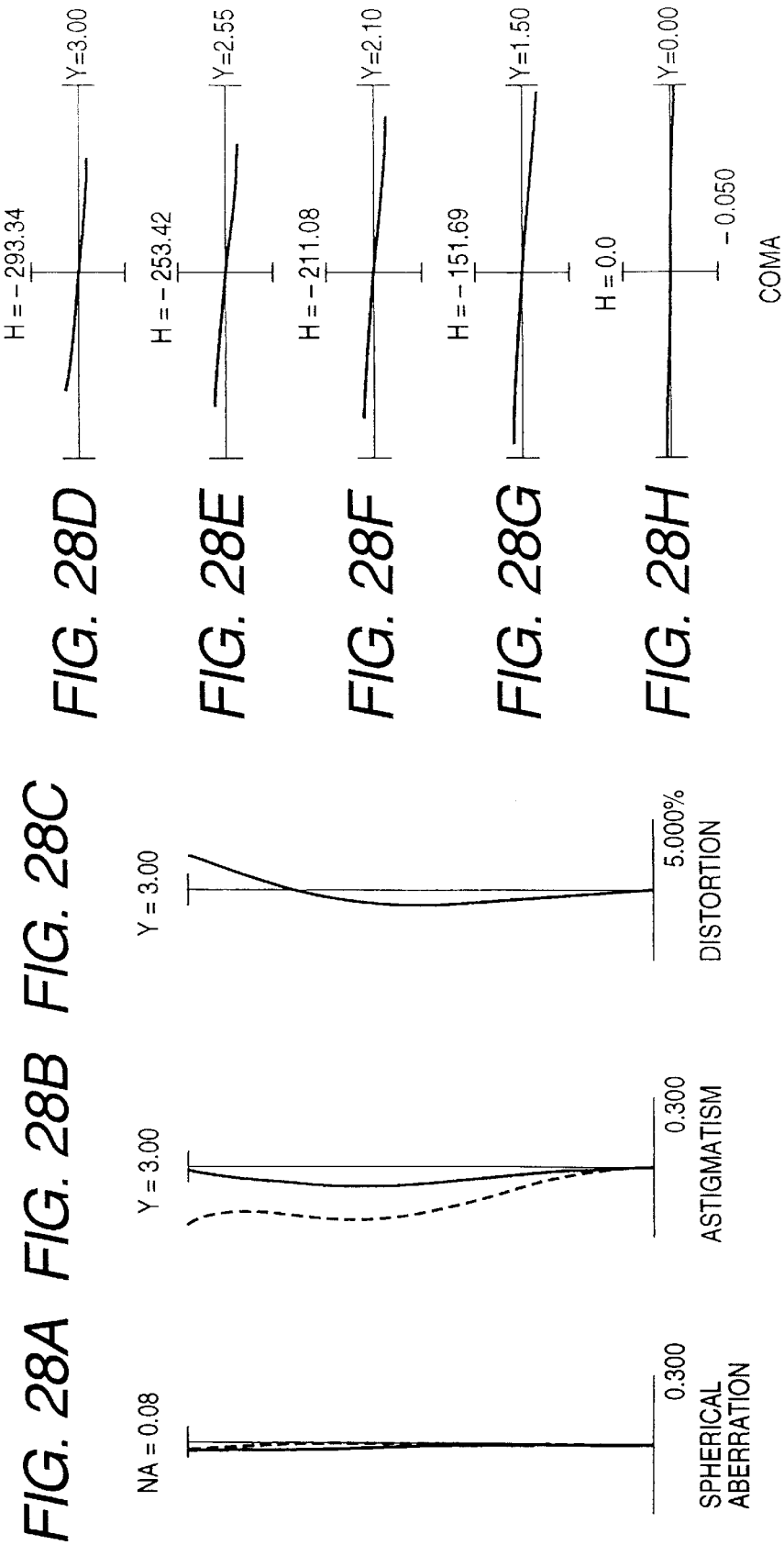

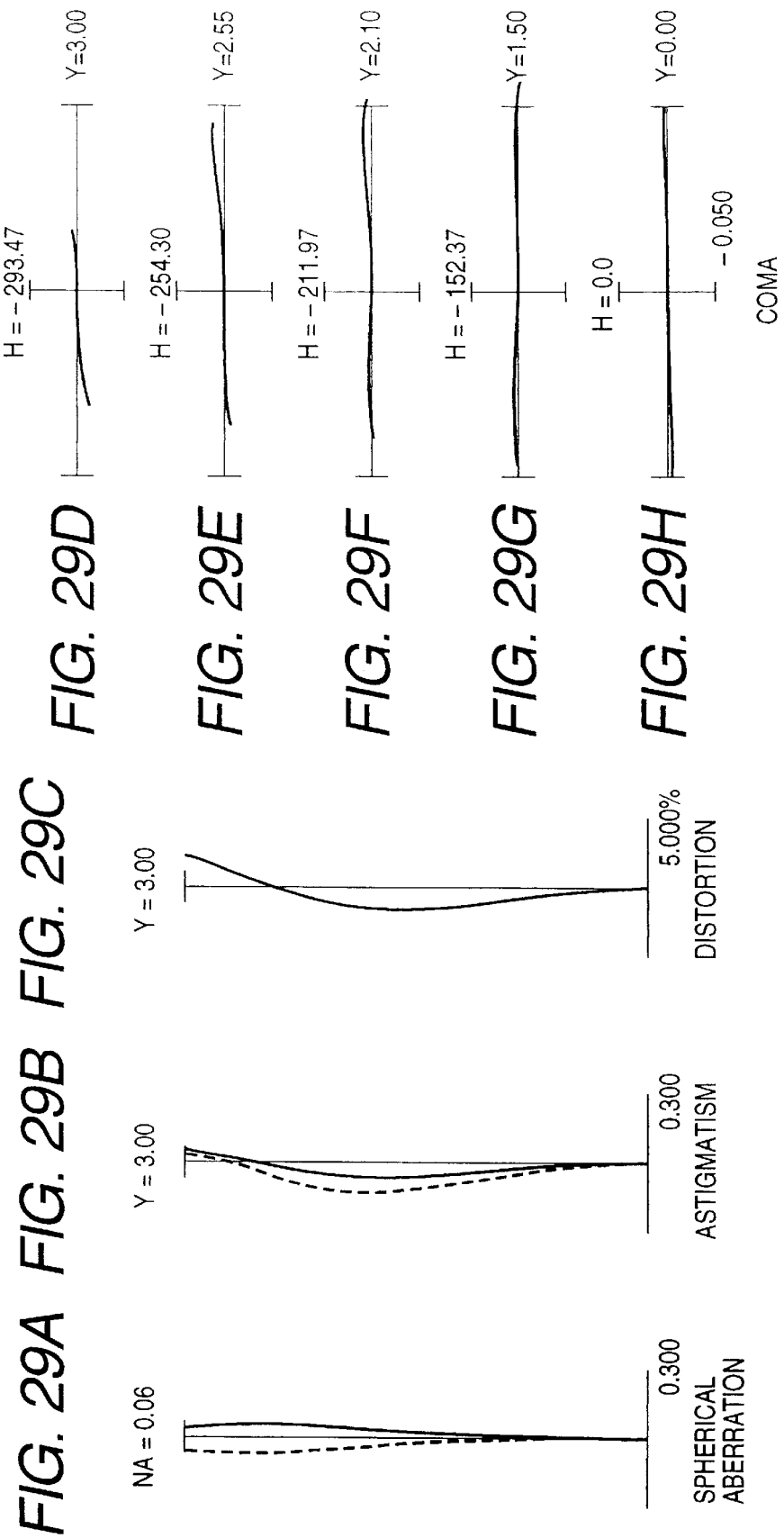

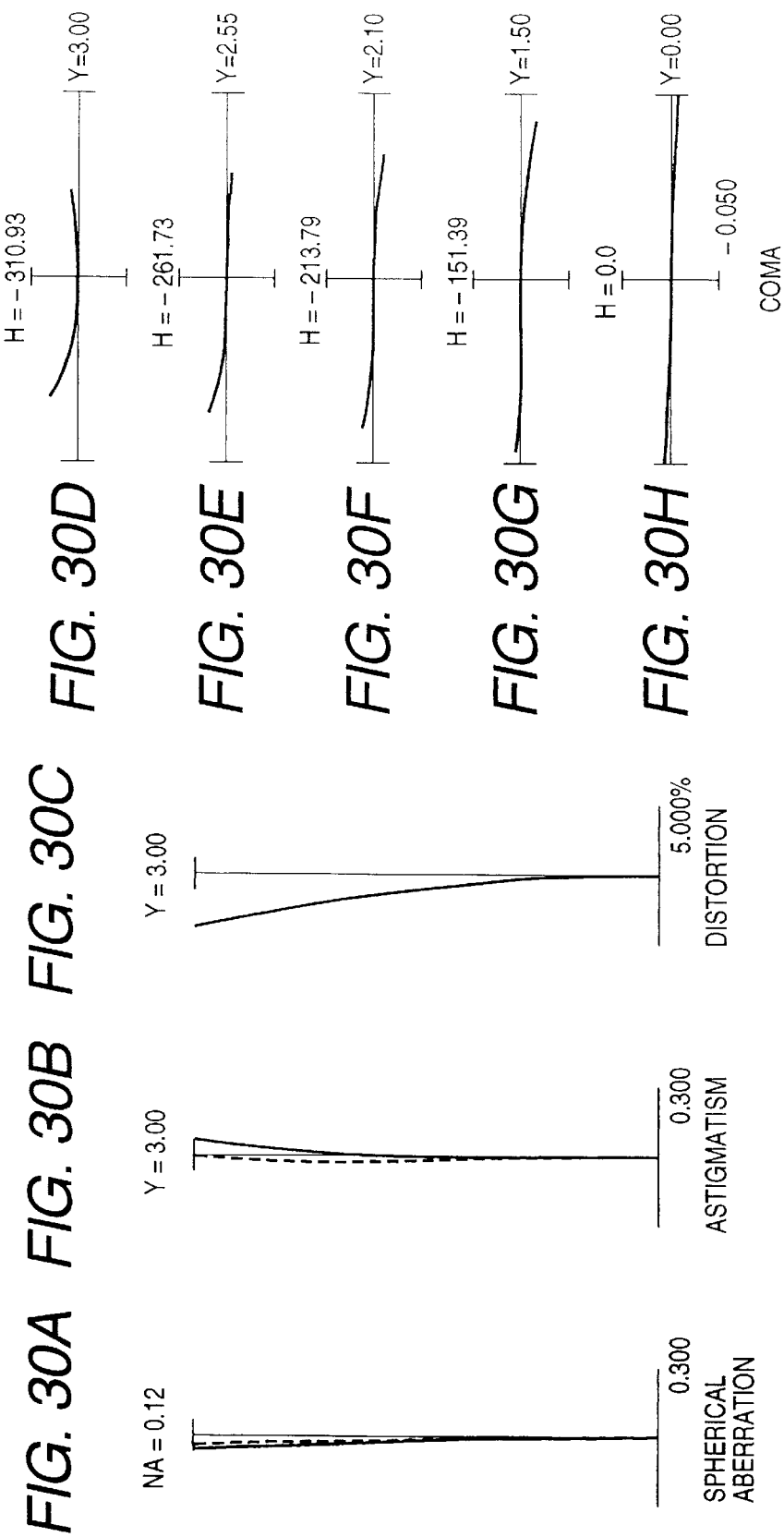

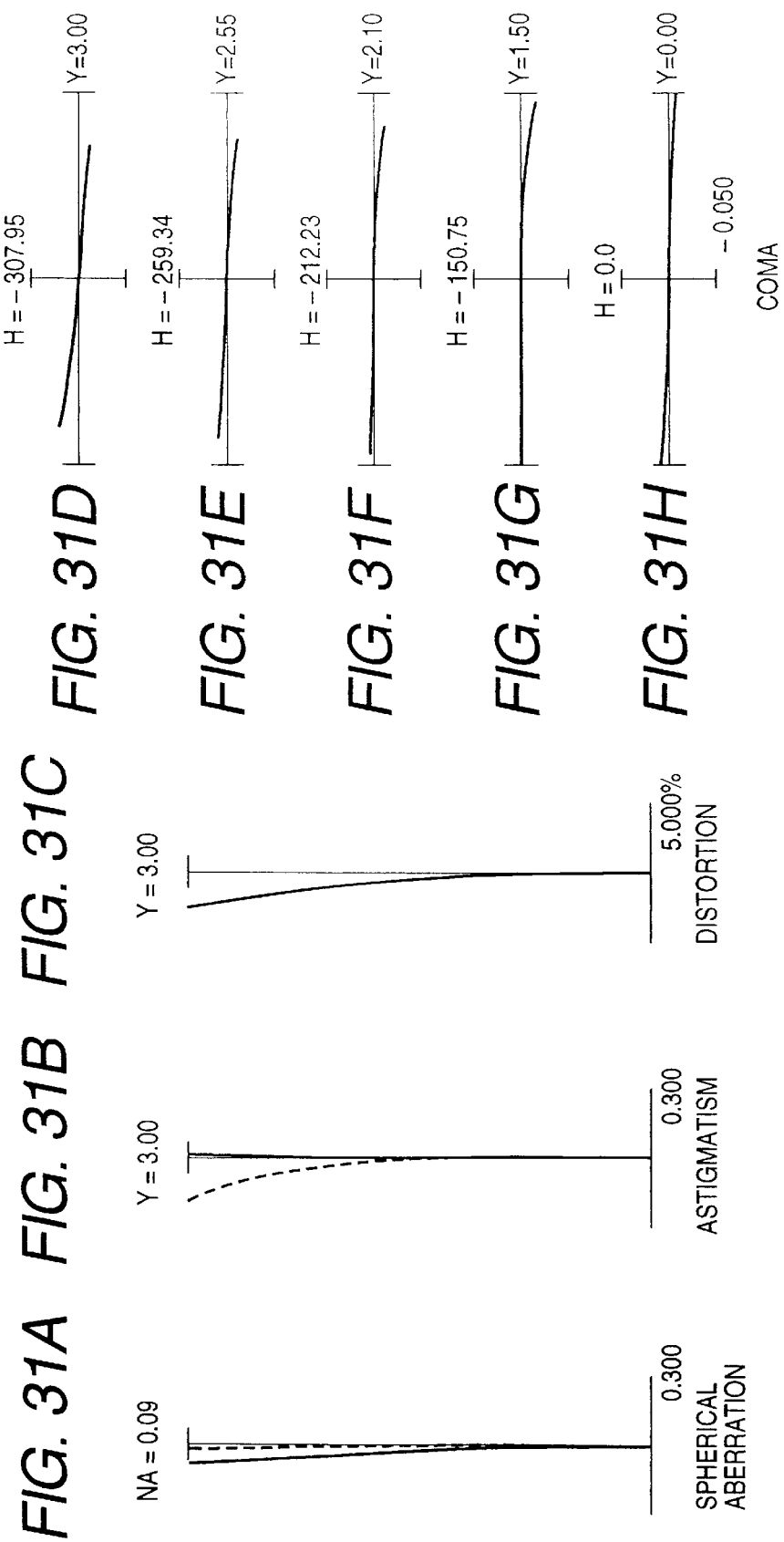

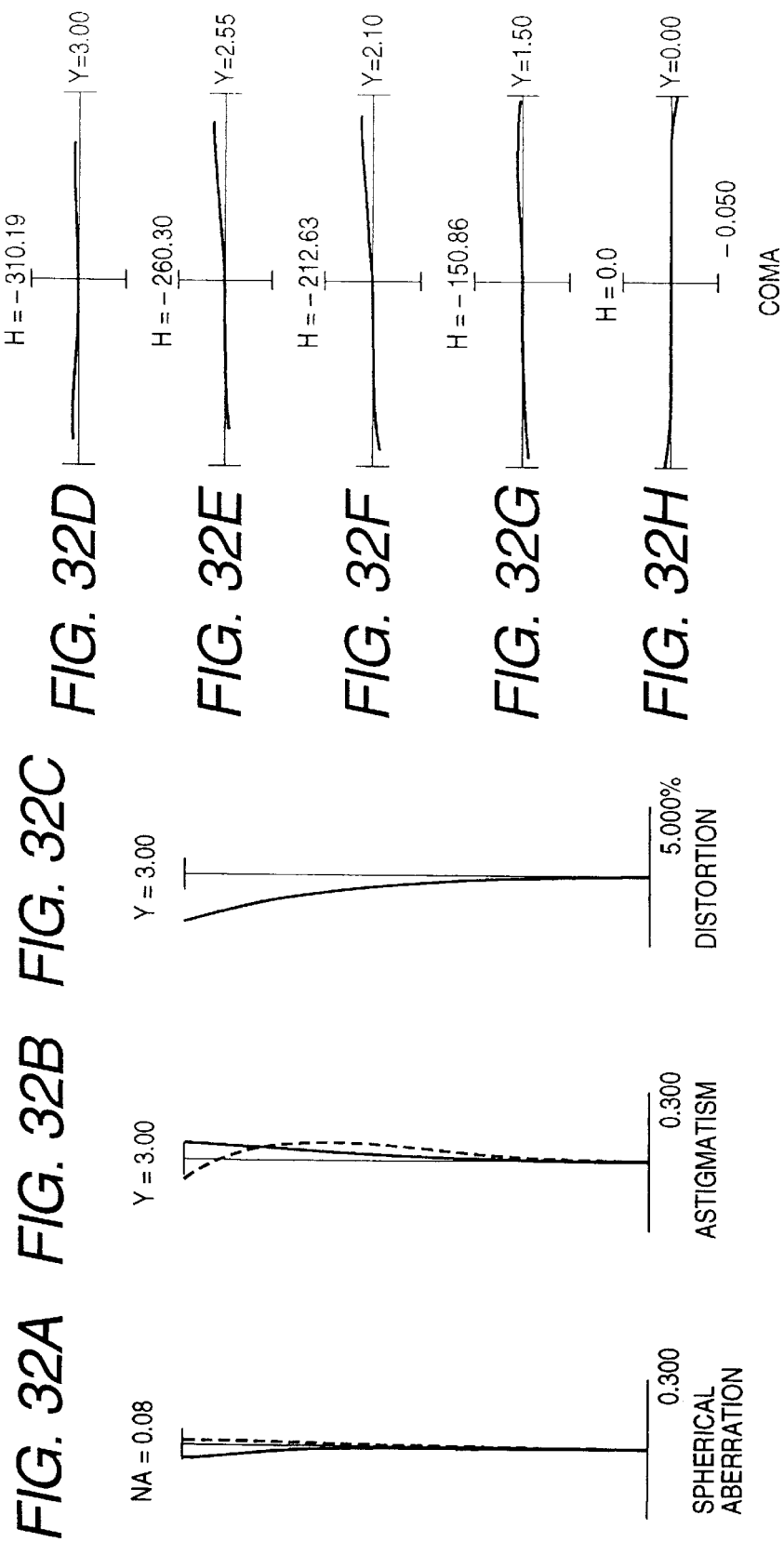

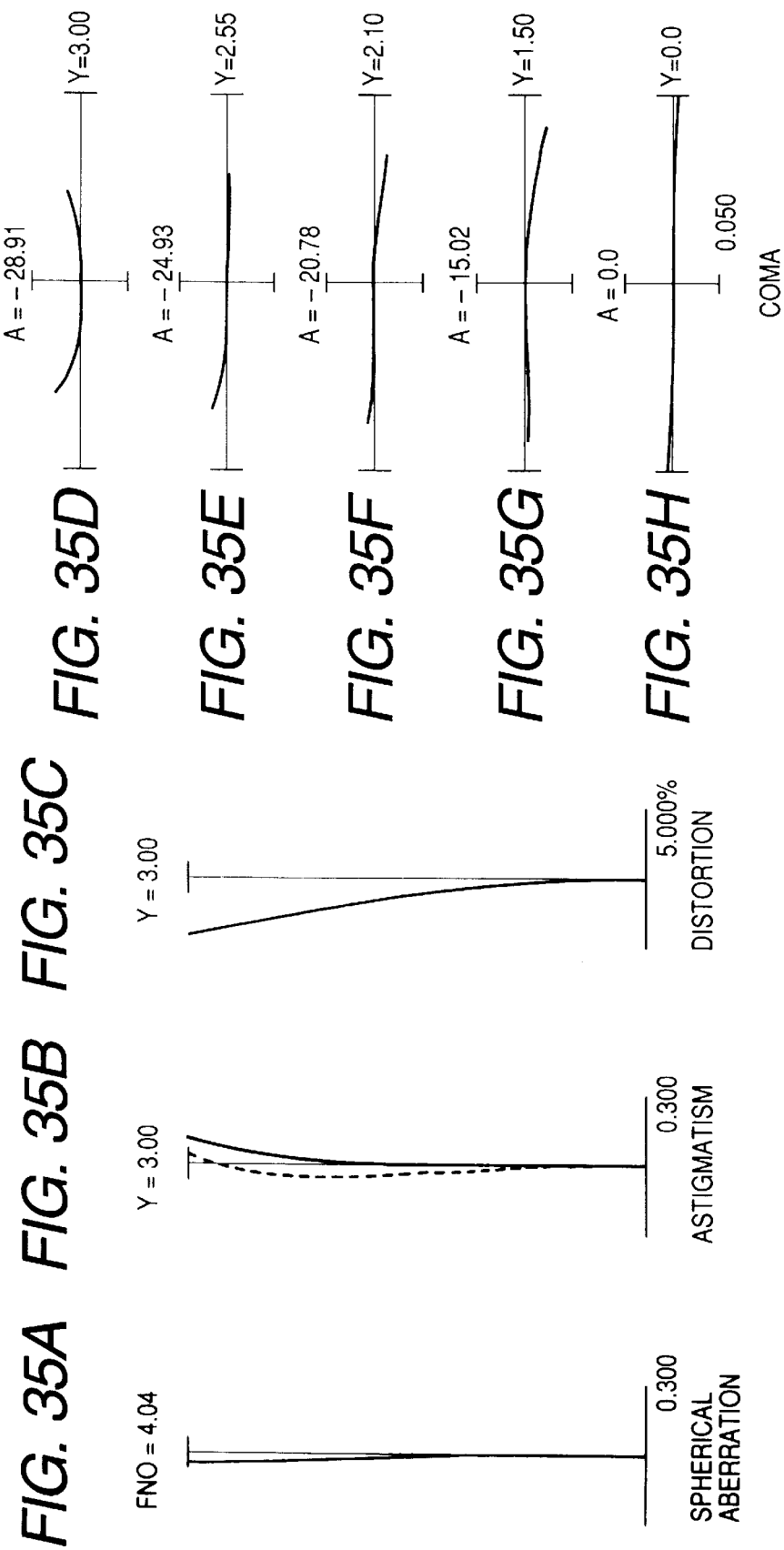

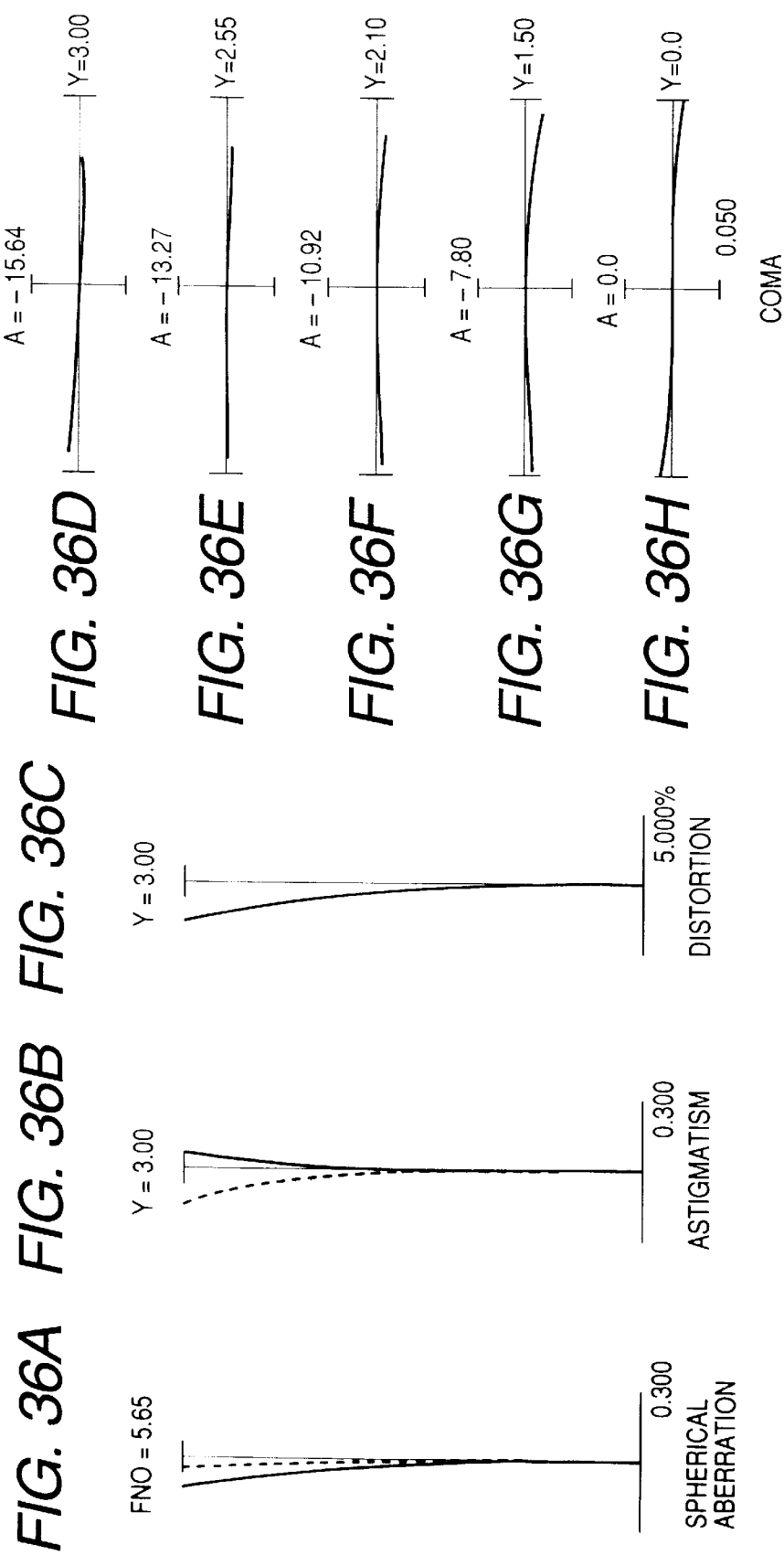

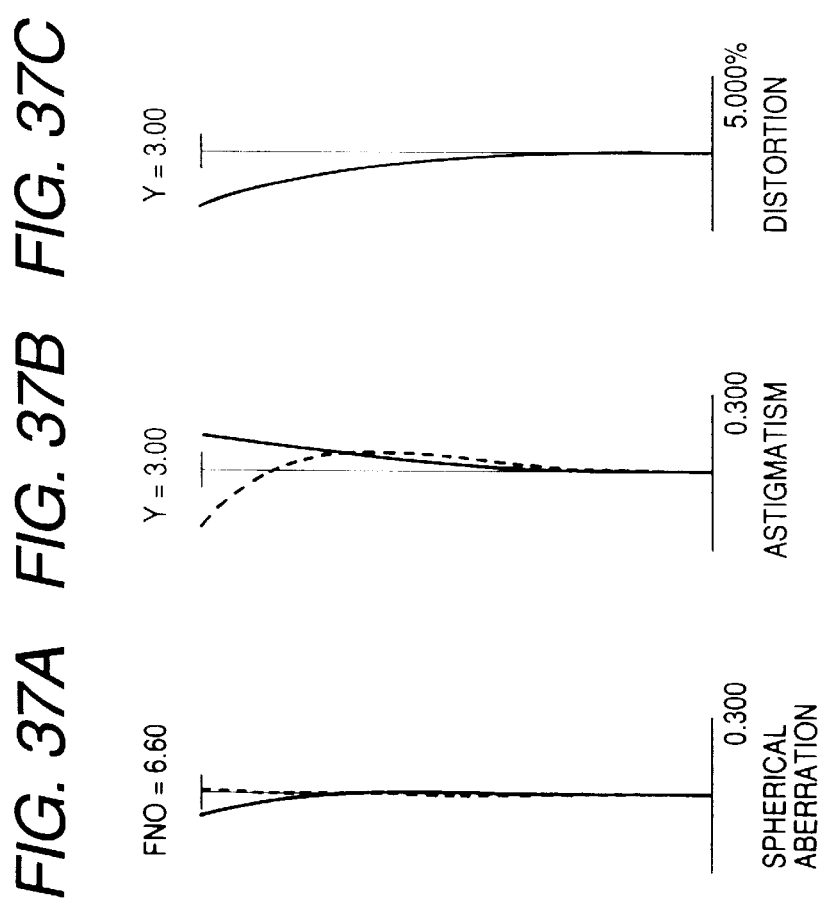

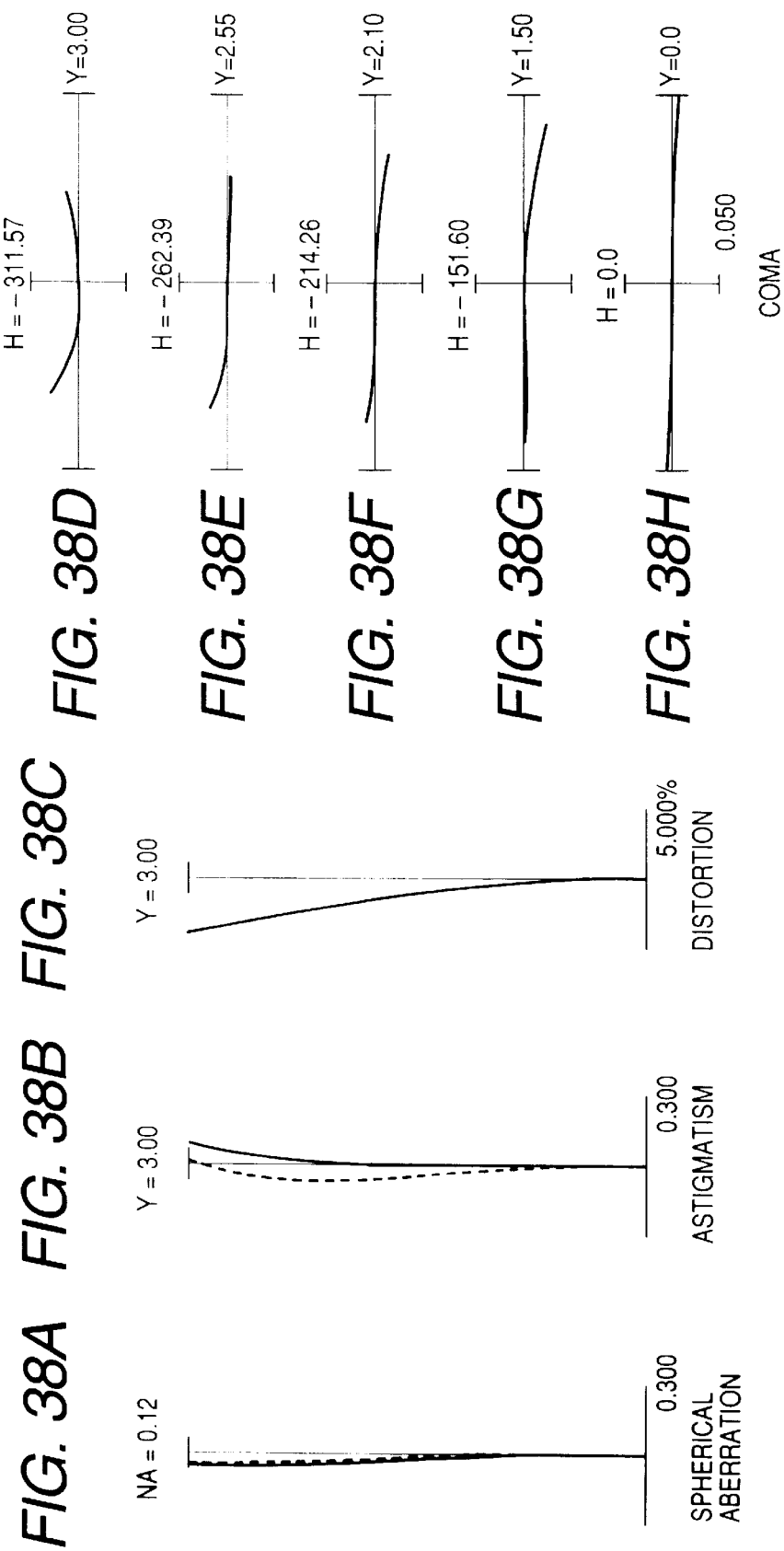

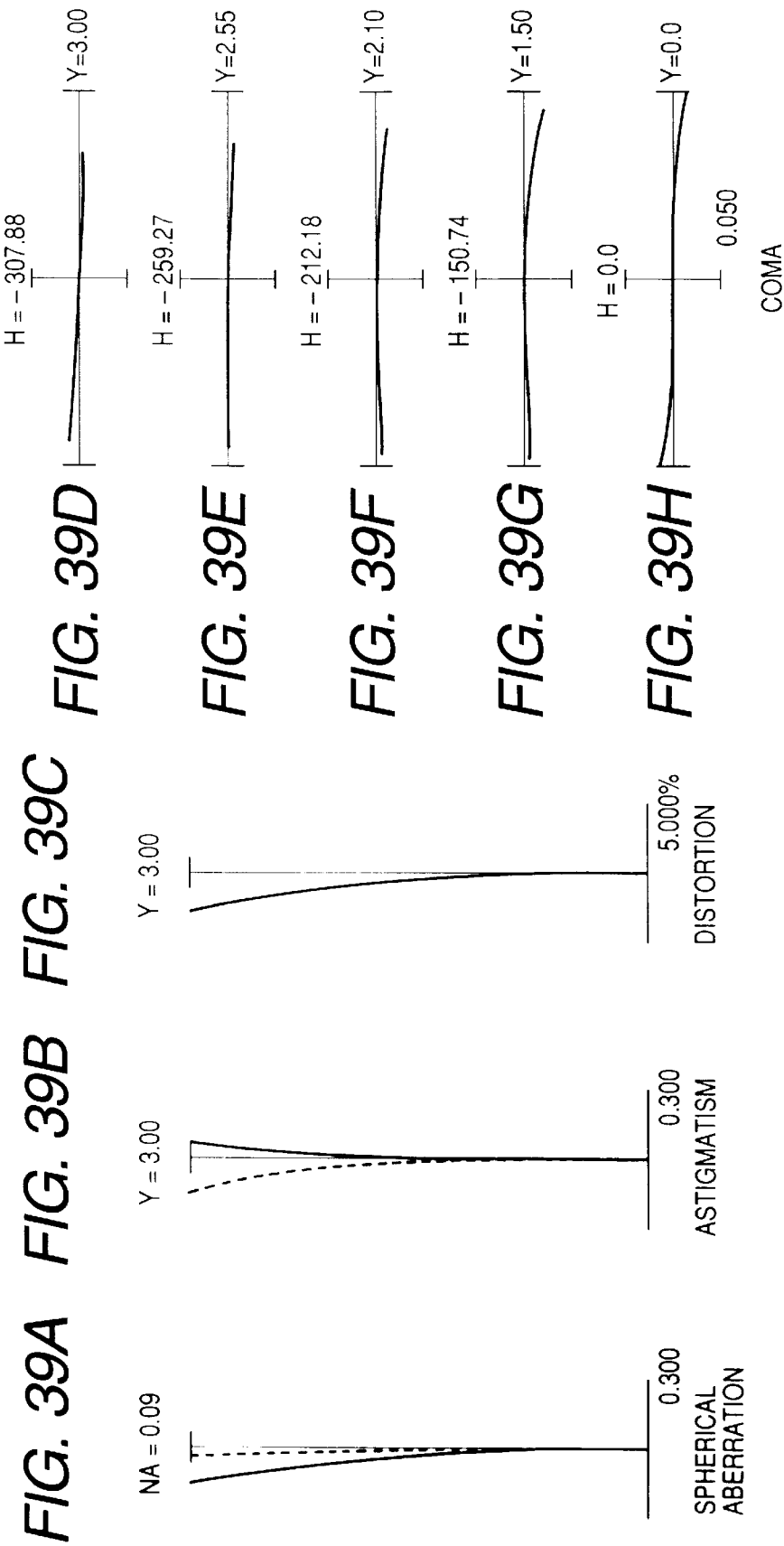

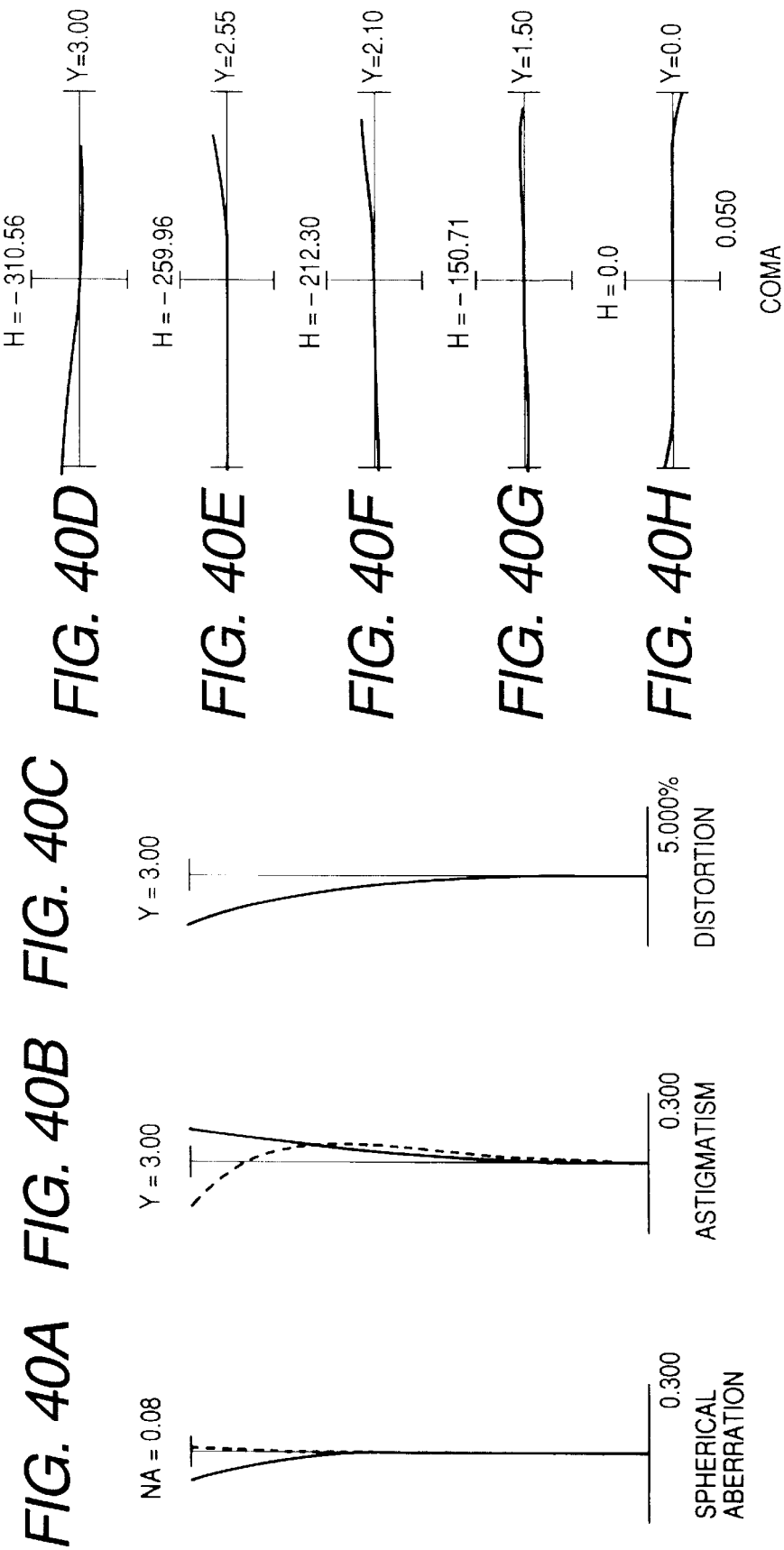

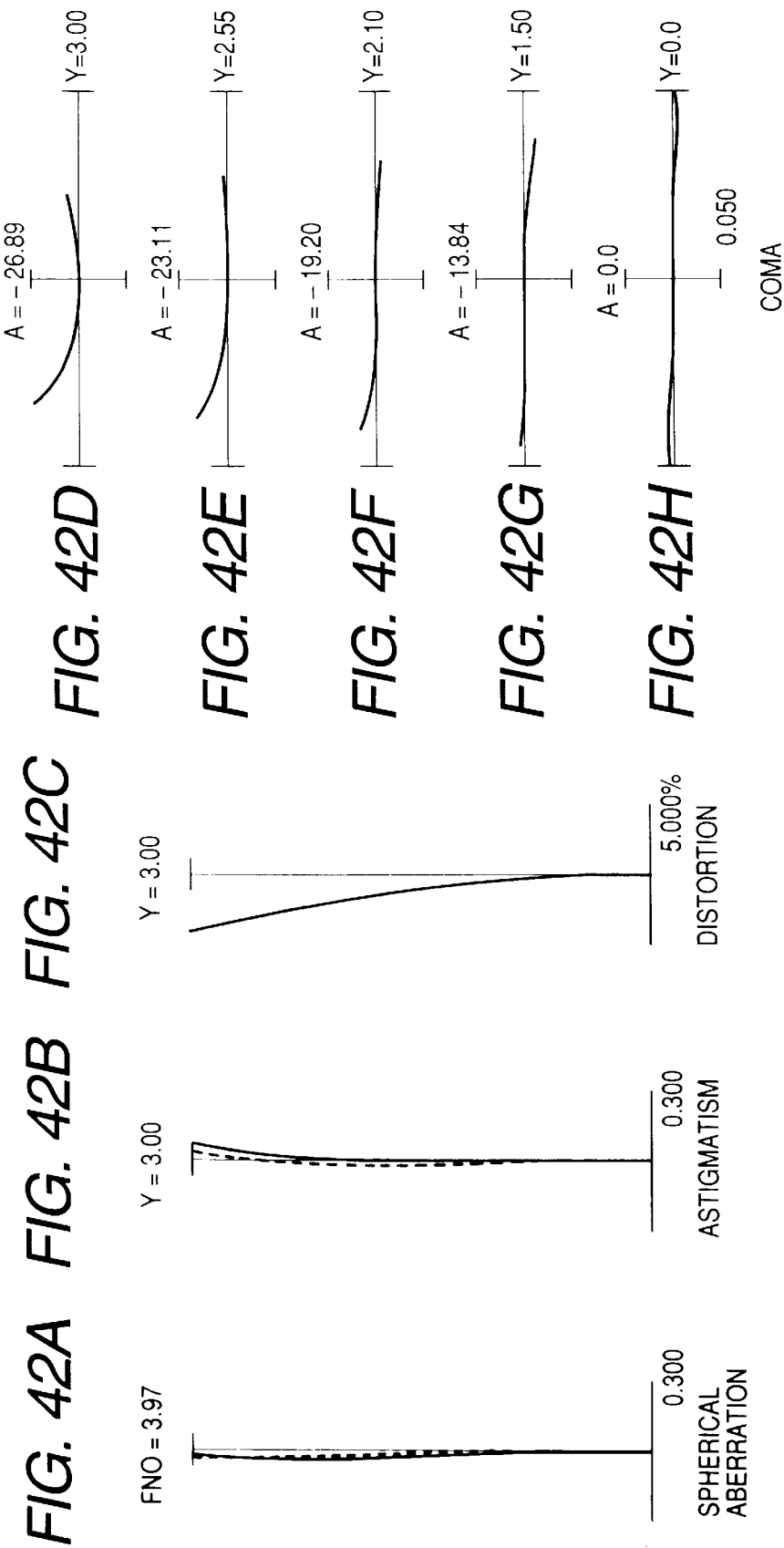

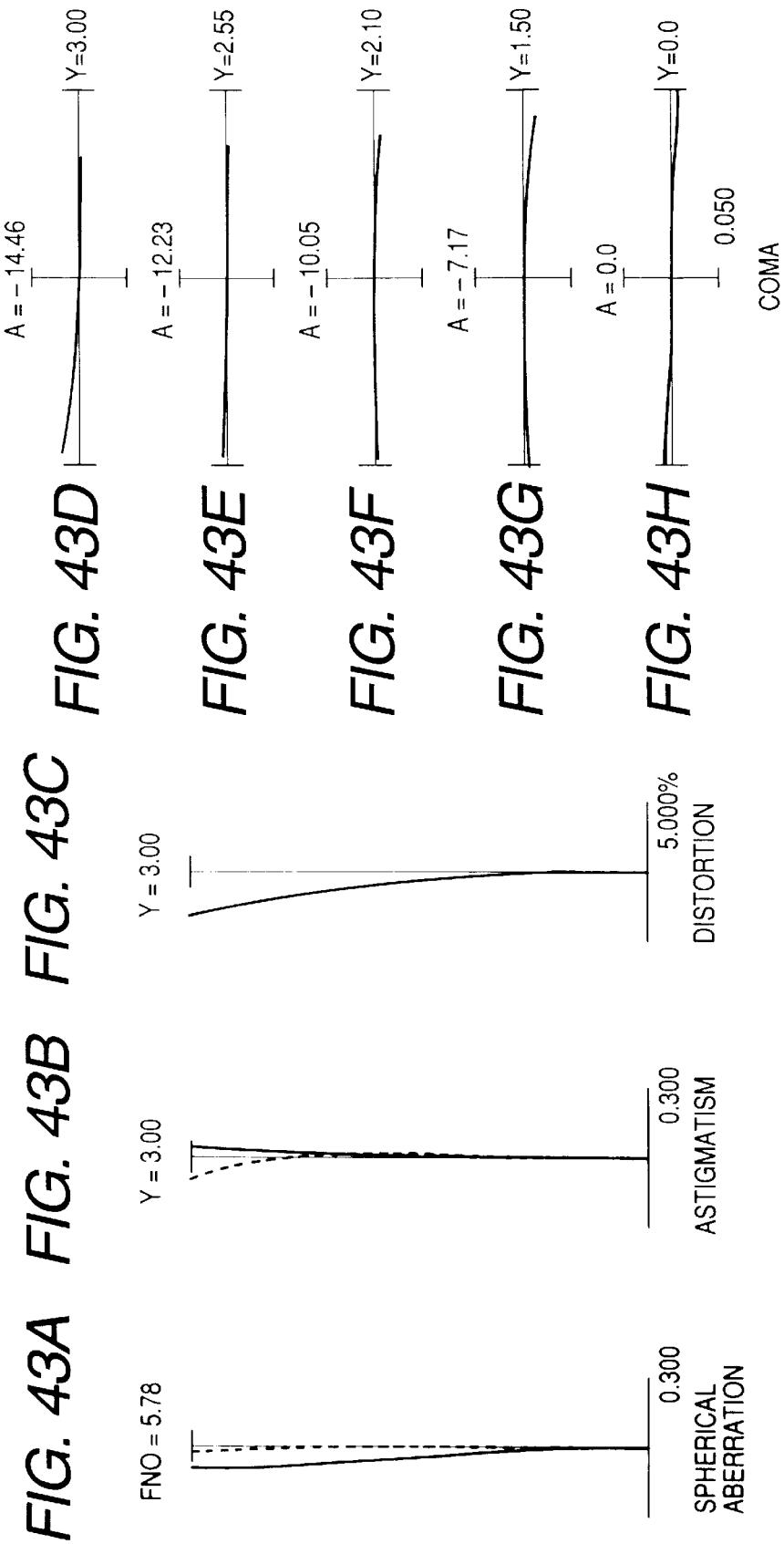

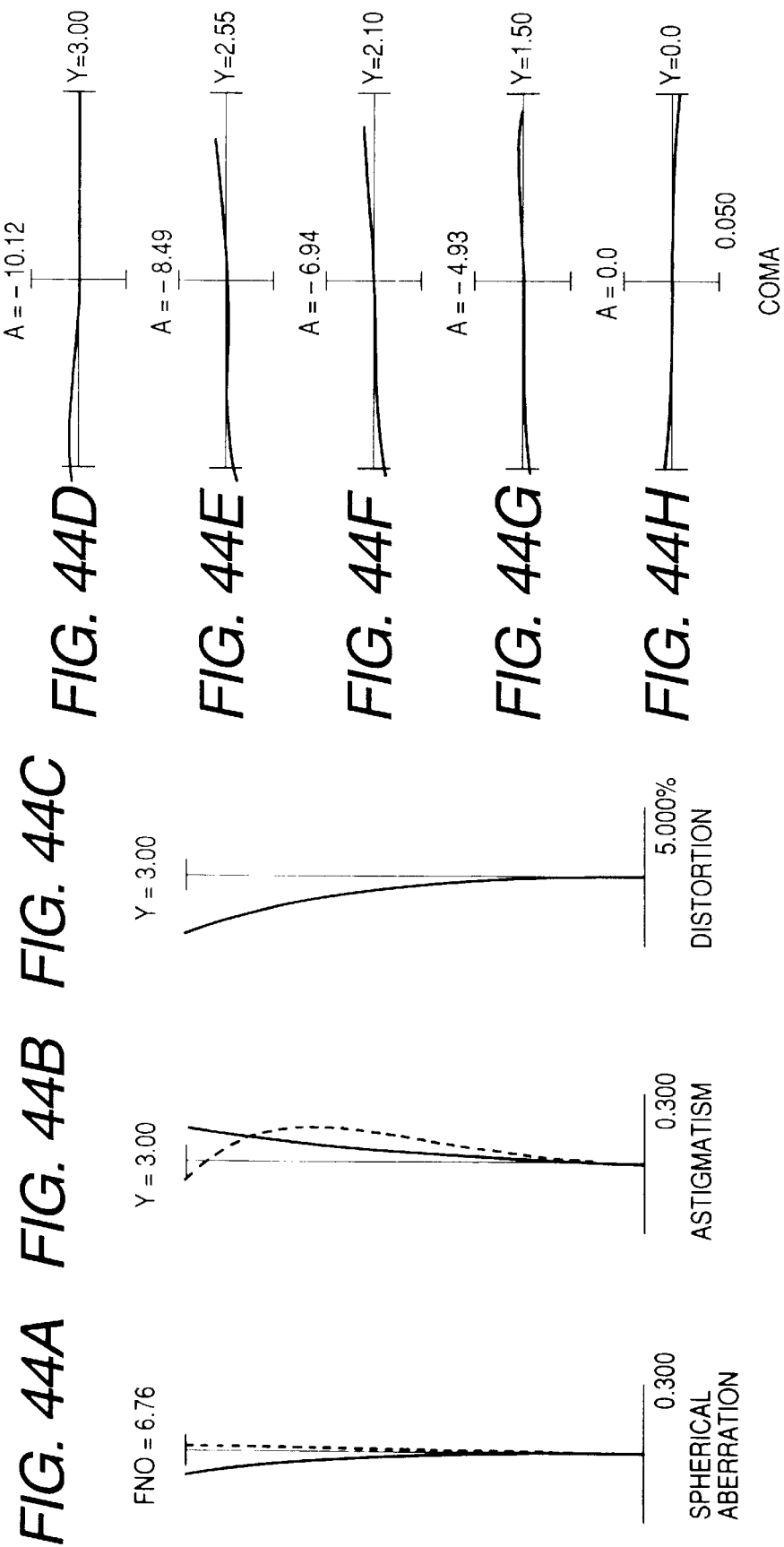

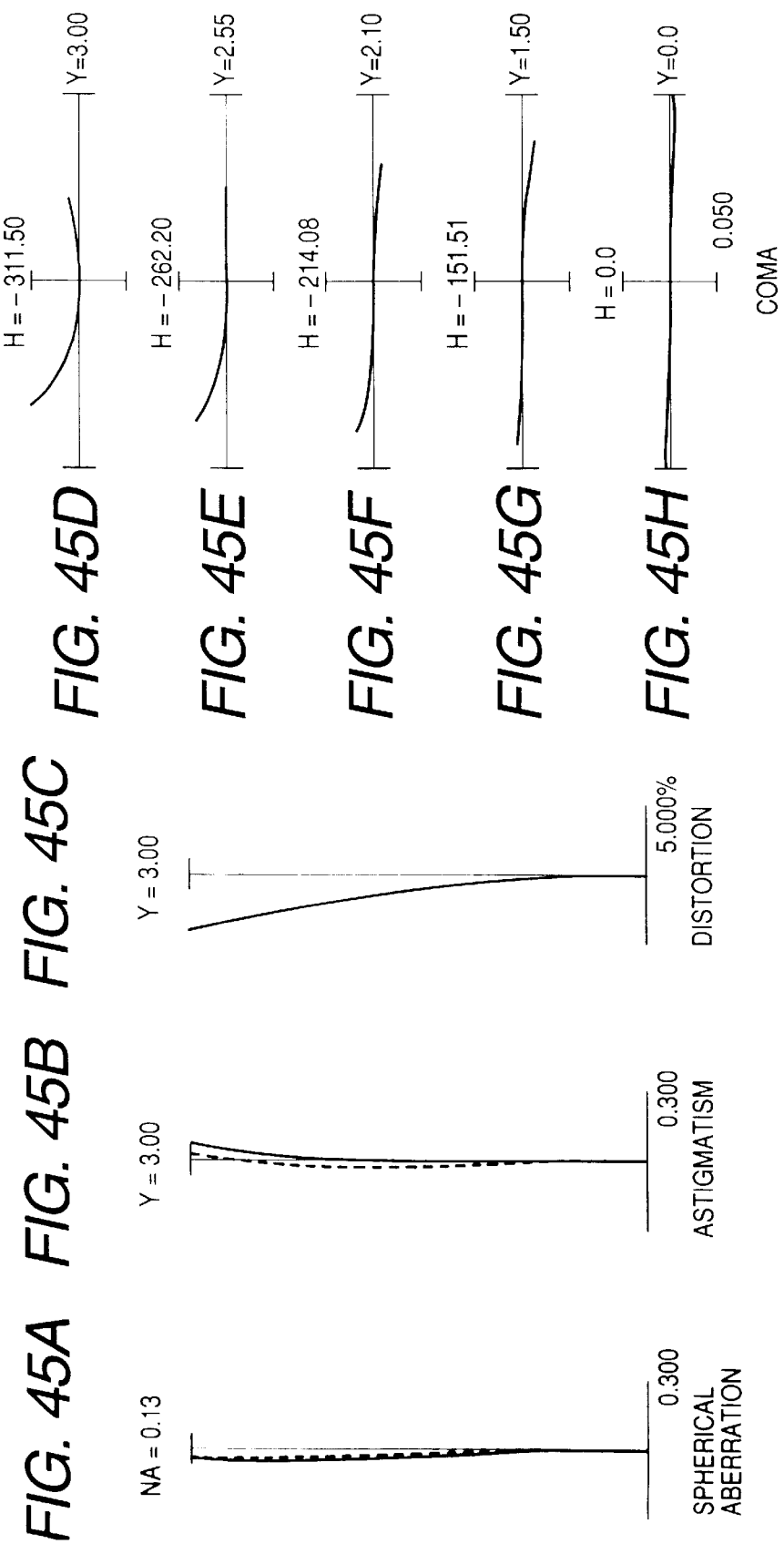

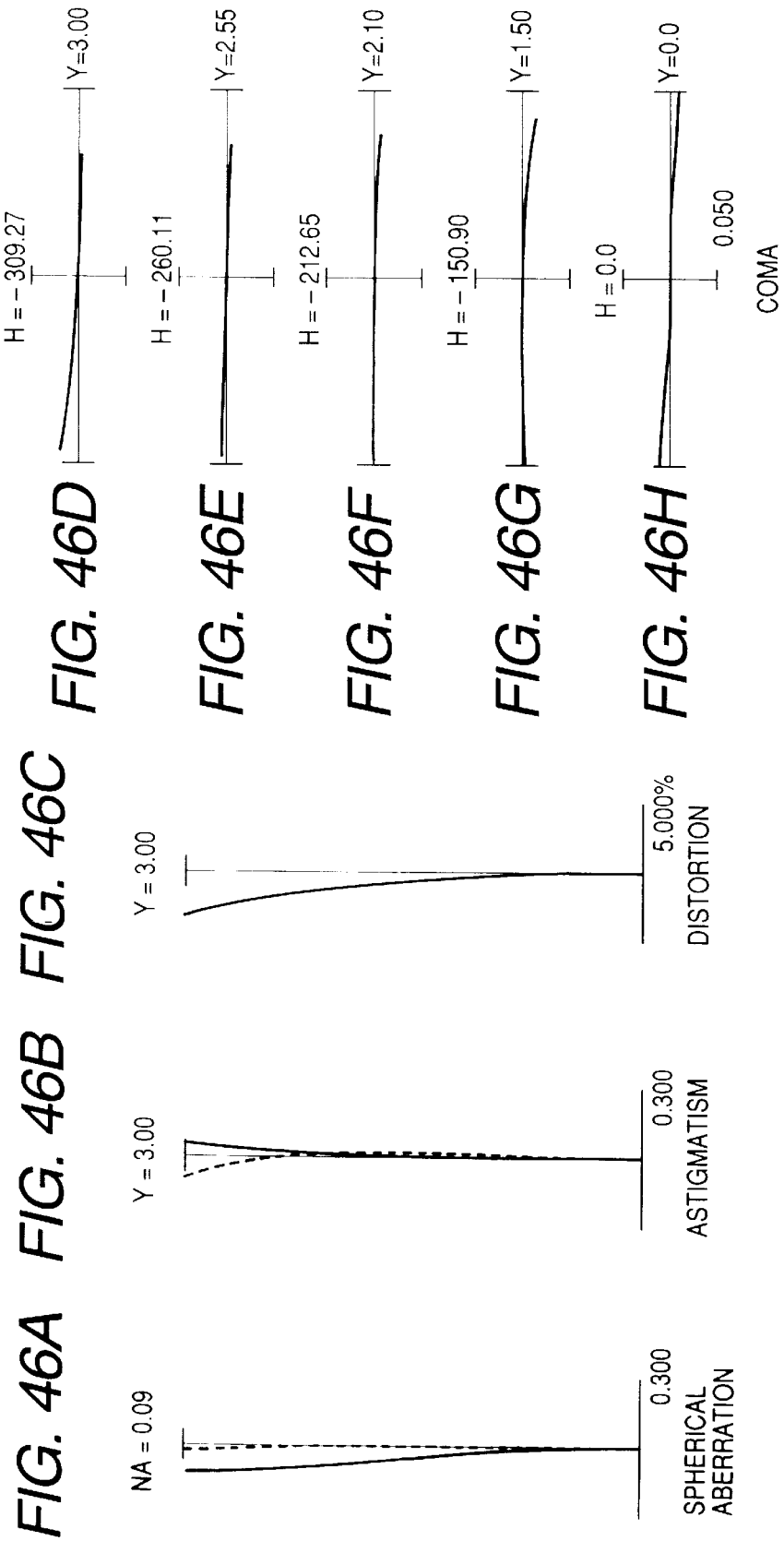

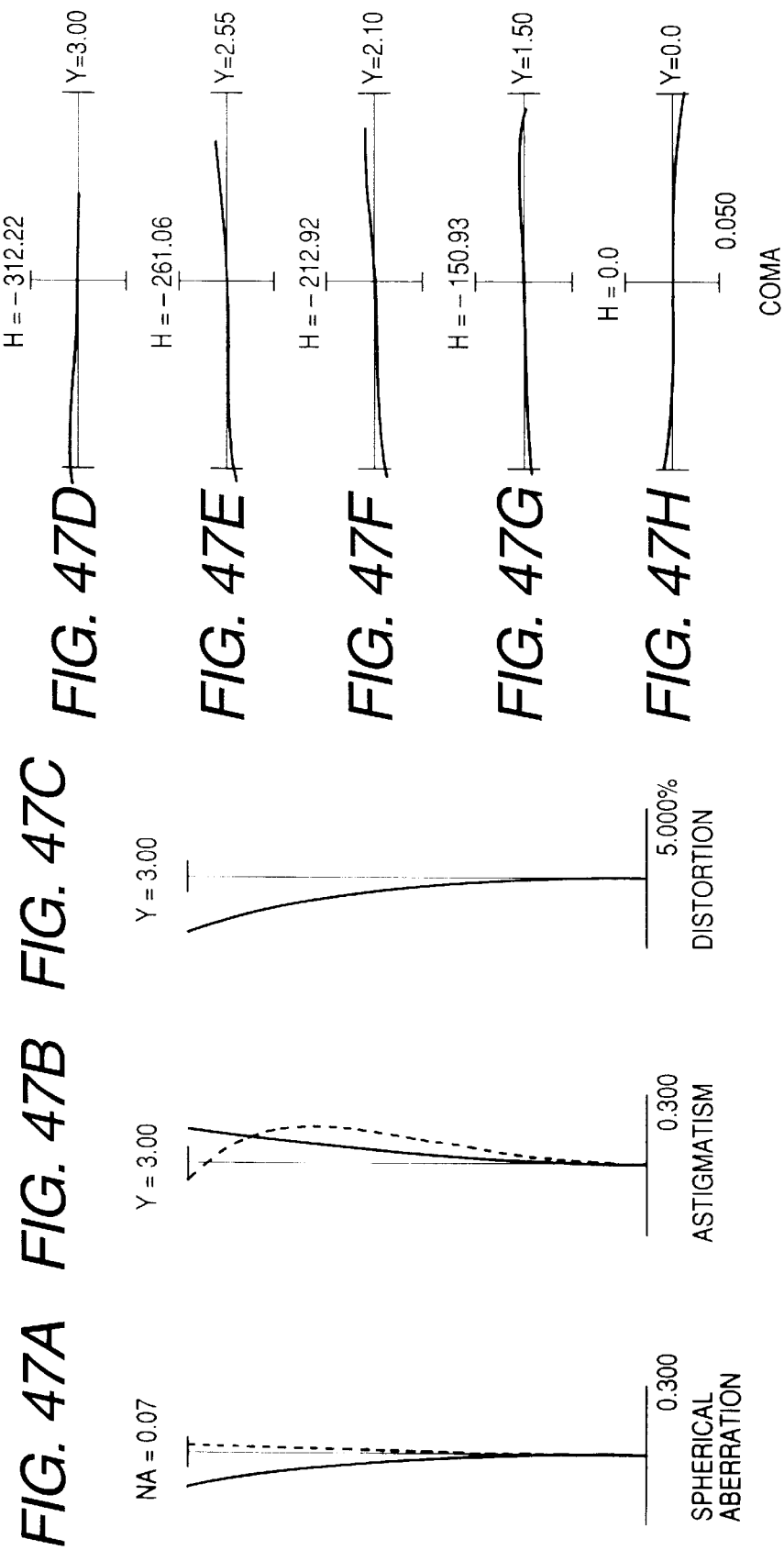

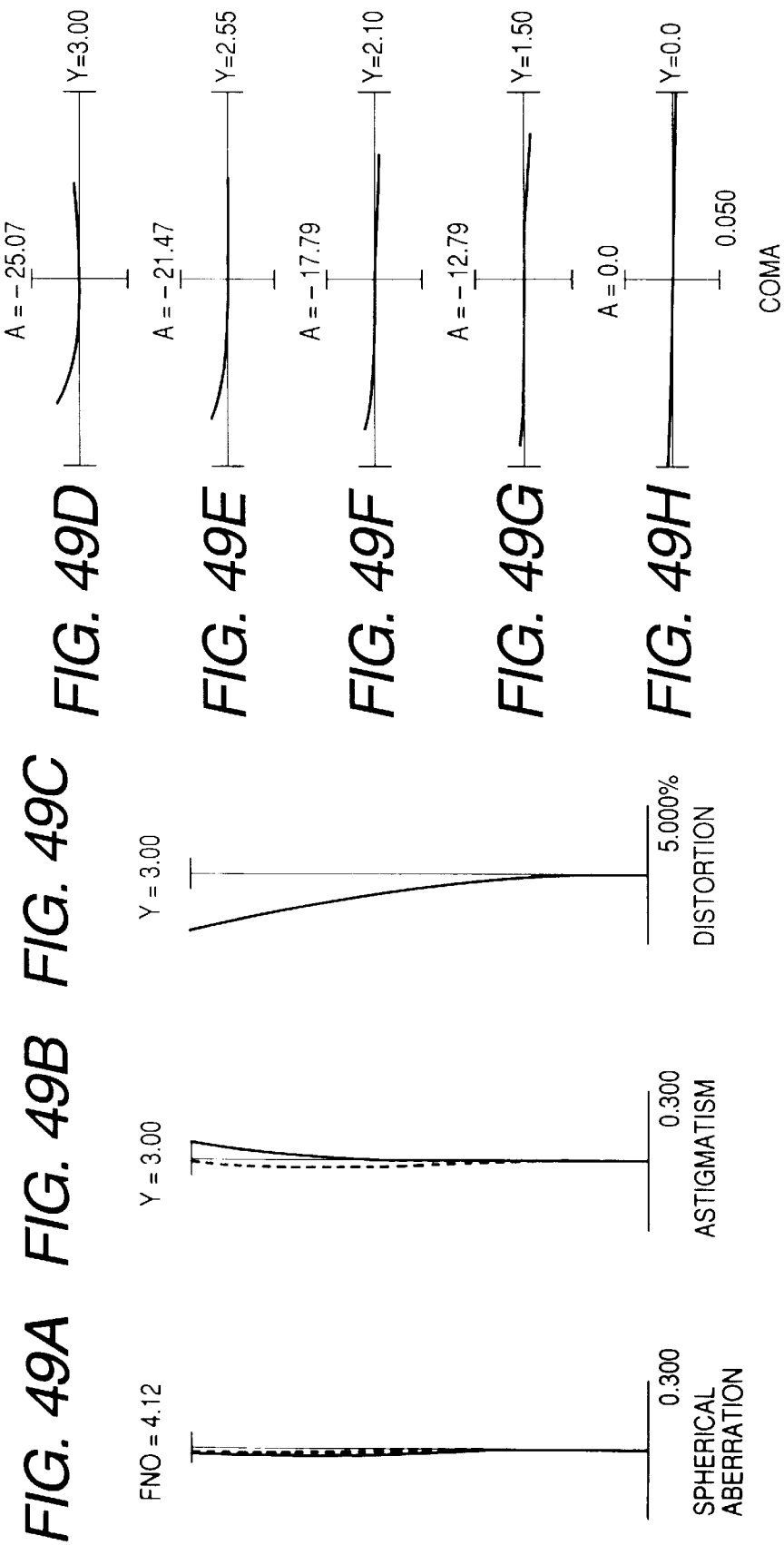

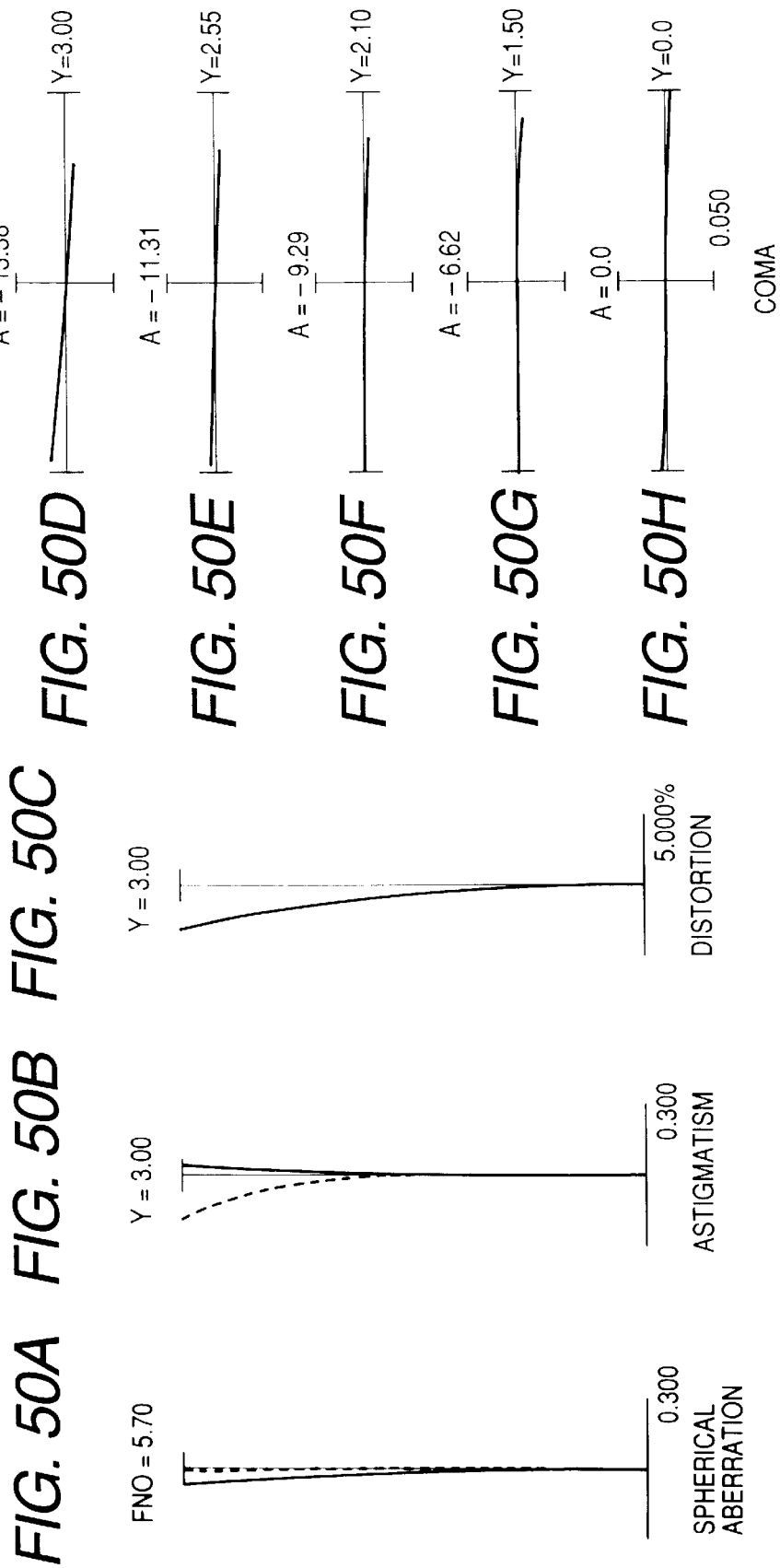

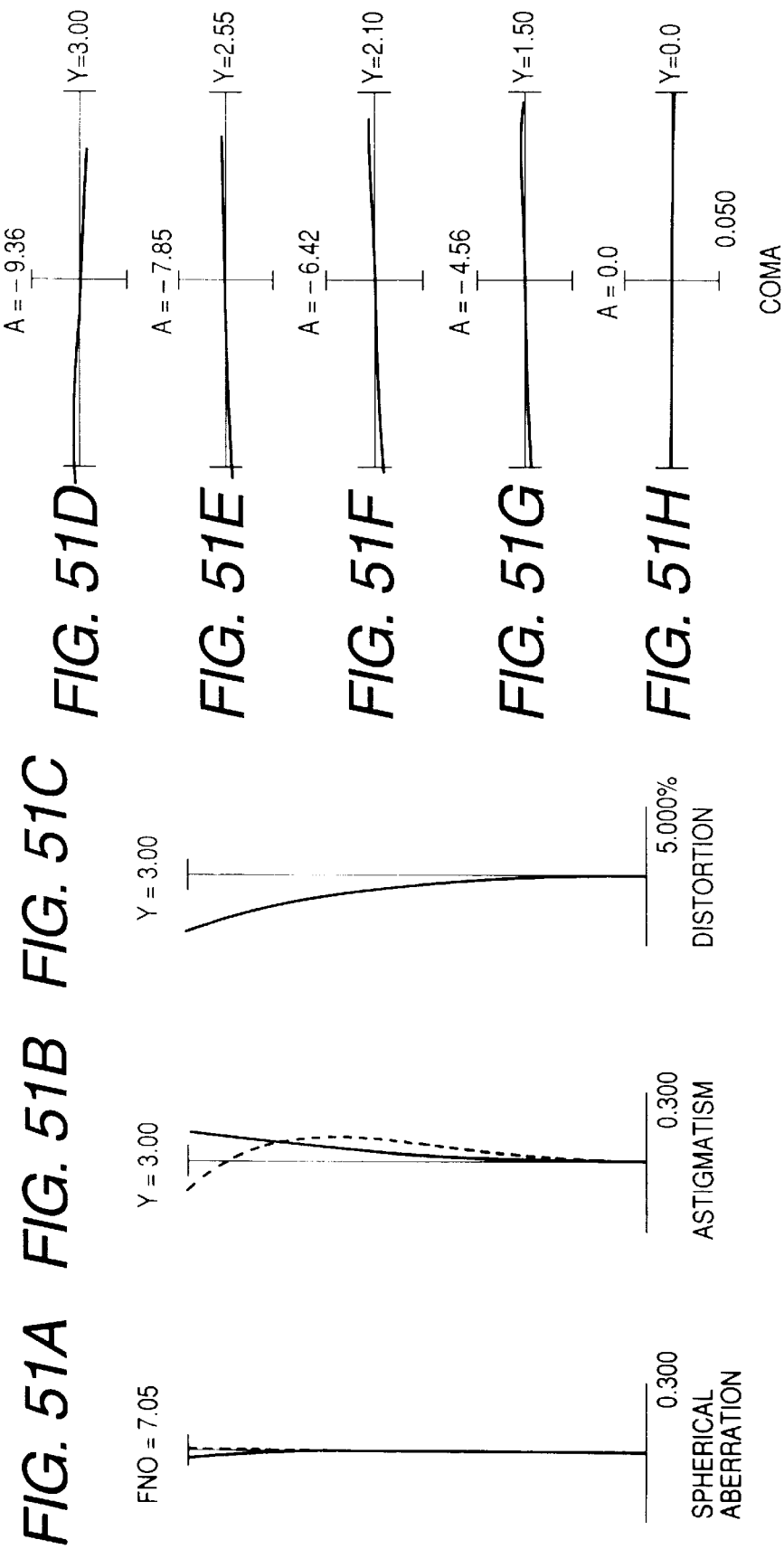

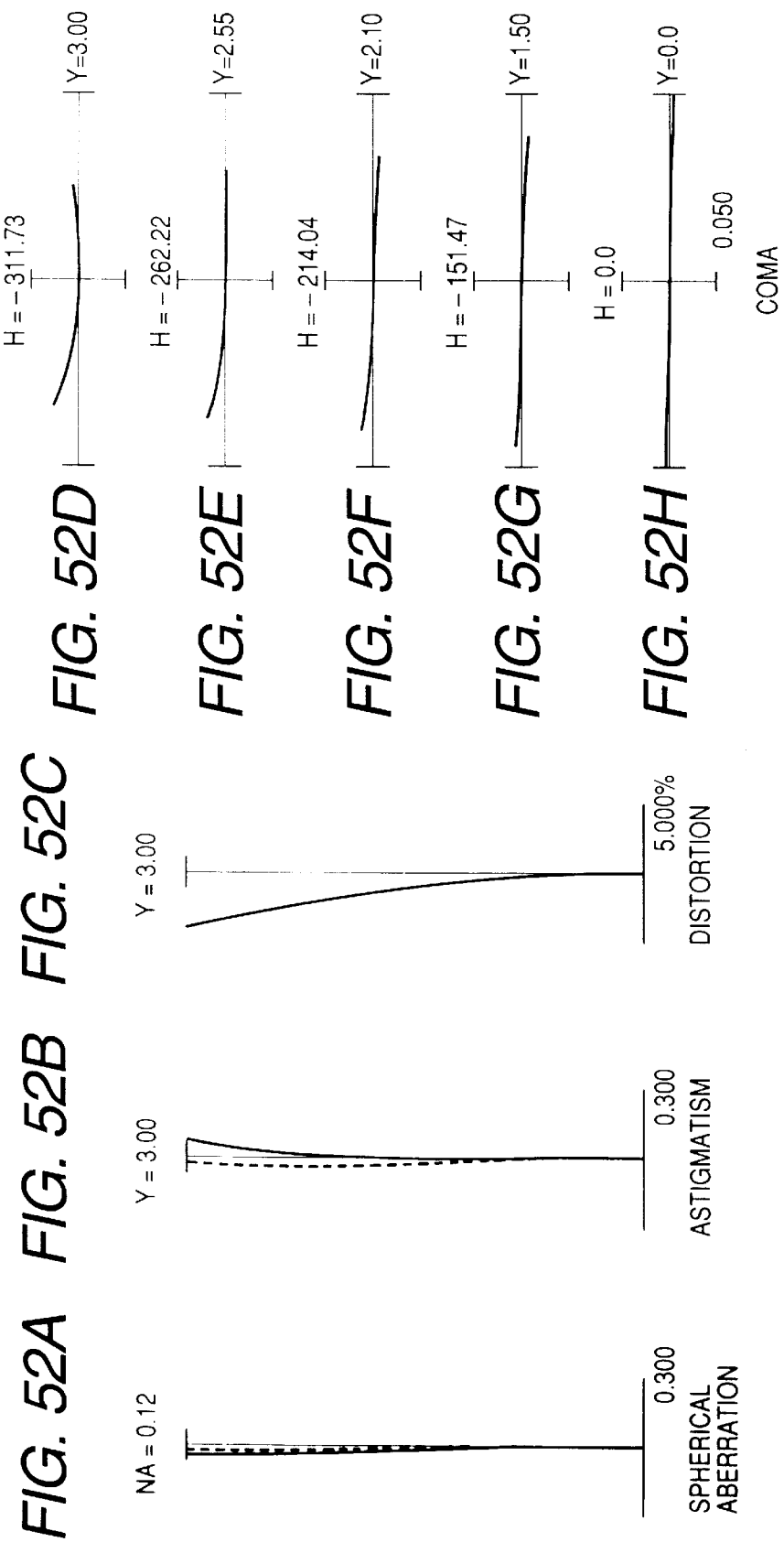

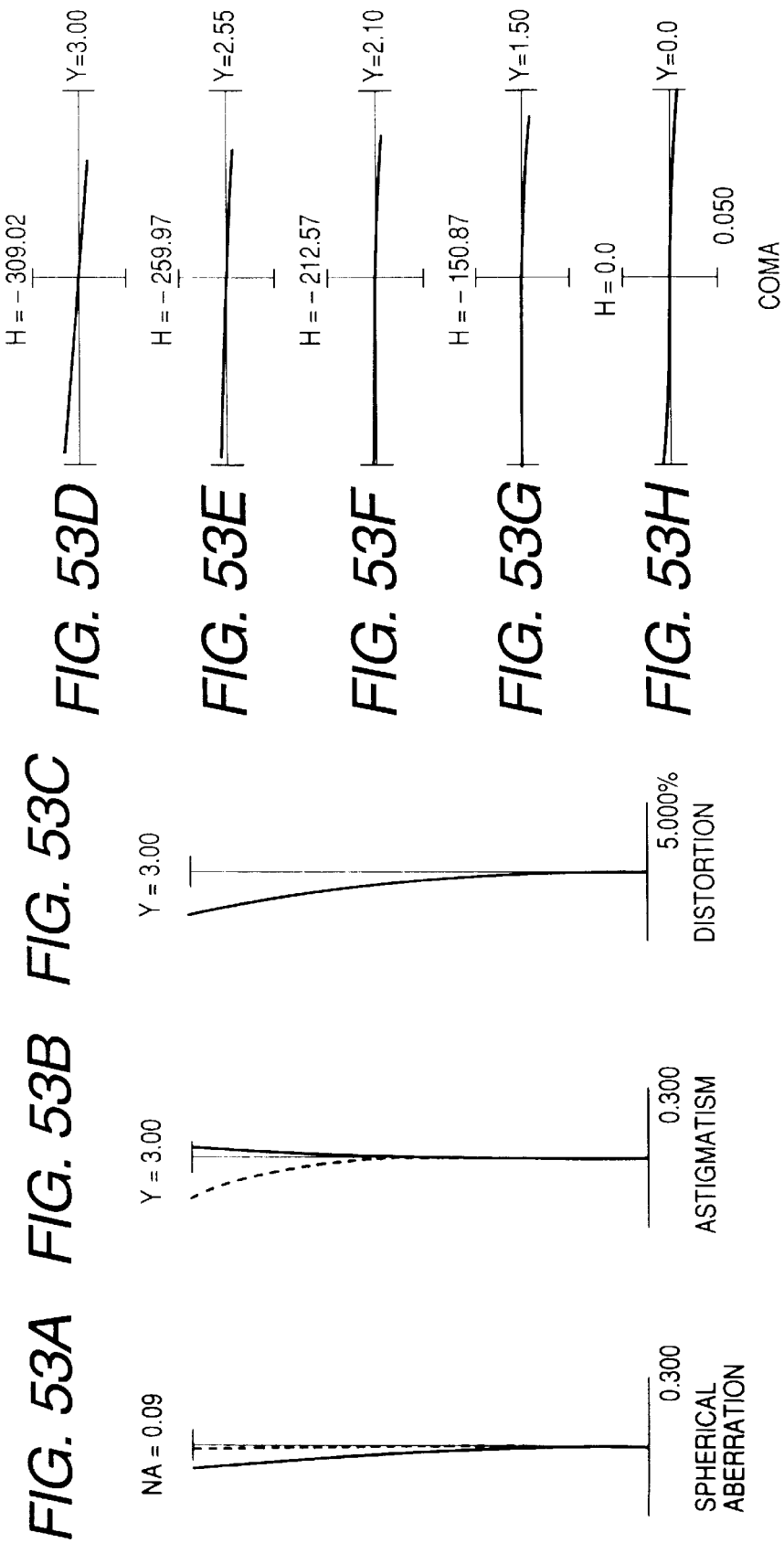

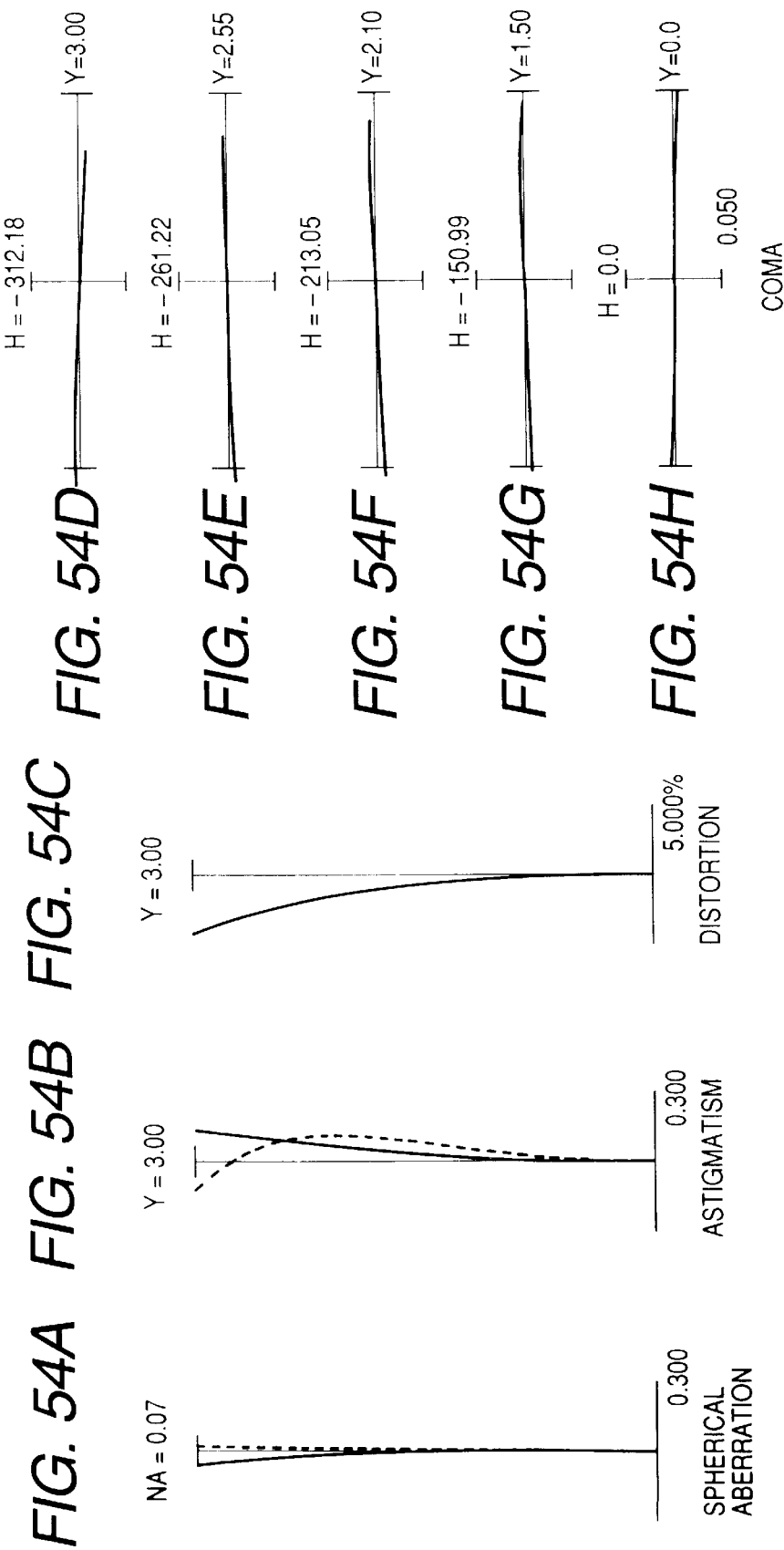

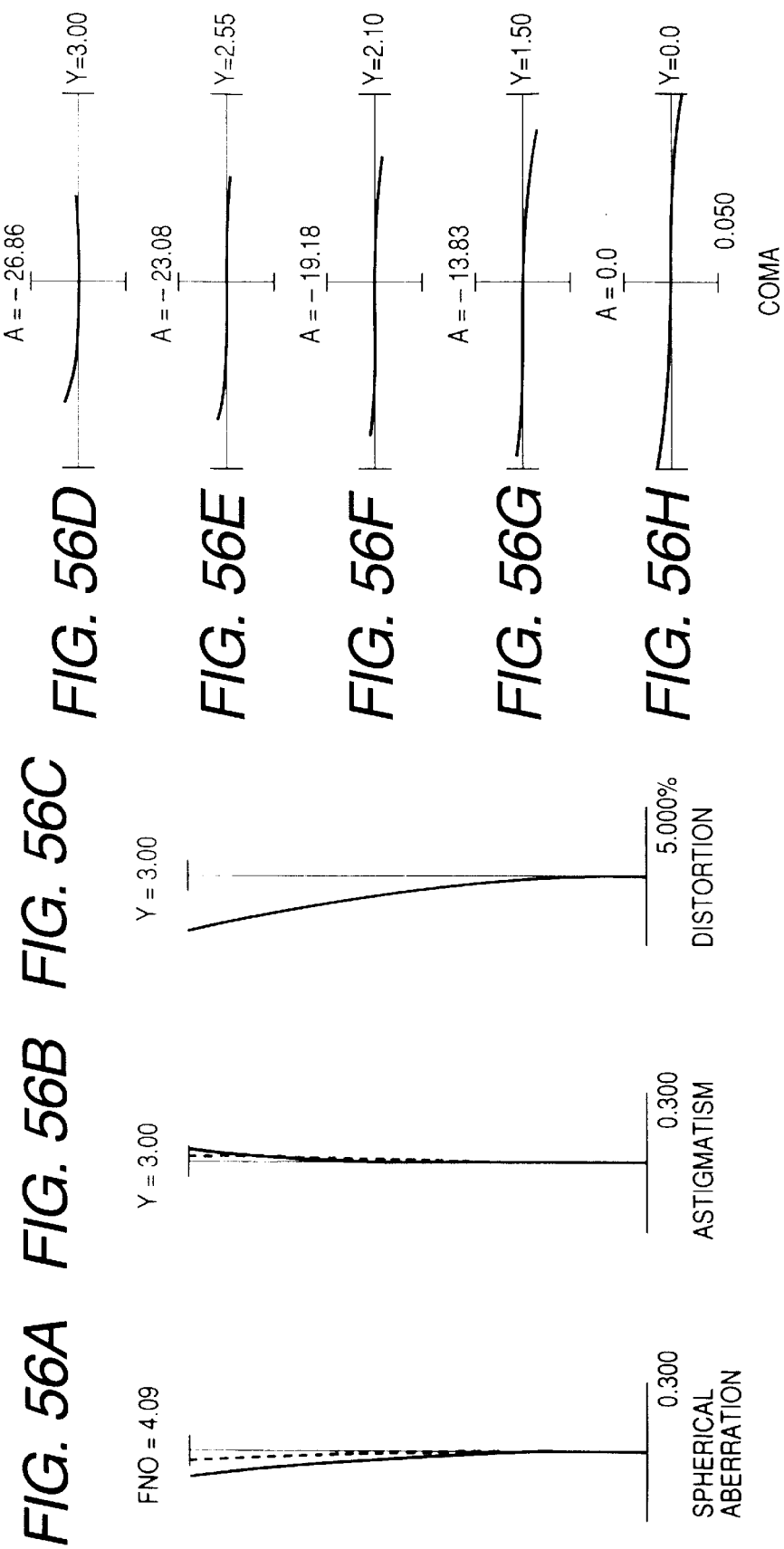

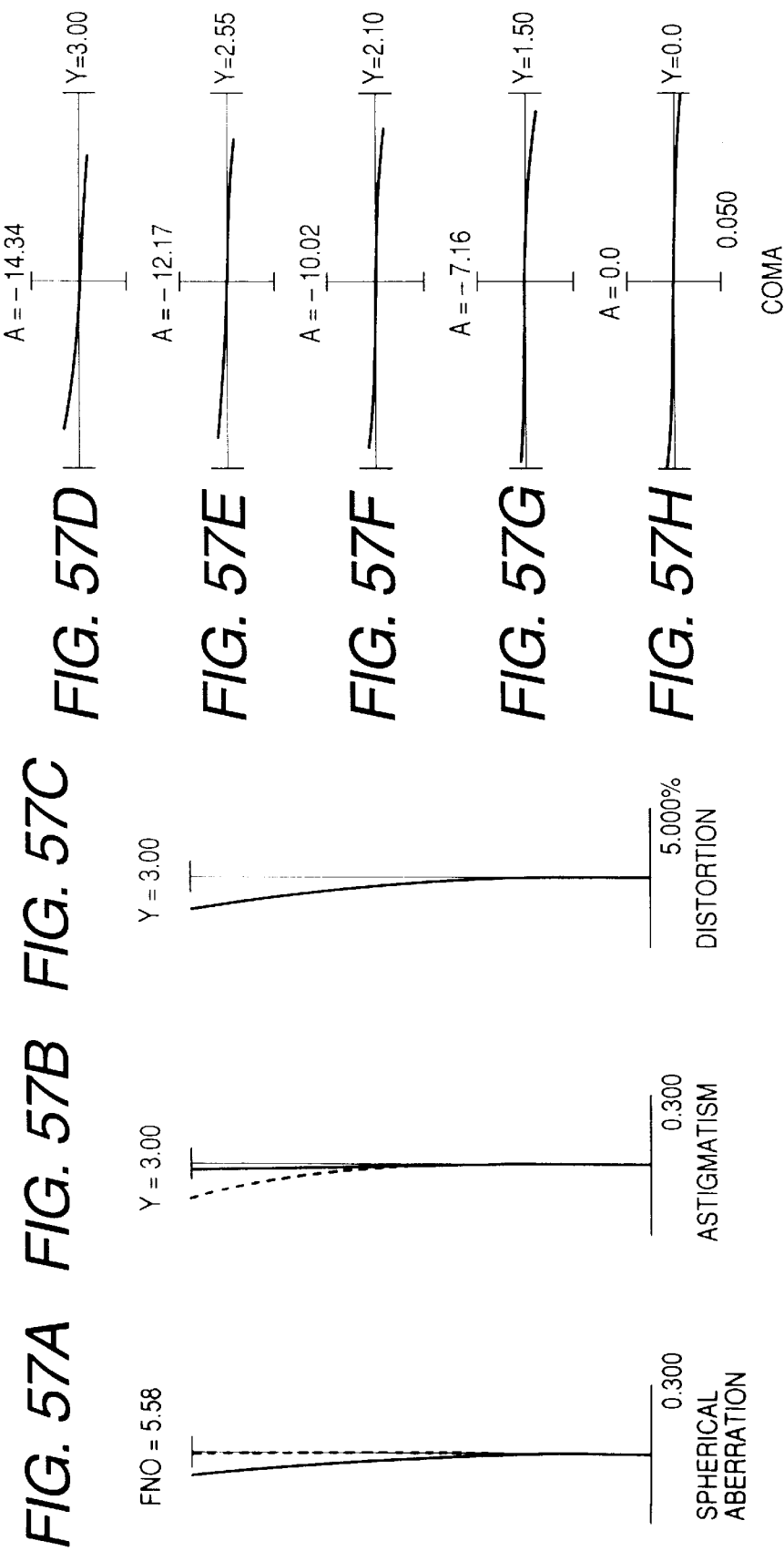

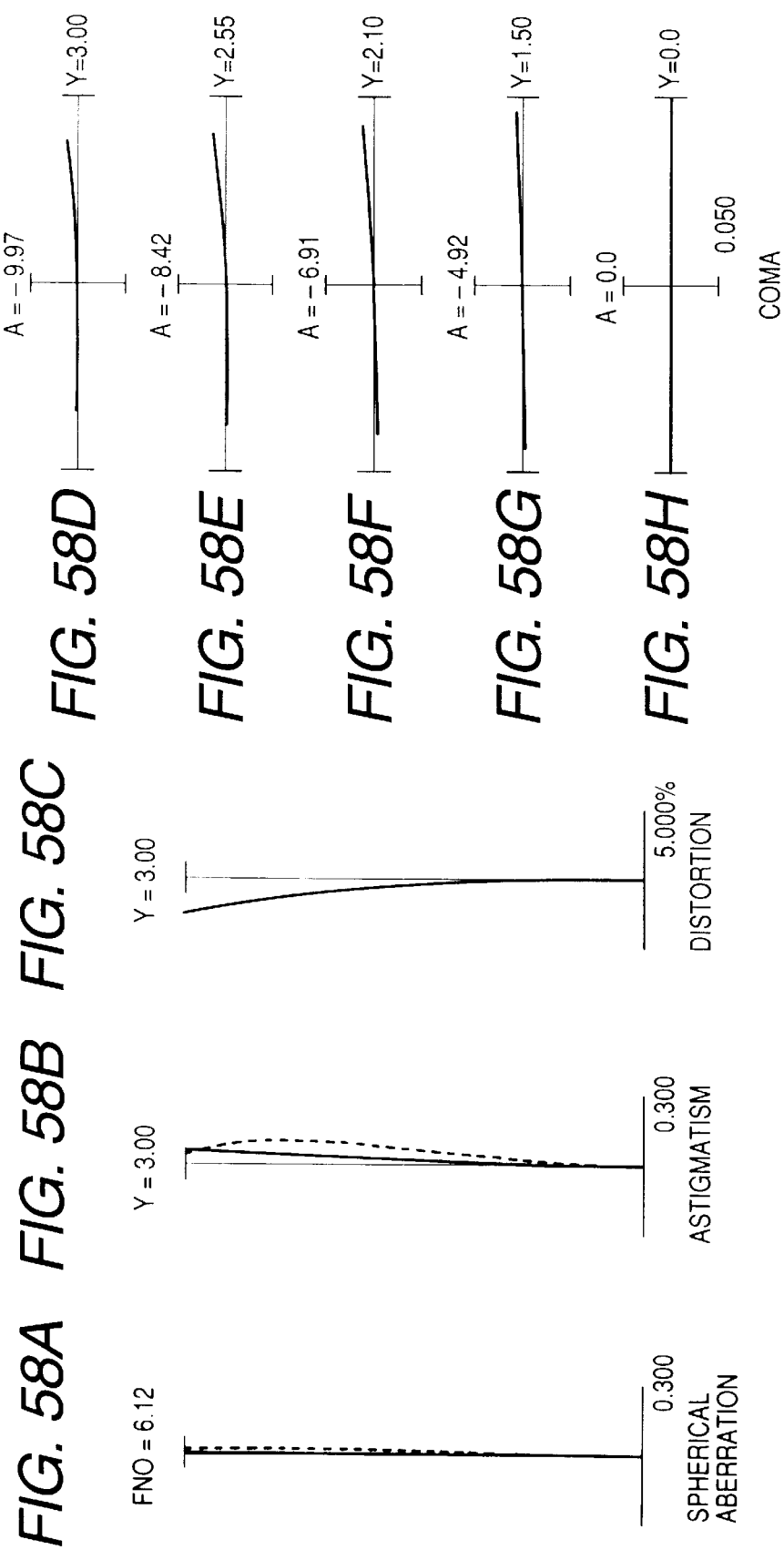

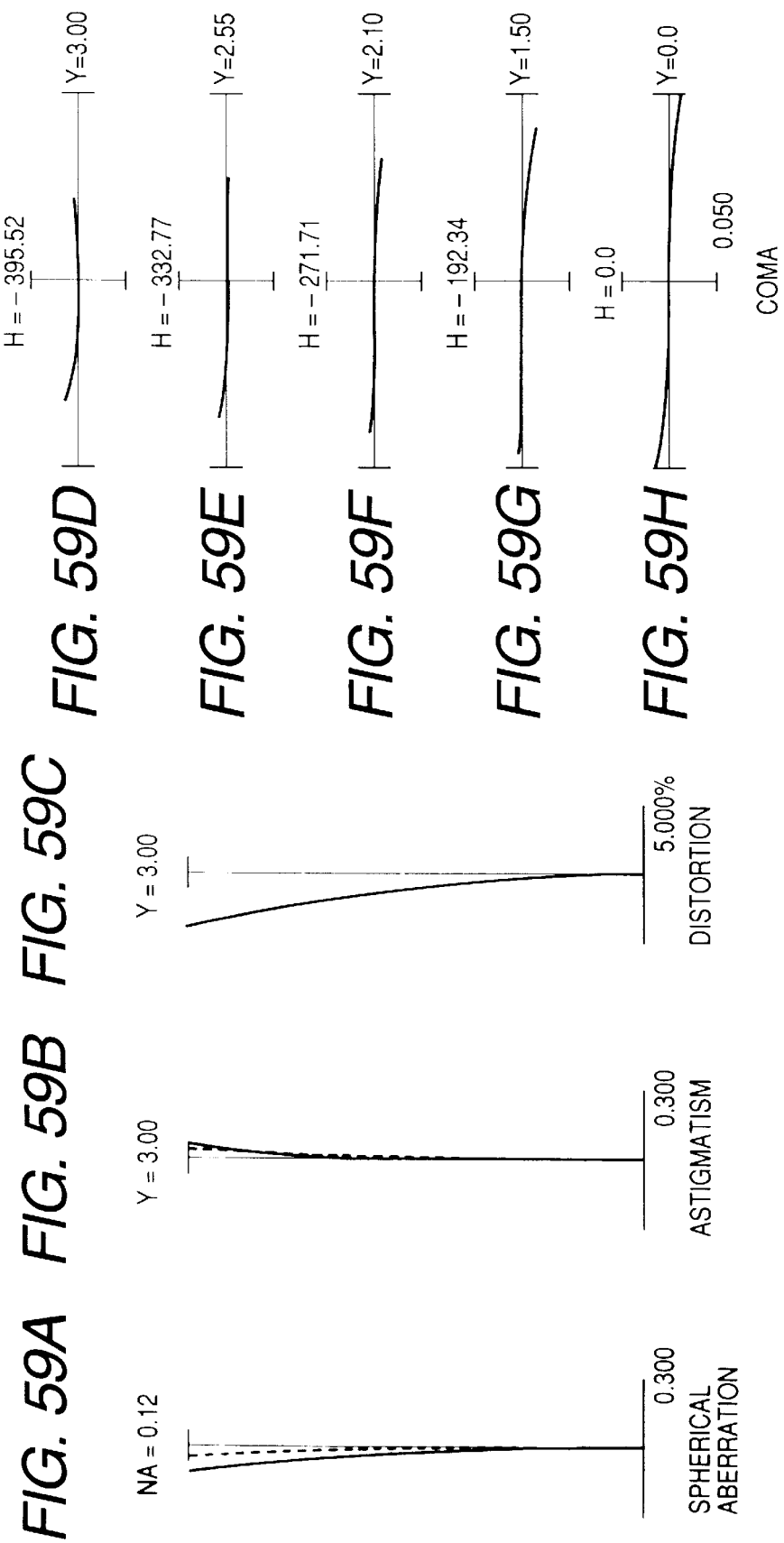

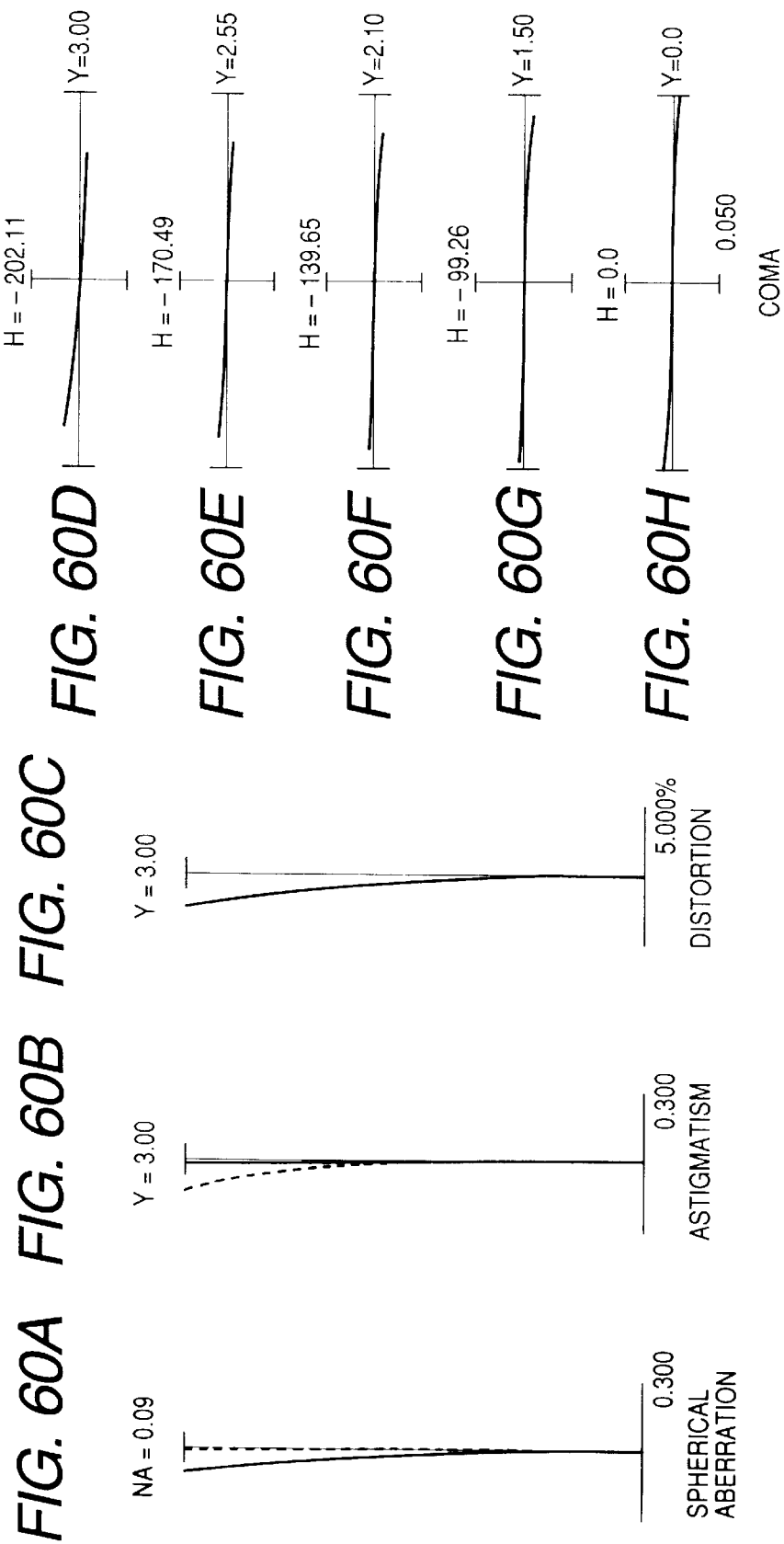

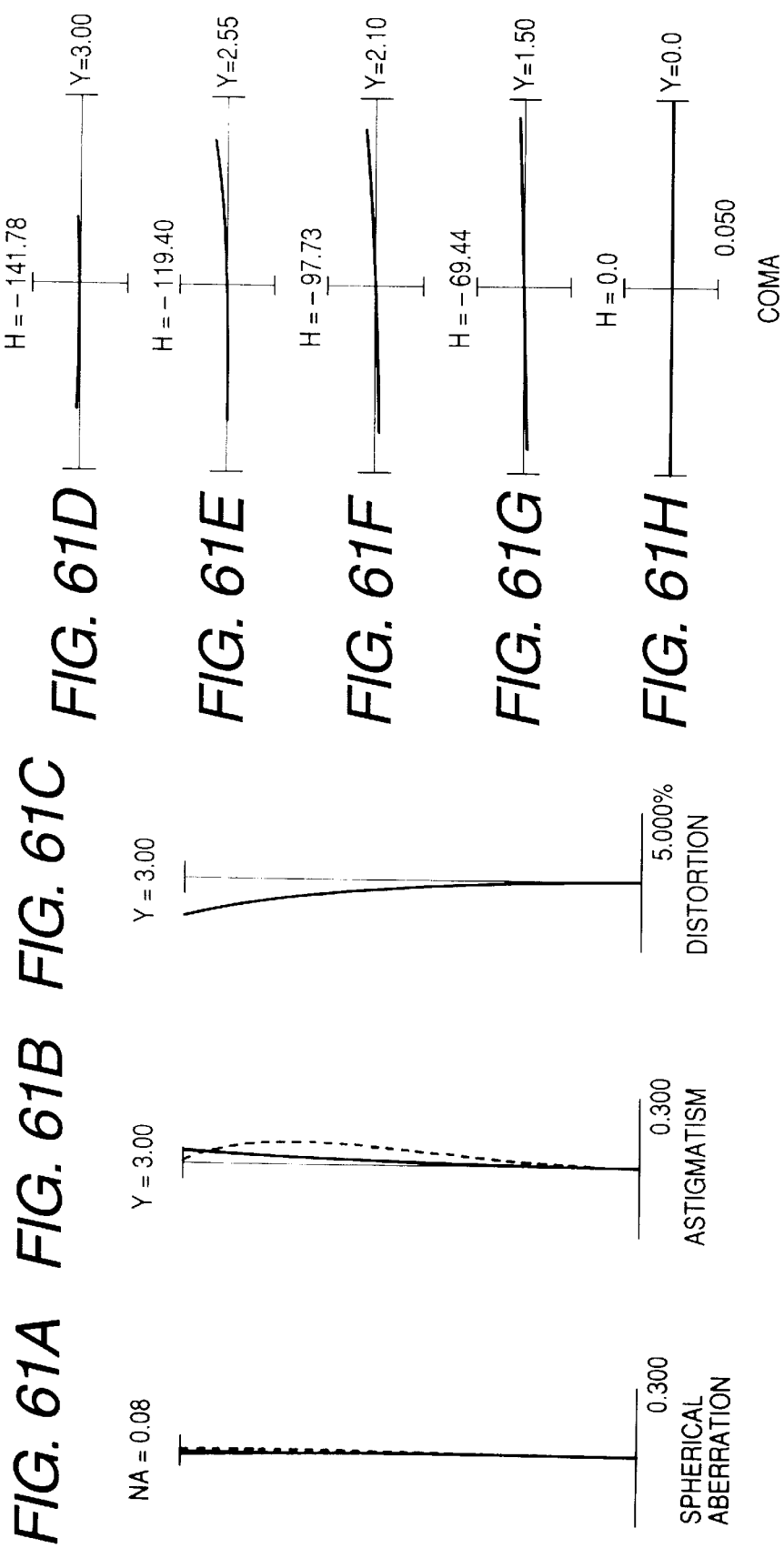

VARIABLE FOCAL LENGTH OPTICAL SYSTEM

CROSS-REFERENCE TO RELATED APPLICATION

This is a continuation-in-part of application Ser. No. 08/729,911 filed Oct. 15, 1996, now abandoned.

BACKGROUND OF THE INVENTION

1. Field of the Invention

The present invention relates to a compact variable focal length optical system and, more particularly, to a variable focal length system in which the exit pupil position is located at a far position with respect to the total lens length.

2. Related Background Art

In recent years, as lens-shutter cameras, digital still cameras, and the like, cameras with zoom lenses are popular, and in particular, camera having so-called zoom lenses with high zoom ratios of 3× or higher are becoming increasingly popular.

Such zoom lens with a high zoom ratio uses, in many cases, a so-called multi-unit zoom lens having three or more lens units which are movable when the focal length of the lens system is varied. Various proposals have been made concerning zoom lenses which have a field angle up to about 60°.

In these cameras, since a lens and a camera body are integrated unlike in lens exchangeable type single-lens reflex cameras, a size reduction of the lens system leads to that of the camera body, and various proposals have been made in association with zoom lenses suitable for a size reduction.

A zoom lens for a digital still camera uses a CCD as a photo sensor. The CCD has a microlens array immediately before its light-receiving element to enhance the collecting power. When the exit pupil position of the lens system is near the CCD, since a light beam that is to reach the peripheral portion of the frame is incident on the microlens array obliquely with respect to the optical axes of the respective lens surfaces of the microlens array, the light beam is focused by the microlens array at a position different from the light-receiving element. For this reason, the light amount becomes insufficient on the peripheral portion of the frame, and consequently, the optical design is restricted in that the exit pupil position of the lens system must be separated from the image plane.

For example, in an image-side telecentric optical system in which the exit pupil position is set at infinity position, the image position (i.e., exit pupil position) of a stop formed by a lens system located on the image side of the stop is located at infinity position. In order to shorten the distance from the stop to the CCD in such image-side telecentric optical system, the lens system on the image side of the stop must have a strong convergence effect, and the thickness, in the optical axis direction, of the lens system itself must be decreased. For this reason, such optical system is not suitable for a decrease in total lens length.

SUMMARY OF THE INVENTION

It is an object of the present invention to provide a variable focal length optical system which can solve the above-mentioned problems, and is suitable for a size reduction.

It is another object of the present invention to provide a compact variable focal length optical system in which the exit pupil position is separated from the image plane.

In order to achieve the above object, a variable focal length optical system according to the present invention comprises, in succession from an object side, a first lens unit having a negative refractive power, a second lens unit having a positive refractive power, a third lens unit having a negative refractive power, and a fourth lens unit having a positive refractive power, when a focal length of the entire lens system is changed while maintaining a constant image plane position, the second lens unit moves in an optical axis direction, the third lens unit moves in the optical axis direction to compensate for variations in image plane position upon movement of the second lens unit, and the first and fourth lens units are fixed in position in the optical axis direction, and an aperture stop is disposed at a position on an object side of a position closest to the image side of the third lens unit.

In order to achieve the above object, a variable focal length optical system according to the present invention comprises, in succession from an object side, a first lens unit having a negative refractive power, a second lens unit having a positive refractive power, a third lens unit having a negative refractive power, and a fourth lens unit having a positive refractive power, when a focal length of the entire lens system is changed while maintaining a constant image plane position, the second lens unit moves in an optical axis direction, the third lens unit moves in the optical axis direction to compensate for variations in image plane position upon movement of the second lens unit, and the first and fourth lens units are fixed in position in the optical axis direction, and each of the first to fourth lens units is constituted by not more than two lens elements.

In a preferred mode of the present invention, the third lens unit is constituted by a negative sub unit disposed on the object side, and a positive sub unit disposed on the image side of the negative sub unit, the negative sub unit includes at least one negative lens, and the positive sub unit includes at least one positive lens, the negative and positive sub units are disposed to be separated by a gap, and the third lens unit satisfies:

$$0.1 < n \cdot D/|f3| < 0.5 \quad (1)$$

where D is the thickness, in the optical axis direction, of the gap formed between the negative and positive sub units, n is the refractive index of a medium that fills the gap between the negative and positive sub units, and f3 is the focal length of the third lens unit.

In a preferred mode of the present invention, a positive lens is disposed at a position closest to the object side in the second lens unit, and the positive lens satisfies:

$$-0.6 < (r2a+r2b)/(r2a-r2b) < 0.4 \quad (2)$$

where r2a is the radius of curvature of a lens surface on the object side of the positive lens, and r2b is the radius of curvature of a lens surface on the image side of the positive lens.

In a preferred mode of the present invention, a negative lens is disposed at a position closest to the image side in the first lens unit, and the negative lens satisfies:

$$0.4 < (r1a-r1b)/(r1a+r1b) < 2.5 \quad (3)$$

where r1a is the radius of curvature of a lens surface on the object side of the negative lens, and r1b is the radius of curvature of a lens surface on the image side of the negative lens.

In a preferred mode of the present invention, the first lens unit moves in the optical system upon focusing.

In a preferred mode of the present invention, the optical system satisfies:

$$0.4 < f4/(fw \cdot ft)^{1/2} < 1.3 \tag{4}$$

where f4 is the focal length of the fourth lens unit, and fw and ft are the focal lengths of the entire lens system respectively in the maximum wide-angle state and the maximum telephoto state.

Further, in order to achieve the above objects, according to the present invention, there is provided a variable focal length optical system comprising, in succession from an object side, a first lens unit (G1) having a negative refractive power, a second lens unit (G2) having a positive refractive power, a third lens unit (G3) having a negative refractive power, and a fourth lens unit (G4) having a positive refractive power, wherein the first lens unit (G1) is fixed along an optical axis, and the second lens unit (G2) and the third lens unit (G3) move to the object side along the optical axis so as to decrease an air gap between the first lens unit (G1) and the second lens unit (G2), increase an air gap between the second lens unit (G2) and the third lens unit (G3), and increase an air gap between the third lens unit (G3) and the fourth lens unit (G4) when a focal length is changed from the shortest focal length state to the longest focal length state, and the entire lens system satisfies:

$$0.6 < (\beta 2T/\beta 2W)/(ft/fw) < 0.95 \tag{5}$$

where $\beta 2W$ is the lateral magnification of the second lens unit (G2) in the shortest local length state, $\beta 2T$ is the lateral magnification of the second lens unit (G2) in the longest focal length state, fw is the focal length of the entire lens system in the shortest focal length state, and ft is the focal length of the entire lens system in the longest focal length state.

According to a preferred mode of the present invention, the third lens unit (G3) comprises a negative lens sub-unit (G3N) disposed on the object side and having a negative refractive power, and a positive lens sub-unit (G3P) disposed on an image side of the negative lens sub-unit and having a positive refractive power, and the third lens unit (G3) satisfies:

$$0.3 < f3N/f3 < 0.6 \tag{6}$$

where f3N is the focal length of the negative lens sub-unit (G3N), and f3 is the focal length of the third lens unit (G3).

The second lens unit (G2) preferably comprises at least two positive lenses, and satisfies a condition: 0<np1−np2 where np1 is the refractive index of, of the positive lenses of the second lens unit (G2), a positive lens (Lp1) disposed on the object side with respect to a reference line, and np2 is the refractive index of, of the positive lenses of the second lens unit (G2), a positive lens (Lp2) disposed on the image side with respect to the reference line.

The above and other objects, features and advantages of the present invention will be explained hereinafter and may be better understood by reference to the drawings and the descriptive matter which follows.

BRIEF DESCRIPTION OF THE DRAWINGS

FIGS. 3A, 3B, 3C, 3D, 3E, 3F, 3G and 3H are graphs showing various aberrations upon focusing on an object at infinity position in the maximum wide-angle state in the first embodiment;

FIGS. 4A, 4B, 4C, 4D, 4E, 4F, 4G and 4H are graphs showing various aberrations upon focusing on an object at infinity position in the middle focal length state in the first embodiment;

FIGS. 5A, 5B, 5C, 5D, 5E, 5F, 5G and 5H are graphs showing various aberrations upon focusing on an object at infinity position in the maximum telephoto state in the first embodiment;

FIGS. 6A, 6B, 6C, 6D, 6E, 6F, 6G and 6H are graphs showing various aberrations in the maximum wide-angle state when the photographing magnification=−0.01× in the first embodiment;

FIGS. 7A, 7B, 7C, 7D, 7E, 7F, 7G and 7H are graphs showing various aberrations in the middle focal length state when the photographing magnification=−0.01× in the first embodiment;

FIGS. 8A, 8B, 8C, 8D, 8E, 8F, 8G and 8H are graphs showing various aberrations in the maximum telephoto state when the photographing magnification=−0.01× in the first embodiment;

FIGS. 10A, 10B, 10C, 10D, 10E, 10F, 10G and 10H are graphs showing various aberrations upon focusing on an object at infinity position in the maximum wide-angle state in the second embodiment;

FIGS. 11A, 11B, 11C, 11D, 11E, 11F, 11G and 11H are graphs showing various aberrations upon focusing on an object at infinity position in the middle focal length state in the second embodiment;

FIGS. 12A, 12B, 12C, 12D, 12E, 12F, 12G and 12H are graphs showing various aberrations upon focusing on an object at infinity position in the maximum telephoto state in the second embodiment;

FIGS. 13A, 13B, 13C, 13D, 13E, 13F, 13G and 13H are graphs showing various aberrations in the maximum wide-angle state when the photographing magnification=−0.01× in the second embodiment;

FIGS. 14A, 14B, 14C, 14D, 14E, 14F, 14G and 14H are graphs showing various aberrations in the middle focal length state when the photographing magnification=−0.01× in the second embodiment;

FIGS. 15A, 15B, 15C, 15D, 15E, 15F, 15G and 15H are graphs showing various aberrations in the maximum telephoto state when the photographing magnification=−0.01× in the second embodiment;

FIGS. 17A, 17B, 17C, 17D, 17E, 17F, 17G and 17H are graphs showing various aberrations upon focusing on an object at infinity position in the maximum wide-angle state in the third embodiment;

FIGS. 18A, 18B, 18C, 18D, 18E, 18F, 18G and 18H are graphs showing various aberrations upon focusing on an object at infinity position in the middle focal length state in the third embodiment;

FIGS. 19A, 19B, 19C, 19D, 19E, 19F, 19G and 19H are graphs showing various aberrations upon focusing on an object at infinity position in the maximum telephoto state in the third embodiment;

FIGS. 20A, 20B, 20C, 20D, 20E, 20F, 20G and 20H are graphs showing various aberrations in the maximum wide-angle state when the photographing magnification=−0.01× in the third embodiment;

FIGS. 21A, 21B, 21C, 21D, 21E, 21F, 21G and 21H are graphs showing various aberrations in the middle focal length state when the photographing magnification=−0.01× in the third embodiment;

FIGS. 22A, 22B, 22C, 22D, 22E, 22F, 22G and 22H are graphs showing various aberrations in the maximum telephoto state when the photographing magnification=−0.01× in the third embodiment;

FIGS. 24A, 24B, 24C, 24D, 24E, 24F, 24G and 24H are graphs showing various aberrations upon focusing on an object at infinity position in the maximum wide-angle state in the fourth embodiment;

FIGS. 25A, 25B, 25C, 25D, 25E, 25F, 25G and 25H are graphs showing various aberrations upon focusing on an object at infinity position in the middle focal length state in the fourth embodiment;

FIGS. 26A, 26B, 26C, 26D, 26E, 26F, 26G and 26H are graphs showing various aberrations upon focusing on an object at infinity position in the maximum telephoto state in the fourth embodiment;

FIGS. 27A, 27B, 27C, 27D, 27E, 27F, 27G and 27H are graphs showing various aberrations in the maximum wide-angle state when the photographing magnification=−0.01× in the fourth embodiment;

FIGS. 28A, 28B, 28C, 28D, 28E, 28F, 28G and 28H are graphs showing various aberrations in the middle focal length state when the photographing magnification=−0.01× in the fourth embodiment;

FIGS. 29A, 29B, 29C, 29D, 29E, 29F, 29G and 29H are graphs showing various aberrations in the maximum telephoto state when the photographing magnification=−0.01× in the fourth embodiment;

FIGS. 30A, 30B, 30C, 30D, 30E, 30F, 30G and 30H are graphs showing various aberrations in the maximum wide-angle state when the photographing magnification=−0.01× in the fifth embodiment;

FIGS. 31A, 31B, 31C, 31D, 31E, 31F, 31G and 31H are graphs showing various aberrations in the middle focal length state when the photographing magnification=−0.01× in the fifth embodiment;

FIGS. 32A, 32B, 32C, 32D, 32E, 32F, 32G and 32H are graphs showing various aberrations in the maximum telephoto state when the photographing magnification=−0.01× in the fifth embodiment;

FIGS. 35A, 35B, 35C, 35D, 35E, 35F, 35G and 35H are graphs showing various aberrations upon focusing on an object at infinity position in the maximum wide-angle state in the sixth embodiment;

FIGS. 36A, 36B, 36C, 36D, 36E, 36F, 36G and 36H are graphs showing various aberrations upon focusing on an object at infinity position in the middle focal length state in the sixth embodiment;

FIGS. 37A, 37B, 37C, 37D, 37E, 37F, 37G and 37H are graphs showing various aberrations upon focusing on an object at infinity position in the maximum telephoto state in the sixth embodiment;

FIGS. 38A, 38B, 38C, 38D, 38E, 38F, 38G and 38H are graphs showing various aberrations in the maximum wide-angle state when the photographing magnification=−0.01× in the sixth embodiment;

FIGS. 39A, 39B, 39C, 39D, 39E, 39F, 39G and 39H are graphs showing various aberrations in the middle focal length state when the photographing magnification=−0.01× in the sixth embodiment;

FIGS. 40A, 40B, 40C, 40D, 40E, 40F, 40G and 40H are graphs showing various aberrations in the maximum telephoto state when the photographing magnification=−0.01× in the sixth embodiment;

FIGS. 42A, 42B, 42C, 42D, 42E, 42F, 42G and 42H are graphs showing various aberrations upon focusing on an object at infinity position in the maximum wide-angle state in the seventh embodiment;

FIGS. 43A, 43B, 43C, 43D, 43E, 43F, 43G and 43H are graphs showing various aberrations upon focusing on an object at infinity position in the middle focal length state in the seventh embodiment;

FIGS. 44A, 44B, 44C, 44D, 44E, 44F, 44G and 44H are graphs showing various aberrations upon focusing on an object at infinity position in the maximum telephoto state in the seventh embodiment;

FIGS. 45A, 45B, 45C, 45D, 45E, 45F, 45G and 45H are graphs showing various aberrations in the maximum wide-angle state when the photographing magnification=−0.01× in the seventh embodiment;

FIGS. 46A, 46B, 46C, 46D, 46E, 46F, 46G and 46H are graphs showing various aberrations in the middle focal length state when the photographing magnification=−0.01× in the seventh embodiment;

FIGS. 47A, 47B, 47C, 47D, 47E, 47F, 47G and 47H are graphs showing various aberrations in the maximum telephoto state when the photographing magnification=−0.01× in the seventh embodiment;

FIGS. 49A, 49B, 49C, 49D, 49E, 49F, 49G and 49H are graphs showing various aberrations upon focusing on an object at infinity position in the maximum wide-angle state in the eighth embodiment;

FIGS. 50A, 50B, 50C, 50D, 50E, 50F, 50G and 50H are graphs showing various aberrations upon focusing on an object at infinity position in the middle focal length state in the eighth embodiment;

FIGS. 51A, 51B, 51C, 51D, 51E, 51F, 51G and 51H are graphs showing various aberrations upon focusing on an object at infinity position in the maximum telephoto state in the eighth embodiment;

FIGS. 52A, 52B, 52C, 52D, 52E, 52F, 52G and 52H are graphs showing various aberrations in the maximum wide-angle state when the photographing magnification=−0.01× in the eighth embodiment;

FIGS. 53A, 53B, 53C, 53D, 53E, 53F, 53G and 53H are graphs showing various aberrations in the middle focal length state when the photographing magnification=−0.01× in the eighth embodiment;

FIGS. 54A, 54B, 54C, 54D, 54E, 54F, 54G and 54H are graphs showing various aberrations in the maximum telephoto state when the photographing magnification=−0.01× in the eighth embodiment;

FIGS. 56A, 56B, 56C, 56D, 56E, 56F, 56G and 56H are graphs showing various aberrations upon focusing on an object at infinity position in the maximum wide-angle state in the ninth embodiment;

FIGS. 57A, 57B, 57C, 57D, 57E, 57F, 57G and 57H are graphs showing various aberrations upon focusing on an object at infinity position in the middle focal length state in the ninth embodiment;

FIGS. 58A, 58B, 58C, 58D, 58E, 58F, 58G and 58H are graphs showing various aberrations upon focusing on an object at infinity position in the maximum telephoto state in the ninth embodiment;

FIGS. 59A, 59B, 59C, 59D, 59E, 59F, 59G and 59H are graphs showing various aberrations in the maximum wide-angle state when the photographing distance=0.8 m in the ninth embodiment;

FIGS. 60A, 60B, 60C, 60D, 60E, 60F, 60G and 60H are graphs showing various aberrations in the middle focal length state when the photographing distance=0.8 m in the ninth embodiment; and FIGS. 61A, 6B, 61C, 61D, 61E, 61F, 61G and 61H are graphs showing various aberrations in the maximum telephoto state when the photographing distance=0.8 m in the ninth embodiment.

DETAILED DESCRIPTION OF THE PREFERRED EMBODIMENTS

Figure 1:
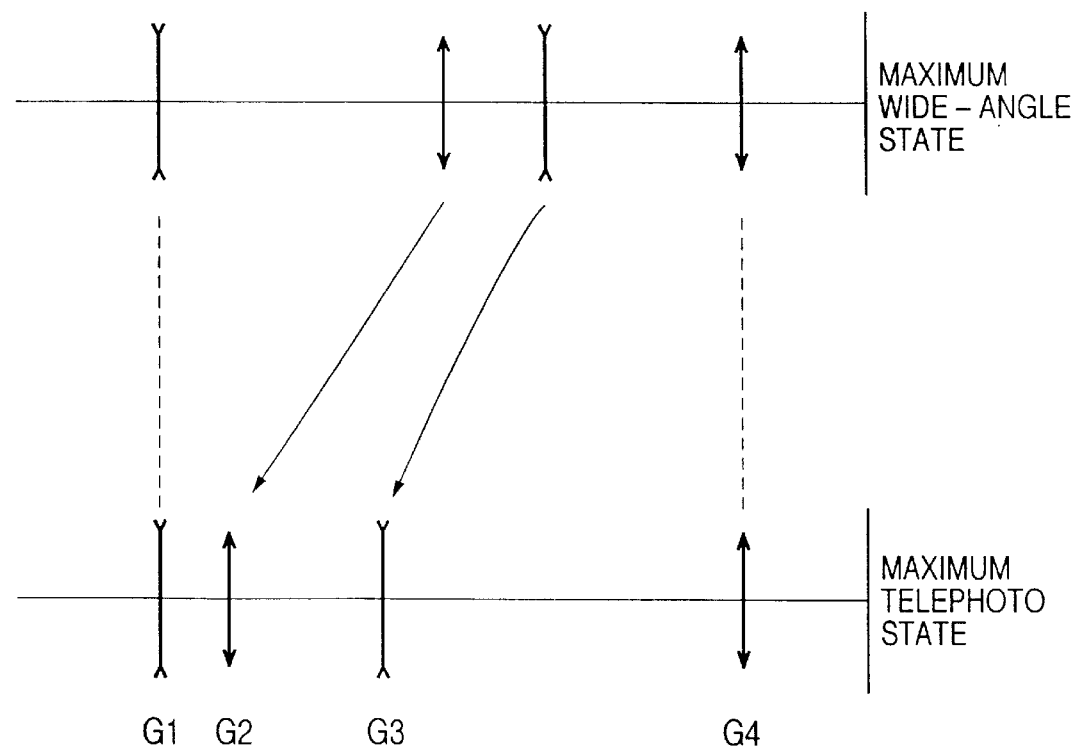
FIG. 1 is a schematic view showing the refractive power arrangement of a variable focal length optical system according to the first to fifth embodiments of the present invention.

In general, zoom lenses are roughly classified into a zoom lens in which a lens unit disposed at a position closest to the image side has a positive refractive power, and a zoom lens in which this lens unit has a negative refractive power (however, when a lens unit that does not positively contribute to an effect of varying the focal length is added, such zoom lens is classified depending on the lens unit disposed on the object side of such lens unit).

In the former one of these two types of zoom lenses, the exit pupil position is separated from the image plane, while in the former one, the exit pupil position is near the image plane. As examples of the latter zoom lens, zoom lenses suitable for a lens-shutter camera such as positive, negative type zoom lens, a positive, positive, negative type zoom lens, and the like are known.

In these positive, negative type and positive, positive, negative type zoom lenses, in order to decrease the lens diameter and to shorten the total lens length, a negative lens unit is disposed at a position closest to the image side in the lens system to shorten the back focus in the maximum wide-angle state, so that an off-axis light flux that passes through the negative lens unit separates from the optical axis as the field angle changes, thereby independently correcting on-axis and off-axis aberrations. In addition, a change in back focus upon varying the focal length of the lens system from the maximum wide-angle state to the maximum telephoto state is increased to change the height of an off-axis light flux that passes through the negative lens unit upon varying the focal length of the lens system, thereby suppressing variations in off-axis aberration upon varying the focal length of the system, and obtaining good imaging performance.

Since such zoom lens in which a negative lens unit is disposed at a position closest to the image side has a short back focus in the maximum wide-angle state, the exit pupil position is close to the image plane position. Therefore, when an image is recorded by a photo sensor comprising a microlens array, the number of light rays that can reach the surface of the photo sensor decreases as the image height becomes larger, and an insufficient light amount poses a problem.

Furthermore, since the negative lens unit at the position closest to the image side has a large moving amount upon varying the focal length of the lens system, the moving amount of the exit pupil position is also large. For this reason, it is difficult to set the exit pupil position at an appropriate position free from any eclipse caused by the microlens array over the entire variable focal length range.

On the other hand, the zoom lens in which a positive lens unit is disposed at a position closest to the image side is roughly classified into a positive front type lens system in which a lens unit having a positive refractive power is disposed at a position closest to the object side, and a negative front type lens system in which a lens unit having a negative refractive power is disposed at a position closest to the object side. For example, as the positive front type lens system, a positive, negative, positive, positive lens system, a positive, negative, negative, positive lens system, and the like are known. On the other hand, as the negative front type lens system, a negative, positive, negative, positive lens system is known.

Of the positive front type zoom lenses, a zoom lens having a positive lens which is disposed at a position closest to the image side and is fixed in position while varying the focal length of the system, and including an aperture stop is especially suitable for a TV camera in which the exit pupil position is nearly set at infinity position, and a three-color separation prism is disposed behind the lens system, since such zoom lens is free from any variations in exit pupil position upon varying the focal length of the lens system. Note that a lens system in which the exit pupil position is nearly set at infinity position is called an image-side telecentric optical system.

However, when such image-side telecentric optical system is formed, no degree of freedom in optical design is allowed due to too many restrictions on the optical design, thus requiring a large number of constituting lens elements or increasing the size of the lens system. Hence, it is difficult to attain a compact optical system.

Furthermore, in the case of the positive front type zoom lens, since light rays which are once converged by the first lens unit undergo a strong divergent effect by the second lens unit, either the first lens unit must have a strong convergence effect or the second lens unit must have a weak convergence effect so as to shorten the total lens length. However, in the former case, since an off-axis light flux that passes through the first lens unit separates from the optical axis in the maximum wide-angle state, the lens diameter is hard to decrease. In the latter case, since an off-axis light flux that passes through the second lens unit separates from the optical axis, an off-axis light flux that passes through the first lens unit also separates from the optical axis, and consequently, it is difficult to decrease the lens diameter again. Furthermore, when an off-axis light flux that passes through the second lens unit separates from the optical axis, it becomes difficult to correct off-axis aberration, resulting in variations in coma depending on the field angle.

As described above, in a so-called positive front type zoom lens which has a positive lens unit at a position closest to the object side, a decrease in lens diameter is limited.

On the other hand, as a so-called negative front type negative, positive, negative, positive type zoom lens which has a negative lens unit at a position closest to the object side, a zoom lens disclosed in, e.g., Japanese Laid-Open Patent Application No. 63-281113 is known. However, since a zoom lens disclosed in this reference has a large number of constituting lens elements, the total lens length is very large as compared to the focal length, and it is impossible to attain a size reduction.

Therefore, a variable focal length optical system according to an embodiment of the present invention comprises, in succession from an object side, a first lens unit having a negative refractive power, a second lens unit having a positive refractive power, a third lens unit having a negative refractive power, and a fourth lens unit having a positive refractive power, and when the focal length of the lens system is varied from the maximum wide-angle state corresponding to the shortest focal length state of the entire lens system to the maximum telephoto state corresponding to the longest focal length state of the lens system, the second and third lens units move toward the object side, so that the gap between the first and second lens units decreases, the gap between the second and third lens units increases, and the gap between the third and fourth lens units increases.

In the variable focal length optical system according to the embodiment of the present invention, in addition to the above-mentioned arrangement, the respective lens units serve to satisfy the following three conditions, so as to achieve a compact zoom lens in which the exit pupil position is separated from the image plane.

(I) The first and fourth lens units are fixed in position when the focal length of the lens system is varied.

(II) The second lens unit is moved toward the object side when the focal length of the lens system is varied from the maximum wide-angle state to the maximum telephoto state.

(III) An aperture stop is inserted in the third lens unit or at a position on the object side of the third lens unit.

In the variable focal length optical system according to the embodiment of the present invention, the fourth lens unit disposed at the position closest to the image side in the lens system is a positive lens unit so as to separate the exit pupil position from the image plane position, as described above.

Note that the exit pupil position can be separated from the image plane position on either the object or image side. When the exit pupil position is located on the object side of the image plane, a principal ray reaches the image plane position as they separate from the optical axis; when the exit pupil position is located on the image side of the image plane, a principal ray reaches the image plane position as they approach the optical axis. Therefore, an exit pupil position separated from the image means that the principal ray leaving the lens system makes a small angle with the optical axis.

In the variable focal length optical system according to the embodiment of the present invention, since a principal ray leaves the fourth lens unit in a state nearly parallel to the optical axis, an off-axis light flux passes through the fourth lens unit at a position separated from the optical axis, and hence, the lens diameter tends to increase.

In view of this problem, since the fourth lens unit is fixed in position in the optical axis direction upon varying the focal length of the system, the lens holding mechanism can be simplified, thus realizing a size reduction of the lens barrel.

Since the first lens unit has a negative refractive power, the variable focal length optical system according to the embodiment of the present invention can obtain a sufficiently long back focus even in the maximum wide-angle state in which the focal length of the lens system is shortest. Furthermore, since an off-axis light flux that passes through the first lens unit approaches the optical axis, the lens diameter can be decreased.

In the variable focal length optical system according to the embodiment of the present invention, since the first lens unit is disposed at a position farthest from the image plane position, an off-axis light flux that passes through the first lens unit tends to separate from the optical axis, resulting in a large lens diameter.

However, in the variable focal length optical system according to the embodiment of the present invention, since the first lens unit is fixed in position in the optical axis direction upon varying the focal length of the lens system unlike in a conventional negative, positive, negative, positive type zoom lens that moves the first lens unit toward the object side upon varying the focal length of the lens system from the maximum telephoto state to the maximum wide-angle state, an off-axis light flux that passes through the first lens unit does not largely separate from the optical axis in the maximum wide-angle state. Therefore, the lens diameter of the first lens unit can be prevented from being increased, thus achieving both a decrease in lens diameter and a further size reduction of the lens barrel.

According to another aspect, when the first lens unit which is fixed in position upon varying the focal length of the lens system is used as a focusing unit, since the lens driving amount upon focusing is determined depending only on the object distance independently of the focal length of the lens system, the variable focal length optical system according to the embodiment of the present invention can obtain a maximum effect in simplifying the lens barrel structure when the first lens unit is used as a focusing unit.

Based on the above discussion, condition (I) is necessary.

In the variable focal length optical system according to the embodiment of the present invention, a negative lens unit is disposed at a position closest to the object side in the lens system. In order to attain a short total lens length, since the total lens length must be shortened in the maximum telephoto state, the second lens unit having a strong convergence effect is brought close to the first lens unit in the maximum telephoto state so as to obtain a positive synthetic refractive power. On the other hand, in the maximum wide-angle state, the gap between the first and second lens unit is sufficiently broadened to obtain a sufficiently long back focus.

Therefore, it is preferable that the second lens unit be moved from the image side to the object side upon varying the focal length of the system from the maximum wide-angle state to the maximum telephoto state, and hence, condition (II) is required.

In an image-side telecentric optical system, light rays emerging from the central position of the stop must be collimated by a lens system disposed on the image side of the stop, i.e., the stop is disposed at an object-side focal point position obtained when the lens system disposed on the image side of the stop is placed in the reverse direction.

Therefore, in order to make the stop position approach the image plane and to make the exit pupil position separate from the image plane, it is required to:

(A) shorten the focal length of the lens system disposed on the image side of the stop; or (B) arrange the lens system disposed on the image side of the stop so that a positive, negative telephoto lens is disposed in the reverse direction, i.e., this lens system becomes a telephoto lens when viewed from the image side.

In case (A), since the lens system disposed on the image side of the stop must have a large lens diameter, and aberration correction becomes hard to attain, the number of constituting lens elements increases extremely, thus disturbing a size reduction.

Therefore, in the variable focal length optical system according to the embodiment of the present invention, the third and fourth lens units as the lens system disposed on the image side of the stop are arranged, so that a telephoto lens is placed in the reverse direction, as in case (B). As described above, when the telephoto lens is placed in the reverse direction, i.e., when the above-mentioned lens system is viewed from the image side, it has a positive, negative arrangement, and hence, the total lens length can be shortened in proportion to the focal length of the lens system disposed on the image side of the stop.

As described above, in the variable focal length optical system according to the embodiment of the present invention, since the third lens unit having a negative refractive power and the fourth lens unit having a positive refractive power are disposed from the aperture stop toward the image side, the exit pupil position can be separated from the image plane position while shortening the total lens length.

In other words, in the variable focal length optical system according to the embodiment of the present invention, when the stop is disposed in the third lens unit or on the object side of the third lens unit, the exit pupil position separates from the image plane position, and hence, condition (III) is necessary.

In the present invention, if condition (IV) as follows is satisfied, good imaging performance can be obtained even when the object position changes from infinity position to a near distance.

(IV) The lateral magnification of a third lens unit G3 is set to a proper value.

Conventionally, various focusing methods of zoom lenses have been proposed. If the inner focus (IF) method or the rear focus (RF) method is used, a lens unit having a small lens diameter, a lens unit having a small moving amount, or a lens unit fixed in position in the optical axis direction upon varying the focal length of the lens system can be selected as a focusing unit (lens unit which moves in focusing). That is, a lens unit in which the optical performance hardly varies upon focusing can be used as a focusing unit to increase the degree of freedom in optical design.

In the present invention, the inner focus method or the rear focus method in which the driving mechanism of the focusing unit can be downsized is preferably adopted. Accordingly, a compact camera main body can be realized even upon incorporating the variable focal length optical system of the present invention into the camera main body. If a change in lateral magnification upon varying the focal length of the lens unit serving as a focusing unit is set to a proper value, changes in lens unit positional precision of the focusing unit caused upon varying the focal length of the lens system can be minimized to increase the variable focal length efficiency.

In the present invention, the focal length desirably changes over the variable focal length range of the maximum wide-angle state to the maximum telephoto state such that the lateral magnification β of the focusing unit does not include a position where $|\beta|=1$ holds, and the lateral magnification β of the focusing unit does not have an extremum with respect to the focal length.

In recent years, cameras having autofocus functions are becoming popular. In a camera of this type, since the focusing unit is electrically controlled by a driving mechanism such as a motor, the moving amount of the focusing unit must be small, and the focusing unit must be lightweight.

Conditions for suppressing the moving amount of the focusing unit small will be explained.

If δ is the moving amount of an object image by a lens unit disposed closer to the object side than the focusing unit, and β is the lateral magnification of the focusing unit, then the moving amount Δ of the focusing unit is generally given by equation (a):

$$\Delta = [\beta^2/(\beta^2-1)] \cdot \delta \qquad (a)$$

Letting $k=\beta^2/(\beta^2-1)$, the relationship given by formulas (b) and (c) is established:

$$1 \leq k (\beta^2 > 1) \qquad (b)$$

$$0 > k (\beta^2 < 1) \qquad (c)$$

To suppress the moving amount of the focusing unit small, therefore, 1/β must be set near to 0 for $|\beta|>1$, and β must be set near to 0 for $|\beta|<1$.

Conditional formulas will be explained below.

In the variable focal length optical system according to the embodiment of the first aspect of the present invention, the third lens unit is preferably constituted by a negative sub unit which is disposed on the object side and includes at least one negative lens, and a positive sub unit which is disposed on the image side of the negative sub unit to be separated by a given gap and includes at least one positive lens, and preferably satisfies:

$$0.1 < n \cdot D/|f3| < 0.5 \qquad (1)$$

where D is the thickness, in the optical axis direction, of the gap formed between the negative and positive sub units, n is the refractive index of a medium that fills the gap between the negative and positive sub units, and f3 is the focal length of the third lens unit.

Conditional formula (1) defines the gap between the negative and positive sub units that constitute the third lens unit.

When $n \cdot D/|f3|$ exceeds the upper limit value of conditional formula (1), since the refractive powers of the negative and positive sub units weaken, the exit pupil position approaches the image plane position in the maximum wide-angle state, thus generating eclipse of light rays by the microlens array.

On the contrary, when $n \cdot D/|f3|$ is smaller than the lower limit value of conditional formula (1), the performance considerably deteriorates due to decentering of the negative and positive sub units with respect to each other.

In particular, in the variable focal length optical system according to the embodiment of the present invention, since the third lens unit is disposed near the stop, it is preferable that the third lens unit be constituted by the negative sub unit consisting of at least one negative lens and the positive sub unit consisting of at least one positive lens so as to satisfactorily correct on-axis aberration, and especially, the positive sub unit be disposed on the image side of the negative sub unit so as to satisfactorily correct variations in coma depending on the field angle in the maximum wide-angle state. With this arrangement, since an off-axis light flux undergoes a divergence effect in the negative sub unit, an off-axis light flux that passes through the positive sub unit can be separated from the optical axis, and variations in coma depending on the field angle can become easy to correct. In order to attain higher performance, the upper limit value is preferably set to be 0.4.

In the variable focal length optical system according to the embodiment of the present invention, a positive lens is preferably disposed at a position closest to the object side in the second lens unit, and at this time, the positive lens preferably satisfies the following conditional formula (2):

$$-0.6<(r2a+r2b)/(r2a-r2b)<0.4 \qquad (2)$$

Since an on-axis light flux is diverged by the first lens unit, and then enters the second lens unit, the positive lens is preferably disposed at a position closest to the object side in the second lens unit so as to shorten the total lens length.

Conditional formula (2) defines the bending shape of the positive lens.

When $(r2a+r2b)/(r2a-r2b)$ exceeds the upper limit value of conditional formula (2), lower coma correction in the maximum wide-angle state becomes insufficient, and hence, good imaging performance cannot be maintained.

Conversely, when $(r2a+r2b)/(r2a-r2b)$ is smaller than the lower limit value of conditional formula (2), negative spherical aberration generated in the second lens unit is hard to correct by a small number of constituting lens elements.

Furthermore, in the variable focal length optical system according to the embodiment of the present invention, a negative lens is preferably disposed at a position closest to the object side in the first lens unit, and preferably satisfies the following conditional formula (3):

$$0.4<(r1a-r1b)/(r1a+r1b)<2.5 \qquad (3)$$

When an off-axis light flux that passes through the first lens unit separates from the optical axis, variations in coma depending on the field angle become large due to an increase in lens diameter or excessive correction of lower coma. To solve this problem, the negative lens is preferably disposed at the position closest to the object side in the first lens unit so as to make an off-axis light flux that passes through the first lens unit draw near to the optical axis.

Conditional formula (3) defines the bending shape of the negative lens.

When $(r1a-r1b)/(r1a+r1b)$ exceeds the upper limit value of conditional formula (3), since the curvature of the lens surface on the object side of the negative lens becomes negative and strong, coma is excessively corrected, and it becomes difficult to maintain good imaging performance.

Conversely, when $(r1a-r1b)/(r1a+r1b)$ is smaller than the lower limit value of conditional formula (3), generation of off-axis aberration can be suppressed, but positive spherical aberration cannot be corrected. For this reason, good imaging performance cannot be maintained.

In the variable focal length optical system according to the embodiment of the present invention, as described above, when the first lens unit which is fixed in position upon varying the focal length of the lens system is used as a focusing unit, the lens driving amount with respect to an identical object remains the same irrespective of the focal length state in the variable focal length range, resulting in easy control.

In the variable focal length optical system according to the embodiment of the present invention, the fourth lens unit preferably satisfies conditional formula (4) below to obtain good imaging performance even on the peripheral portion of the frame:

$$0.5<f4/(fw\cdot ft)^{1/2}<1.3 \qquad (4)$$

When $f4/(fw\cdot ft)^{1/2}$ exceeds the upper limit value of conditional formula (4), upper coma is considerably generated in the fourth lens unit. For this reason, it becomes difficult to constitute the fourth lens unit by a small number of constituting lens elements. An increase in the number of constituting lens elements is not preferable since the thickness in the optical axis direction becomes very large.

In the variable focal length optical system according to the embodiment of the second aspect of the present invention, the following conditional formula (5) is satisfied:

$$0.6<(\beta 2T/\beta 2W/(ft/fw)<0.95 \qquad (5)$$

where $\beta 2W$: the lateral magnification of a second lens unit G2 in the shortest focal length state $\beta 2T$: the lateral magnification of the second lens unit G2 in the longest focal length state fw: the focal length of the entire lens system in the shortest focal length state ft: the focal length of the entire lens system in the longest focal length state ft/fw: the zoom ratio of the variable focal length optical system Conditional formula (5) defines the change amount of the lateral magnification of the second lens unit G2 upon varying the focal length of the lens system.

When the change amount exceeds the upper limit value of conditional formula (5), on-axis aberration greatly varies upon varying the focal length of the lens system, and good imaging performance cannot be obtained.

To the contrary, when the change amount is smaller than the lower limit value of conditional formula (5), the change amount of the lateral magnification of the third lens unit G3 increases, off-axis aberration generated in the third lens unit G3 upon varying the focal length of the lens system greatly varies, and good imaging performance cannot be obtained.

In the variable focal length optical system according to the embodiment of the second aspect of the present invention, to correct positive spherical aberration generated in the third lens unit G3, the third lens unit G3 is desirably constituted by a positive lens sub-unit G3P made up of at least one lens and having a positive refractive power, and a negative lens sub-unit G3N made up of at least one lens and having a negative refractive power. In this case, to satisfy condition (III) described above, the positive lens sub-unit G3P is preferably disposed on the image side of the negative lens sub-unit G3N, and the third lens unit G3 preferably satisfies conditional formula (6):

$$0.3<f3N/f3<0.6 \qquad (6)$$

where f3N: the focal length of the negative lens sub-unit G3N f3: the focal length of the third lens unit G3

Conditional formula (6) defines a proper range of the focal length f3N of the negative lens sub-unit G3N constituting the third lens unit G3.

When the focal length exceeds the upper limit value of conditional formula (6), the position of an aperture stop is difficult to bring near to the image plane while keeping the exit pupil position within a predetermined positional range, resulting in a large lens system.

To the contrary, when the focal length is smaller than the lower limit value of conditional formula (6), the divergent effect by the negative lens sub-unit G3N is strengthened, and the focal length of the positive lens sub-unit G3P is also shortened. As a result, the performance considerably deteriorates due to decentering of the negative and positive lens sub-units G3N and G3P with respect to each other.

In the variable focal length optical system according to the embodiment of the second aspect of the present invention, the second lens unit G2 converges light rays diverged by a first lens unit G1. To shorten the total lens length, the positive refractive power of the second lens unit G2 must be set strong. In this case, the lateral magnification of the second lens unit G2 greatly changes upon varying the focal length of the lens system. To satisfactorily correct negative spherical aberration generated in only the second lens unit G2, and suppress variations in various aberrations upon varying the focal length, at least two positive lenses are preferably disposed in the second lens unit G2, and the second lens unit G2 preferably satisfies conditional formula (7):

$$0 < np1 - np2 \qquad (7)$$

where np1: the refractive index of, of the positive lenses in the second lens unit G2, a positive lens Lp1 disposed on the object side with respect to the reference line np2: the refractive index of, of the positive lenses in the second lens unit G2, a positive lens Lp2 disposed on the image side with respect to the reference line When the refractive index is lower than the lower limit value of conditional formula (7), negative spherical aberration is difficult to satisfactorily correct.

In the variable focal length optical system according to the embodiment of the second aspect of the present invention, to shorten the total lens length in the maximum telephoto state while maintaining a sufficient back focus in the maximum wide-angle state, the lens system preferably satisfies conditional formula (8):

$$0.2 < f2/f4 < 0.5 \qquad (8)$$

where f2: the focal length of the second lens unit G2 f4: the focal length of a fourth lens unit G4

When the focal length exceeds the upper limit value of conditional formula (8), if the positive refractive power of the second lens unit G2 strengthens, negative spherical aberration cannot be satisfactorily corrected. If the positive refractive power of the fourth lens unit G4 weakens, the exit pupil position in the maximum wide-angle state approaches the image plane position, thus generating eclipse of light rays by the microlens array.

To the contrary, when the focal length is smaller than the lower limit value of conditional formula (8), the moving amount of the second lens unit G2 required to obtain a predetermined zoom ratio increases, and the first lens unit G1 is difficult to fix while the focal length is varied.

In the variable focal length optical system according to the embodiment of the second aspect of the present invention, focusing is desirably performed by moving the third or fourth lens unit G3 or G4 along the optical axis in changing the position of an object from infinity position to a near distance, and the lateral magnification of the third lens unit G3 desirably satisfies conditional formula (9):

$$1/(\beta 3T \cdot \beta 3W) < 0.2 \qquad (9)$$

where

β3W: the lateral magnification of the third lens unit G3 in the shortest focal length state β3T: the lateral magnification of the third lens unit G3 in the longest focal length state When the lateral magnification of the third lens unit G3 exceeds the upper limit value of conditional formula (9), even if the third or fourth lens unit G3 or G4 is used as a focusing lens, the focusing driving amount necessary for focusing becomes large. As a result, the lens system cannot be downsized, and the driving mechanism of the focusing lens is complicated.

According to another aspect of the present invention, in the embodiment of the present invention, since the second and third lens units having a strong refractive power are constituted by at least two lenses, spherical aberration can be corrected satisfactorily, and since each of the first and fourth lens units having a lower refractive power than that of the second and third lens units is constituted by a single lens, both a size reduction and high performance can be realized although the lens system is constituted by a small number of lenses. In order to attain higher performance, each of the first and fourth lens units is preferably constituted by two lenses.

In the embodiment of the present invention, each lens unit is constituted by a small number of lenses. However, it is easy to increase the zoom ratio or to attain higher performance by increasing the number of lenses, or a high zoom ratio and high performance can be achieved by forming one lens surface to be an aspherical surface, needless to say.

In particular, when an aspherical surface is formed in the first or fourth lens unit which is disposed at a position separated from the aperture stop, variations in coma depending on the field angle can be satisfactorily corrected. Alternatively, when an aspherical surface is formed in the second or third lens unit which is disposed at a position near the aperture stop, an increase in lens diameter can be attained.

Of course, when lenses using a plastic material are used, a weight reduction and a further cost reduction can be achieved.

When one lens unit in the lens system is driven in the optical axis direction, the image plane position moves in the optical axis direction, and the focal length changes accordingly.

In general, a lens system that suppresses variations in image plane position upon movement of one lens unit by moving at least another lens unit in the optical axis direction is called a zoom lens. However, the present invention is not limited to the zoom lens. Even when the image plane position is slightly varied in the optical axis direction (called a varyfocal zoom lens), the image plane position of the lens system can be adjusted to match the photo sensor by driving a CCD as the photo sensor in the optical axis direction or driving the focusing unit in the optical axis direction, and hence, the present invention can be applied to any other variable focal length optical systems.

According to another aspect, in order to avoid a photographing failure due to image vibrations caused by camera shake that tends to be generated in a zoom lens with a high zoom ratio, a vibration detection system for detecting vibrations and its driving means are combined with the lens system, and all or some lens elements of one of lens units constituting the lens system are decentered as a decentering lens unit so as to constitute an ant-vibration optical system, in which vibrations are detected by the vibration detection system, and the driving means decenters the decentering lens unit to reduce the detected vibration so as to shift the image, thereby correcting image vibrations.

The embodiments of the present invention will be described below.

FIG. 1 shows the refractive power arrangement of a variable focal length optical system according to the first to fifth embodiments of the present invention. The variable focal length optical system of each embodiment comprises, in succession from an object side, a first lens unit G1 having a negative refractive power, a second lens unit G2 having a positive refractive power, a third lens unit G3 having a negative refractive power, and a fourth lens unit G4 having a positive refractive power. When the focal length of the lens system is varied from the maximum wide-angle state to the maximum telephoto state, the second lens unit G2 and the third lens unit G3 move toward the object side, so that the air gap between the first and second lens units decreases, the air gap between the second and third lens units increases, and the air gap between the third and fourth lens units increases, and the first and fourth lens units are fixed in position in the optical axis direction.

In each embodiment, an aspherical surface shape is expressed by the following equation:

x=cy2/{1+(1−κc2y2)$^{1/2}$}+C4y4+C6y6+ where y is the height from the optical axis, x is the sag, c is the curvature, κ is a coefficient of cone, and C4 and C6 are aspherical surface coefficients.

[First Embodiment]

Figure 2:
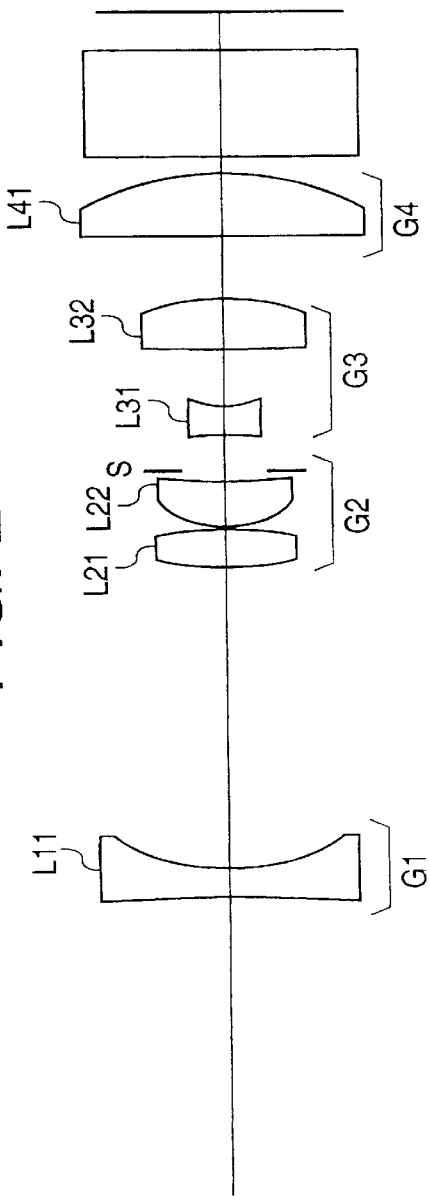
FIG. 2 is a schematic view showing the arrangement of the first embodiment.

FIG. 2 shows the arrangement of the first embodiment according to the present invention. The lens arrangements, in succession from an object side, of the respective lens units are as follows. That is, the first lens unit G1 is constituted by a biconcave lens L11, the second lens G2 is constituted by a biconvex lens L21 and a meniscus-shaped convex lens L22 with a convex surface facing the object side, the third lens unit G3 is constituted by a biconcave lens L31 and a meniscus-shaped convex lens L32 with a convex surface facing the image side, and the fourth lens unit G4 is constituted by a meniscus-shaped convex lens L41 with a convex surface facing the image side. A stop S is disposed between the second lens unit G2 and the third lens unit G3, and moves together with the second lens unit G2 when the focal length of the lens system is varied.

In the first embodiment, the third lens unit G3 is constituted by a negative sub unit consisting of the biconcave lens L31 and a positive sub unit consisting of the convex lens L32.

In the first embodiment, a focusing operation on an object at a close distance is attained by driving the first lens unit in the optical axis direction.

In the first embodiment, a 3.05-mm thick transparent glass plate serving as protection glass is inserted between the fourth lens unit G4 and the image plane position, and is fixed in position when the focal length of the lens system is varied. (Note that the surface with the radius of curvature=∞ means a plane.)

Table 1 below summarizes the data values of the first embodiment of the present invention. In the data table of this embodiment, f is the focal length, FNO is the F-number, 2ω is the field angle, y is the maximum image height, and the refractive index corresponds to a value for the e-line (λ=546.1 nm).

TABLE 1 f = 6.15 − 12.00 − 17.50
FNO = 3.96 − 5.79 − 7.12
2ω = 53.71 − 29.93 − 20.24°
y = 3.00

| Surface Number | Radius of Curvature | Surface Interval | Refractive Index | Abbe's Number | |
|---|---|---|---|---|---|
| 1 | −148.3404 | 0.800 | 1.65426 | 58.44 | |
| 2 | 5.8096 | (D2) | 1.00000 | | |
| 3 | 12.7310 | 1.100 | 1.70559 | 41.15 | |
| 4 | −10.6839 | 0.100 | 1.00000 | | |
| 5 | 3.4331 | 1.300 | 1.48914 | 70.45 | |
| 6 | 26.6951 | 0.300 | 1.00000 | | |
| 7 | ∞ | (D7) | 1.00000 | | (Stop Surface) |
| 8 | −8.7256 | 0.800 | 1.85504 | 23.83 | |
| 9 | 3.2042 | 1.187 | 1.00000 | | |
| 10 | −104.3257 | 1.300 | 1.56605 | 60.82 | |
| 11 | −4.7525 | (D11) | 1.00000 | | |
| 12 | 2289.1909 | 1.984 | 1.63003 | 35.74 | |
| 13 | −7.4666 | 0.500 | 1.00000 | | |
| 14 | ∞ | 3.050 | 1.51872 | 64.20 | (Protection Glass) |
| 15 | ∞ | 1.000 | 1.00000 | | |

[Variable Interval Table]

| f | 6.1500 | 12.0000 | 17.5000 |
|---|---|---|---|
| D2 | 8.6312 | 3.6397 | 1.3500 |
| D7 | 1.0000 | 1.4073 | 2.0515 |
| D11 | 2.8946 | 7.4786 | 9.1243 |

[Moving Amount δ1 of First Lens Unit G1 when Photographing Magnification=−0.01×]

| f | 6.1500 | 12.0000 | 17.5000 |
|---|---|---|---|
| D0 | 606.0119 | 1191.0135 | 1741.0209 |
| δ1 | 0.1182 | 0.0606 | 0.0416 |

(Note that the moving amount to the object side is positive)
[Conditional Formula Corresponding Values]
f3=−5.921
f4=11.886 n·D/|f3|=0.200 (1)

(r2a+r2b)/(r2a−r2b)=0.087 (2)

(r1a−r1b)/(r1a+r1b)=1.000 (3)

f4/(fw·ft)$^{1/2}$=1.146 (4)

FIGS. 3A to 8H are graphs showing various aberrations in the first embodiment of the present invention. FIGS. 3A to 5H are graphs showing various aberrations respectively in the maximum wide-angle state, the middle focal length state, and the maximum telephoto state upon focusing on an object at infinity position, and FIGS. 6A to 8H are graphs showing various aberrations respectively in the maximum wide-angle state, the middle focal length state, and the maximum telephoto state when the photographing magnification=−0.01×.

Of the graphs shown in FIGS. 3A to 8H, in each graph showing spherical aberration, the solid curve represents spherical aberration, the dotted curve represents the sine condition, and y is the image height; and in each graph showing astigmatism, the solid curve represents the sagittal image plane, the dotted curve represents the meridional image plane, and d represents aberration for the d-line. The graphs showing coma show those at image heights y=0, y=1.50, y=2.10, y=2.55, and y=3.00, and in each of these graphs, A is the incident angle and H is the object height.

As can be seen from these graphs, in this embodiment, various aberrations are satisfactorily corrected and good imaging performance is obtained.

[Second Embodiment]

Figure 9:
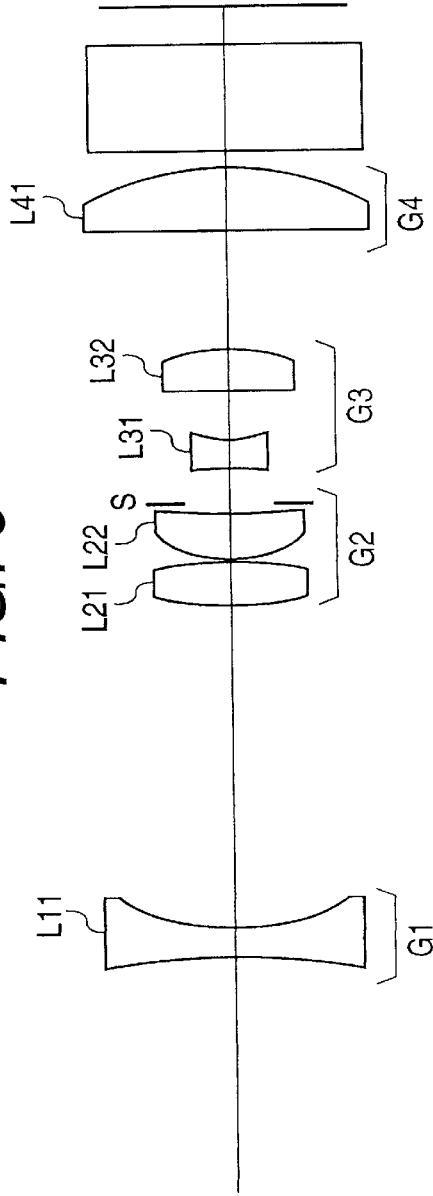
FIG. 9 is a schematic view showing the arrangement of the second embodiment.

FIG. 9 shows the arrangement of the second embodiment according to the present invention. The lens arrangements, in succession from an object side, of the respective lens units are as follows. That is, the first lens unit G1 is constituted by a biconcave lens L11, the second lens G2 is constituted by a biconvex lens L21 and a meniscus-shaped convex lens L22 with a convex surface facing the object side, the third lens unit G3 is constituted by a biconcave lens L31 and a biconvex lens L32, and the fourth lens unit G4 is constituted by a biconvex lens L41. A stop S is disposed between the second lens unit G2 and the third lens unit G3, and moves together with the third lens unit G3 when the focal length of the lens system is varied.

In the second embodiment, the third lens unit G3 is constituted by a negative sub unit consisting of the biconcave lens L31 and a positive sub unit consisting of the biconvex lens L32.

In the second embodiment, a focusing operation on an object at a close distance is attained by driving the first lens unit in the optical axis direction.

In the second embodiment, a 3.05-mm thick transparent glass plate serving as protection glass is inserted between the fourth lens unit G4 and the image plane position, and is also fixed in position when the focal length of the lens system is varied. (Note that the surface with a radius of curvature=∞ means a plane.)

Table 2 below summarizes the data values of the second embodiment of the present invention. In the data table of this embodiment, f is the focal length, FNO is the F-number, 2ω is the field angle, y is the maximum image height, and the refractive index corresponds to a value for the e-line ($\lambda$=546.1 nm).

TABLE 2 f = 6.15 – 12.00 – 17.50
FNO = 4.06 – 5.50 – 6.03
2ω = 53.72 – 28.80 – 20.11°
y = 3.00

| Surface Number | Radius of Curvature | Surface Interval | Refractive Index | Abbe's Number | |
|---|---|---|---|---|---|
| 1 | −98.6373 | 0.800 | 1.62286 | 60.35 | |
| 2 | 5.8183 | (D2) | 1.00000 | | |
| 3 | 9.9420 | 1.100 | 1.74794 | 44.87 | |
| 4 | −14.0696 | 0.100 | 1.00000 | | |
| 5 | 3.4819 | 1.300 | 1.48914 | 70.45 | |
| 6 | 30.2893 | (D6) | 1.00000 | | |
| 7 | ∞ | 1.000 | 1.00000 | | (Stop Surface) |
| 8 | −9.5762 | 0.800 | 1.85504 | 23.83 | |
| 9 | 2.9353 | 1.600 | 1.00000 | | |
| 10 | 20.7127 | 1.500 | 1.51872 | 64.20 | |
| 11 | −6.1187 | (D11) | 1.00000 | | |
| 12 | 202.5966 | 1.900 | 1.65223 | 33.84 | |
| 13 | −8.0173 | 0.500 | 1.00000 | | |
| 14 | ∞ | 3.050 | 1.51872 | 64.20 | (Protection Glass) |
| 15 | ∞ | 1.000 | 1.00000 | | |

[Variable Interval Table]

| f | 6.1500 | 12.0000 | 17.5000 |
|---|---|---|---|
| D2 | 8.7411 | 3.6951 | 1.3500 |
| D7 | 0.3000 | 0.6481 | 1.2179 |
| D11 | 1.7327 | 6.4305 | 8.2059 |

[Moving Amount δ1 of First Lens Unit G1 when Photographing Magnification=−0.01×]

| f | 6.1500 | 12.0000 | 17.5000 |
|---|---|---|---|
| DO | 605.7441 | 1190.7354 | 1740.7226 |
| δ1 | 0.1257 | 0.0645 | 0.0442 |

(Note that the moving amount to the object side is positive)

[Conditional Formula Corresponding Values]

f3=−5.568
f4=11.866

$n \cdot D/|f3|=0.287$ (1)

$(r2a+r2b)/(r2a-r2b)=-0.172$ (2)

$(r1a-r1b)/(r1a+r1b)=1.125$ (3)

$f4/(fw \cdot ft)^{1/2}=1.144$ (4)

FIGS. 10A to 15H are graphs showing various aberrations in the second embodiment of the present invention. FIGS. 10A to 12H are graphs showing various aberrations respectively in the maximum wide-angle state, the middle focal length state, and the maximum telephoto state upon focusing on an object at infinity position, and FIGS. 13A to 15H are graphs showing various aberrations respectively in the maximum wide-angle state, the middle focal length state, and the maximum telephoto state when the photographing magnification=−0.01×.

Of the graphs shown in FIGS. 10A to 15H, in each graph showing spherical aberration, the solid curve represents spherical aberration, the dotted curve represents the sine condition, and y is the image height; and in each graph showing astigmatism, the solid curve represents the sagittal image plane, the dotted curve represents the meridional image plane, and e represents aberration for the e-line. The graphs showing coma show those at image heights y=0, y=1.50, y=2.10, y=2.55, and y=3.00, and in each of these graphs, A is the incident angle and H is the object height.

As can be seen from these graphs, in this embodiment, various aberrations are satisfactorily corrected and good imaging performance is obtained.

[Third Embodiment]

Figure 16:
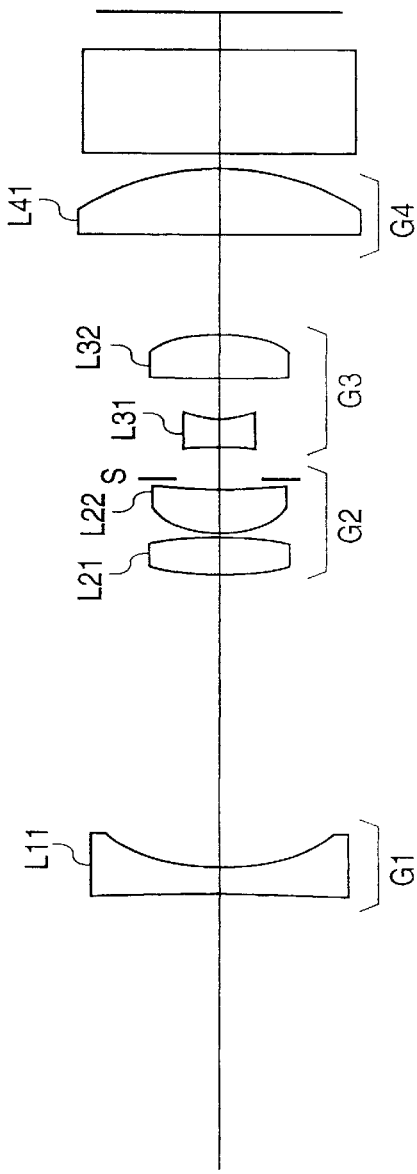
FIG. 16 is a schematic view showing the arrangement of the third embodiment.

FIG. 16 shows the arrangement of the third embodiment according to the present invention. The lens arrangements, in succession from an object side, of the respective lens units are as follows. That is, the first lens unit G1 is constituted by a biconcave lens L11, the second lens G2 is constituted by a biconvex lens L21 and a meniscus-shaped convex lens L22 with a convex surface facing the object side, the third lens unit G3 is constituted by a biconcave lens L31 and a biconvex lens L32, and the fourth lens unit G4 is constituted by a meniscus-shaped convex lens L41 with a convex surface facing the image side. A stop S is disposed between the second lens unit G2 and the third lens unit G3, and moves together with the third lens unit G3 when the focal length of the lens system is varied.

In the third embodiment, the third lens unit G3 is constituted by a negative sub unit consisting of the biconcave lens L31 and a positive sub unit consisting of the biconvex lens L32.

In the third embodiment, a focusing operation on an object at a close distance is attained by driving the first lens unit in the optical axis direction.

In the third embodiment, a 3.05-mm thick transparent glass plate serving as protection glass is inserted between the fourth lens unit G4 and the image plane position, and is also fixed in position when the focal length of the lens system is varied. (Note that the surface with a radius of curvature=∞ means a plane.)

Table 3 below summarizes the data values of the third embodiment of the present invention. In the data table of this embodiment, f is the focal length, FNO is the F-number, 2107 is the field angle, y is the maximum image height, and the refractive index corresponds to a value for the e-line (λ=546.1 nm).

TABLE 3 f = 7.20 – 14.00 – 20.50
FNO = 3.98 – 5.57 – 6.23
2ω = 46.78 – 24.76 – 17.15°
y = 3.00

| Surface Number | Radius of Curvature | Surface Interval | Refractive Index | Abbe's Number | |
|---|---|---|---|---|---|
| 1 | –25.7444 | 0.800 | 1.51872 | 64.20 | |
| 2 | 6.5605 | (D2) | 1.00000 | | |
| 3 | 10.2058 | 1.200 | 1.74794 | 44.87 | |
| 4 | –14.0342 | 0.100 | 1.00000 | | |
| 5 | 3.7122 | 1.300 | 1.48914 | 70.45 | |
| 6 | 18.3887 | (D6) | 1.00000 | | |
| 7 | ∞ | 1.000 | 1.00000 | | (Stop Surface) |
| 8 | –12.4858 | 0.800 | 1.85504 | 23.83 | |
| 9 | 3.2281 | 1.400 | 1.00000 | | |
| 10 | 82.5820 | 1.200 | 1.48914 | 70.45 | |
| 11 | –6.1375 | (D11) | 1.00000 | | |
| 12 | –462.4788 | 1.800 | 1.73432 | 28.31 | |
| 13 | –8.8696 | 0.500 | 1.00000 | | |
| 14 | ∞ | 3.050 | 1.51872 | 64.20 | (Protection Glass) |
| 15 | ∞ | 1.000 | 1.00000 | | |

[Variable Interval Table]

| f | 7.2000 | 14.0000 | 20.5000 |
|---|---|---|---|
| D2 | 9.3325 | 3.9603 | 1.3500 |
| D7 | 0.3000 | 0.6453 | 1.2136 |
| D11 | 3.3994 | 8.4263 | 10.4683 |

[Moving Amount δ1 of First Lens Unit G1 when Photographing Magnification=–0.01×]

| f | 7.2000 | 14.0000 | 20.5000 |
|---|---|---|---|
| D0 | 709.5951 | 1389.5842 | 2039.5658 |
| δ1 | 0.1387 | 0.0714 | 0.0487 |

(Note that the moving amount to the object side is positive)
[Conditional Formula Corresponding Values]
f3=–5.241
f4=12.294 n·D/|f3|=0.267 (1)
(r2a+r2b)/(r2a–r2b)=–0.158 (2)
(r1a–r1b)/(r1a+r1b)=1.684 (3)
f4/(fw·ft)^(1/2)=1.012 (4)

FIGS. 17A to 22H are graphs showing various aberrations in the third embodiment of the present invention. FIGS. 17A to 19H are graphs showing various aberrations respectively in the maximum wide-angle state, the middle focal length state, and the maximum telephoto state upon focusing on an object at infinity position, and FIGS. 20A to 22H are graphs showing various aberrations respectively in the maximum wide-angle state, the middle focal length state, and the maximum telephoto state when the photographing magnification=–0.01×.

Of the graphs shown in FIGS. 17A to 22H, in each graph showing spherical aberration, the solid curve represents spherical aberration, the dotted curve represents the sine condition, and y is the image height; and in each graph showing astigmatism, the solid curve represents the sagittal image plane, the dotted curve represents the meridional image plane, and e represents aberration for the e-line. The graphs showing coma show those at image heights y=0, y=1.50, y=2.10, y=2.55, and y=3.00, and in each of these graphs, A is the incident angle and H is the object height.

As can be seen from these graphs, in this embodiment, various aberrations are satisfactorily corrected and good imaging performance is obtained.

[Fourth Embodiment]

Figure 23:
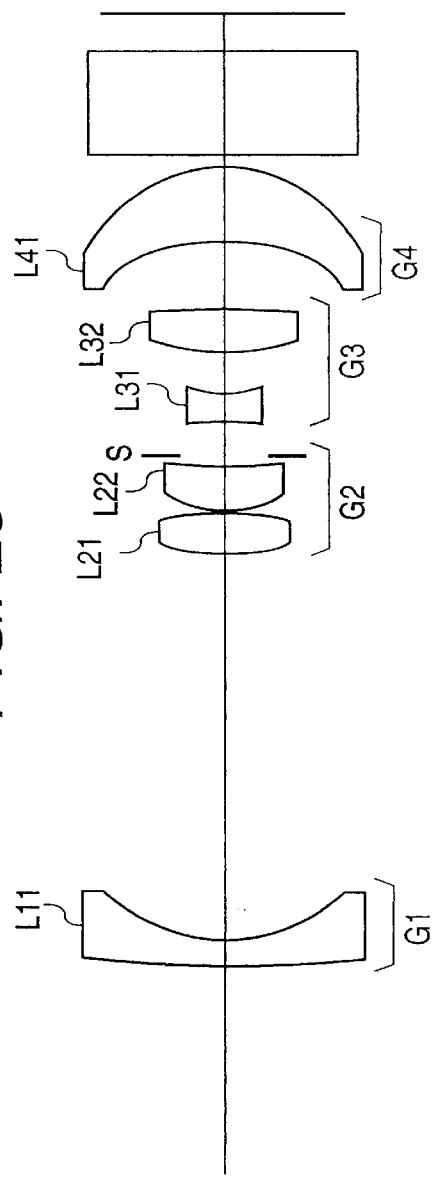
FIG. 23 is a schematic view showing the arrangement of the fourth embodiment.

FIG. 23 shows the arrangement of the fourth embodiment according to the present invention. The lens arrangements, in succession from an object side, of the respective lens units are as follows. That is, the first lens unit G1 is constituted by a biconcave lens L11, the second lens unit G2 is constituted by a biconvex lens L21 and a meniscus-shaped convex lens L22 with a convex surface facing the object side, the third lens unit G3 is constituted by a biconcave lens L31 and a biconvex lens L32, and the fourth lens unit G4 is constituted by a meniscus-shaped convex lens L41 with a convex surface facing the image side. A stop S is disposed between the second lens unit G2 and the third lens unit G3, and moves together with the third lens unit G3 when the focal length of the lens system is varied.

In the fourth embodiment, the third lens unit G3 is constituted by a negative sub unit consisting of the biconcave lens L31 and a positive sub unit consisting of the biconvex lens L32.

In the fourth embodiment, a focusing operation on an object at a close distance is attained by driving the first lens unit in the optical axis direction.

In the fourth embodiment, a 3.05-mm thick transparent glass plate serving as protection glass is inserted between the fourth lens unit G4 and the image plane position, and is also fixed in position when the focal length of the lens system is varied. (Note that the surface with a radius of curvature=∞ means a plane.)

Table 4 below summarizes the data values of the fourth embodiment of the present invention. In the data table of this embodiment, f is the focal length, FNO is the F-number, 2ω is the field angle, y is the maximum image height, and the refractive index corresponds to a value for the e-line (λ=546.1 nm).

TABLE 4 f = 6.15 – 12.00 – 23.50
FNO = 3.98 – 5.80 – 7.13
2ω = 52.48 – 27.55 – 14.25°
y = 3.00

| Surface Number | Radius of Curvature | Surface Interval | Refractive Index | Abbe's Number | |
|---|---|---|---|---|---|
| 1 | 38.8343 | 0.800 | 1.59142 | 64.20 | |
| 2 | 5.0332 | (D2) | 1.00000 | | |
| 3 | 8.5815 | 1.100 | 1.76078 | 47.73 | |
| 4 | –20.4841 | 0.100 | 1.00000 | | |
| 5 | 3.3532 | 1.300 | 1.48914 | 70.45 | |
| 6 | 13.0565 | (D6) | 1.00000 | | |
| 7 | ∞ | 1.000 | 1.00000 | | (Stop Surface) |
| 8 | –24.8985 | 0.800 | 1.85504 | 23.83 | |
| 9 | 2.3282 | 1.316 | 1.00000 | | |
| 10 | 5.1390 | 1.229 | 1.51872 | 64.20 | |
| 11 | –42.5979 | (D11) | 1.00000 | | |
| 12 | –9.7004 | 2.200 | 1.75457 | 35.04 | |

TABLE 4-continued

| 13 | −4.4607 | 0.500 | 1.00000 | | |
| 14 | ∞ | 3.050 | 1.51872 | 64.20 | (Protection Glass) |
| 15 | ∞ | 1.000 | 1.00000 | | |

In the fourth embodiment, the second and 12th surfaces are aspherical surfaces, and their aspherical coefficients are as follows:

(Second Surface)

$C = 1/5.0332$    $K = 1.0000$    $C4 = -2.34607 \times 10$
$C6 = 2.12045 \times 10^{-5}$    $C8 = -8.14995 \times 10^{-6}$    $C10 = 4.61674 \times 10^{-7}$ (12th Surface)

$C = -1/9.7004$    $K = 1.000$    $C4 = -1.48844 = 10^{-7}$
$C6 = -3.62969 \times 10^{-4}$    $C8 = 2.75344 \times 10^{-5}$    $C10 = -1.47690 \times 10^{-6}$

[Variable Interval Table]

| f | 6.1500 | 12.0000 | 23.5000 |
|---|---|---|---|
| D2 | 11.3727 | 6.0114 | 1.3500 |
| D7 | 0.3000 | 0.4643 | 1.3280 |
| D11 | 1.9329 | 7.1298 | 10.9277 |

[Moving Amount δ1 of First Lens Unit G1 when Photographing Magnification=−0.01×]

| f | 6.1500 | 12.0000 | 23.5000 |
|---|---|---|---|
| DO | 604.5564 | 1189.5585 | 2339.5992 |
| δ1 | 0.1582 | 0.0811 | 0.0414 |

(Note that the moving amount to the object side is positive)
[Conditional Formula Corresponding Values]

f3=−5.241
f4=9.270

$n \cdot D/|f3|=0.302$ (1)

$(r2a+r2b)/(r2a-r2b)=-0.410$ (2)

$(r1a-r1b)/(r1a+r1b)=0.771$ (3)

$f4/(fw \cdot ft)^{1/2}=0.771$ (4)

FIGS. 24A to 29H are graphs showing various aberrations in the fourth embodiment of the present invention. FIGS. 24A to 26H are graphs showing various aberrations respectively in the maximum wide-angle state, the middle focal length state, and the maximum telephoto state upon focusing on an object at infinity position, and FIGS. 27A to 29H are graphs showing various aberrations respectively in the maximum wide-angle state, the middle focal length state, and the maximum telephoto state when the photographing magnification=−0.01×.

Of the graphs shown in FIGS. 24A to 29H, in each graph showing spherical aberration, the solid curve represents spherical aberration, the dotted curve represents the sine condition, and y is the image height; and in each graph showing astigmatism, the solid curve represents the sagittal image plane, the dotted curve represents the meridional image plane, and e represents aberration for the e-line. The graphs showing coma show those at image heights y=0, y=1.50, y=2.10, y=2.55, and y=3.00, and in each of these graphs, A is the incident angle and H is the object height.

As can be seen from these graphs, in this embodiment, various aberrations are satisfactorily corrected and good imaging performance is obtained.

[Fifth Embodiment]

In the first to fourth embodiments above, the first lens unit G1 serves as a focusing unit. However, the present invention is not limited to this.

A case will be exemplified below as the fifth embodiment wherein the third lens unit G3 in the variable focal length optical system of the second embodiment is used as a focusing unit. Since the lens arrangement of the variable focal length optical system of the fifth embodiment is the same as that in the second embodiment, a detailed description thereof will be omitted.

The table below summarizes the lens driving amount of the third lens unit G3 upon focusing on an object at a close distance when the third lens unit G3 is used as a focusing unit.

[Moving Amount δ3 of Third Lens Unit G3 when Photographing Magnification=−0.01×]

| f | 6.1500 | 12.0000 | 17.5000 |
|---|---|---|---|
| DO | 610.9114 | 1198.7054 | 1751.2966 |
| δ3 | −0.0116 | −0.0142 | −0.0177 |

(Note that the moving amount to the object side is positive)

FIGS. 30A to 32H are graphs showing various aberrations in the fourth embodiment of the present invention. FIGS. 30A to 32H are graphs showing various aberrations respectively in the maximum wide-angle state, the middle focal length state, and the maximum telephoto state when the photographing magnification=−0.01×.

Of the graphs shown in FIGS. 30A to 32H, in each graph showing spherical aberration, the solid curve represents spherical aberration, the dotted curve represents the sine condition, and y is the image height; and in each graph showing astigmatism, the solid curve represents the sagittal image plane, the dotted curve represents the meridional image plane, and e represents aberration for the e-line. The graphs showing coma show those at image heights y=0, y=1.50, y=2.10, y=2.55, and y=3.00, and in each of these graphs, A is the incident angle and H is the object height.

As can be seen from these graphs, even when the third lens unit G3 is used as a focusing unit, various aberrations are satisfactorily corrected upon focusing on an object at a close distance and good imaging performance is obtained.

Figure 33:
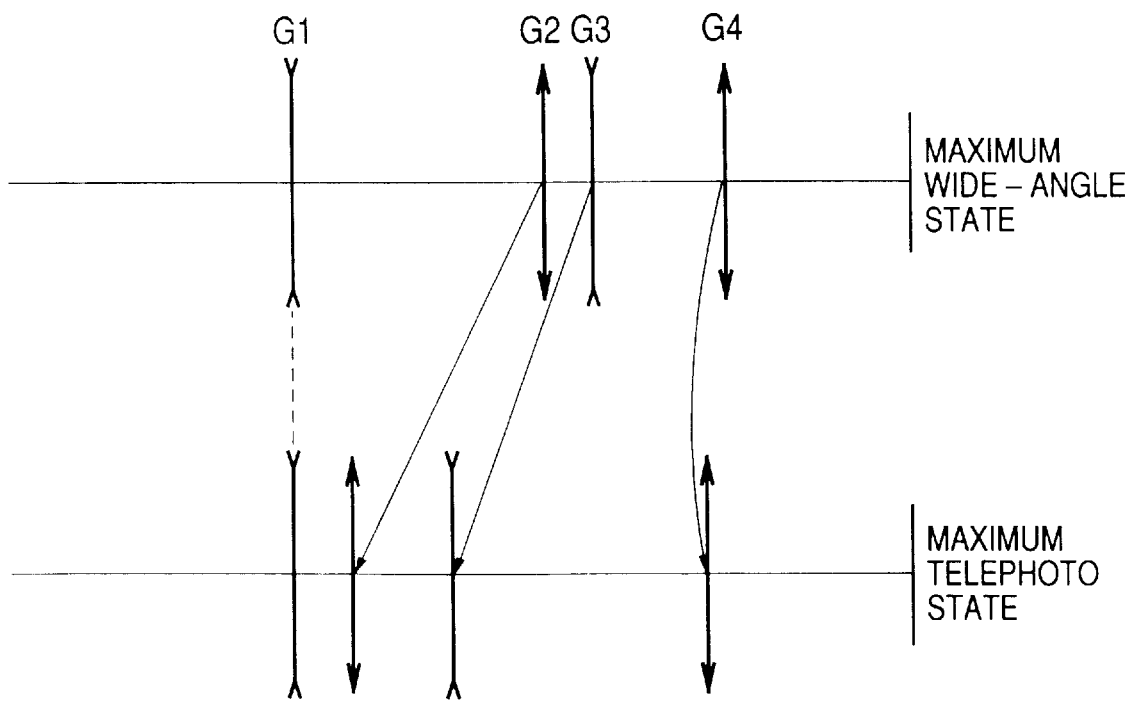
FIG. 33 is a schematic view showing the refractive power arrangement of a variable focal length optical system according to the sixth to ninth embodiments of the present invention, and the movement state of each lens unit when the focal length of the lens system is varied from the maximum wide-angle state to the maximum telephoto state.

FIG. 33 is a schematic view showing the refractive power arrangement of a variable focal length optical system according to the sixth to ninth embodiments of the present invention, and the movement state of each lens unit when the focal length of the lens system is varied from the maximum wide-angle state to the maximum telephoto state.

As shown in FIG. 33, the variable focal length optical system according to the sixth to ninth embodiments of the present invention comprises, in the order from the object side, a first lens unit G1 having a negative refractive power, a second lens unit G2 having a positive refractive power, a third lens unit G3 having a negative refractive power, and a fourth lens unit G4 having a positive refractive power. When the focal length is varied from the shortest focal length state (maximum wide-angle state) to the longest focal length state (maximum telephoto state), the first lens unit G1 is fixed in position along the optical axis, the second and third lens units G2 and G3 move toward the object side along the optical axis, and the fourth lens unit G4 moves along the optical axis such that the air gap between the first and second lens units G1 and G2 decreases, the air gap between the second and third lens units G2 and G3 increases, and the air gap between the third and fourth lens units G3 and G4 increases.

[Sixth Embodiment]

Figure 34:
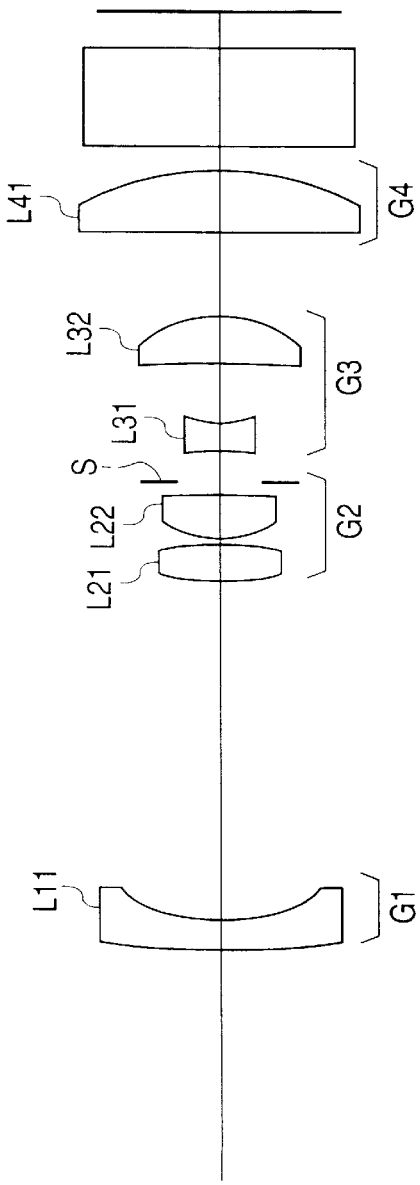
FIG. 34 is a view showing the arrangement of a variable focal length optical system according to the sixth embodiment of the present invention.

FIG. 34 is a view showing the arrangement of a variable focal length optical system according to the sixth embodiment of the present invention.

The variable focal length optical system in FIG. 34 is constituted in the order from the object side by a first lens unit G1 made up of a negative meniscus lens L11 with a convex surface facing the object side, a second lens unit G2 made up of a biconvex lens L21 and a biconvex lens L22, a third lens unit G3 made up of a biconcave lens L31 and a positive meniscus lens L32 with a concave surface facing the object side, and a fourth lens unit G4 made up of a positive meniscus lens L41 with a concave surface facing the object side.

A stop S is disposed between the second lens unit G2 and the third lens unit G3, and moves together with the second lens unit G2 when the focal length of the lens system is varied from the maximum wide-angle state to the maximum telephoto state.

FIG. 34 shows the positional relationship between the respective lens units in the maximum wide-angle state. When the focal length of the lens system is varied to the maximum telephoto state, the lens system moves on the optical axis along zoom orbits indicated by arrows in FIG. 33.

In the sixth embodiment, focusing is performed by moving the third lens unit G3 along the optical axis.

In the sixth embodiment, a transparent glass plate (protection glass) is inserted between the fourth lens unit G4 and the image plane, and is fixed in position when the focal length of the lens system is varied.

Table 5 below summarizes the data values of the sixth embodiment of the present invention. In Table 5, f is the focal length, FNO is the F-number, 2ω is the field angle, Y0 is the maximum image height, and D0 is the distance between an object and a surface closest to the object side along the optical axis. The surface number represents the order of lens surfaces from the object side along a direction in which a light ray travels, and the refractive index and the Abbe's number respectively correspond to values for the d-line (λ=587.6 nm). In the lens data of Table 5, the surface with the radius of curvature=∞ (infinity) means a plane. The surface indicating the aperture stop S has the radius of curvature=∞ though no lens surface exists on the surface indicating the aperture stop S.

TABLE 5 f = 5.65 – 11.00 – 16.05
FNO = 4.04 – 5.65 – 6.60
2ω = 57.82 – 31.28 – 21.92°
Y0 = 3.00

| Surface Number | Radius of Curvature | Surface Interval | Refractive Index | Abbe's Number | |
|---|---|---|---|---|---|
| 1 | 31.2774 | 0.800 | 1.80420 | 46.51 | |
| 2 | 5.2675 | (D2 = Variable) | | | |
| 3 | 13.6074 | 1.100 | 1.80450 | 39.63 | |
| 4 | –15.1669 | 0.100 | | | |
| 5 | 3.4066 | 1.200 | 1.51680 | 64.20 | |
| 6 | –149.6958 | 0.300 | | | |
| 7 | ∞ | (D7 = Variable) | | | (Aperture Stop S) |
| 8 | –6.6540 | 0.800 | 1.84666 | 23.83 | |
| 9 | 2.8770 | 1.800 | | | |
| 10 | –54.0995 | 1.498 | 1.51823 | 58.96 | |
| 11 | –4.0460 | (D11 = Variable) | | | |

TABLE 5-continued

| 12 | –158.8832 | 2.114 | 1.62041 | 60.35 | |
| 13 | –7.8881 | (D13 = Variable) | | | |
| 14 | ∞ | 3.050 | 1.51680 | 64.20 | (Protection Glass) |
| 15 | ∞ | 1.000 | | | |

[Variable Interval When Focal Length is Varied]

| f | 5.6500 | 11.0000 | 16.0500 |
|---|---|---|---|
| D2 | 10.2765 | 4.3006 | 1.3500 |
| D7 | 1.0000 | 1.2945 | 1.9619 |
| D11 | 2.3615 | 7.0096 | 7.8695 |
| D13 | 0.5000 | 1.2562 | 2.2356 |

[Focusing Moving Amount of Third Lens Unit G3 when Photographing Magnification=–0.01×]

| Focal Length f | 5.6500 | 11.0000 | 16.0500 |
|---|---|---|---|
| D0 | 560.5619 | 1098.2280 | 1606.4108 |
| Moving Amount | 0.0084 | 0.0117 | 0.0177 |

(Note that the moving amount from the object side to the image side is positive)

[Conditional Corresponding Values]

β2T=–0.6563
β2W=–0.2617
f3N=–2.2844
f3=–6.1808
f2=3.8857
f4=13.3072
β3T=5.5013
β3W=3.6469

| (β2T/β2W)/(ft/fw)=0.883 | (5) |
| f3N/f3=0.370 | (6) |
| np1–np2=0.288 | (7) |
| f2/f4=0.292 | (8) |
| 1/(β3T·β3W)=0.050 | (9) |

FIGS. 35A to 40H are graphs showing various aberrations for the d-line (λ=587.6 nm) in the sixth embodiment. FIGS. 35A to 35H are graphs showing various aberrations respectively upon focusing on an object at infinity position in the maximum wide-angle state (shortest focal length state). FIGS. 36A to 36H are graphs showing various aberrations respectively upon focusing on an object at infinity position in the middle focal length state. FIGS. 37A to 37H are graphs showing various aberrations respectively upon focusing on an object at infinity position in the maximum telephoto state (longest focal length state).

FIGS. 38A to 38H are graphs showing various aberrations respectively in the maximum wide-angle state when the photographing magnification=–0.01×. FIGS. 39A to 39H are graphs showing various aberrations respectively in the middle focal length state when the photographing magnification=–0.01×. FIGS. 40A to 40H are graphs showing various aberrations respectively in the maximum telephoto state when the photographing magnification=–0.01×.

In each graph, FNO is the F-number, NA is the numerical aperture, Y is the image height, A is the half field angle for each image height, and H is the object height for each image height.

In each graph showing astigmatism, the solid curve represents the sagittal image plane, and the dotted curve represents the meridional image plane. In each graph showing spherical aberration, the dotted curve represents the sine condition.

As is apparent from these graphs, in this embodiment, various aberrations are satisfactorily corrected in each photographing distance state and each focal length state.

[Seventh Embodiment]

Figure 41:
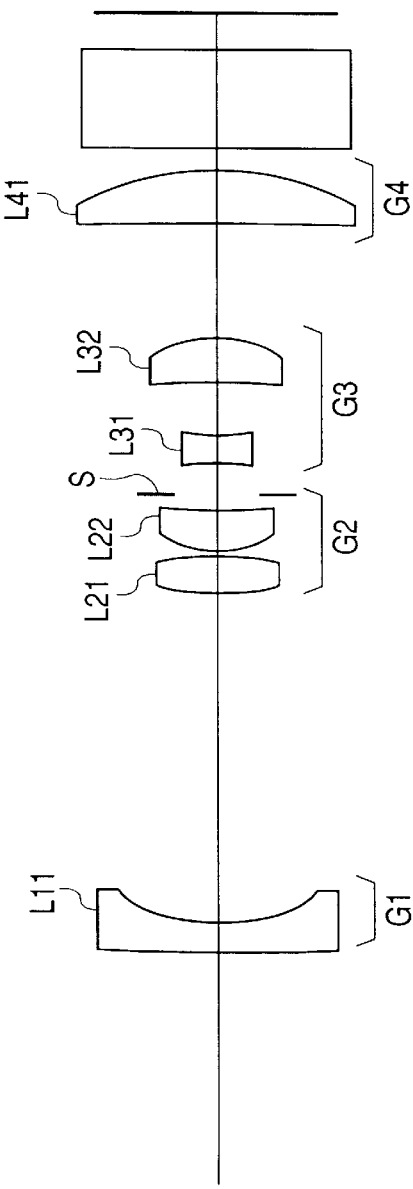
FIG. 41 is a view showing the arrangement of a variable focal length optical system according to the seventh embodiment of the present invention.

FIG. 41 is a view showing the arrangement of a variable focal length optical system according to the seventh embodiment of the present invention.

The variable focal length optical system in FIG. 41 is constituted in the order from the object side by a first lens unit G1 made up of a negative meniscus lens L11 with a convex surface facing the object side, a second lens unit G2 made up of a biconvex lens L21 and a positive meniscus lens L22 with a convex surface facing the object side, a third lens unit G3 made up of a biconcave lens L31 and a positive meniscus lens L32 with a concave surface facing the object side, and a fourth lens unit G4 made up of a positive meniscus lens L41 with a concave surface facing the object side.

A stop S is disposed between the second lens unit G2 and the third lens unit G3, and moves together with the second lens unit G2 when the focal length of the lens system is varied from the maximum wide-angle state to the maximum telephoto state.

FIG. 41 shows the positional relationship between the respective lens units in the maximum wide-angle state. When the focal length of the lens system is varied to the maximum telephoto state, the lens system moves on the optical axis along zoom orbits indicated by arrows in FIG. 33.

In the seventh embodiment, similar to the sixth embodiment, focusing is performed by moving the third lens unit G3 along the optical axis.

Also in the seventh embodiment, a transparent glass plate (protection glass) is inserted between the fourth lens unit G4 and the image plane, and is fixed in position when the focal length of the lens system is varied.

Table 6 below summarizes the data values of the seventh embodiment of the present invention. In Table 6, f is the focal length, FNO is the F-number, 2ω is the field angle, Y0 is the maximum image height, and D0 is the distance between an object and a surface closest to the object side along the optical axis. The surface number represents the order of lens surfaces from the object side along a direction in which a light ray travels, and the refractive index and the Abbe's number respectively correspond to values for the d-line (λ=587.6 nm). In the lens data of Table 6, the surface with the radius of curvature=∞ (infinity) means a plane. The surface indicating the aperture stop S has the radius of curvature=∞ though no lens surface exists on the surface indicating the aperture stop S.

TABLE 6 f = 5.65 – 11.00 – 16.05
FNO = 4.04 – 5.65 – 6.60
2ω = 57.82 – 31.28 – 21.92°
Y0 = 3.00

| Surface Number | Radius of Curvature | Surface Interval | Refractive Index | Abbe's Number |
| --- | --- | --- | --- | --- |
| 1 | 75.9886 | 0.800 | 1.71300 | 53.93 |
| 2 | 5.7141 | (D2 = Variable) | | |
| 3 | 14.8119 | 1.200 | 1.62280 | 56.93 |
| 4 | −8.1694 | 0.100 | | |
| 5 | 3.2454 | 1.200 | 1.51823 | 58.96 |
| 6 | 12.6058 | 0.300 | | |
| 7 | ∞ | (D7 = Variable) | | |
| 8 | −8.4919 | 0.800 | 1.79504 | 28.56 |
| 9 | 2.9679 | 1.600 | | |
| 10 | −173.2507 | 1.400 | 1.48749 | 70.45 |
| 11 | −4.3661 | (D11 = Variable) | | |
| 12 | −211.7320 | 1.700 | 1.62041 | 60.35 |
| 13 | −7.8881 | (D13 = Variable) | | |
| 14 | ∞ | 3.050 | 1.51680 | 64.20 |
| 15 | ∞ | 1.000 | | |

[Variable Interval when Focal Length is Varied]

| f | 6.1500 | 12.0000 | 17.5000 |
| --- | --- | --- | --- |
| D2 | 9.9330 | 4.4441 | 1.3500 |
| D7 | 1.0000 | 1.3281 | 2.0390 |
| D11 | 3.4040 | 8.5778 | 9.5658 |
| D13 | 0.5131 | 0.5000 | 1.8955 |

[Focusing Moving Amount of Third Lens Unit G3 when Photographing Magnification=−0.01×]

| Focal Length f | 6.1500 | 12.0000 | 17.5000 |
| --- | --- | --- | --- |
| D0 | 610.5627 | 1198.2178 | 1751.5828 |
| Moving Amount | 0.0107 | 0.0132 | 0.0197 |

(Note that the moving amount from the object side to the image side is positive)

[Conditional Corresponding Values]

β2T=−0.6601

β2W=−0.2810 f3N=−2.6832 f3=−6.4619 f2=4.1989 f4=13.1288

β3T=4.8380

β3W=3.4218

(β2T/β2W)/(ft/fw)=0.826    (5)

f3N/f3=0.415    (6)

np1−np2=0.105    (7)

f2/f4=0.320    (8)

1/(β3T·β3W)=0.060    (9)

FIGS. 42A to 47H are graphs showing various aberrations for the d-line (λ=587.6 nm) in the seventh embodiment. FIGS. 42A to 42H are graphs showing various aberrations respectively upon focusing on an object at infinity position in the maximum wide-angle state. FIGS. 43A to 43H are graphs showing various aberrations respectively upon focusing on an object at infinity position in the middle focal length state. FIGS. 44A to 44H are graphs showing various aberrations respectively upon focusing on an object at infinity position in the maximum telephoto state.

FIGS. 45A to 45H are graphs showing various aberrations respectively in the maximum wide-angle state when the photographing magnification=−0.01×. FIGS. 46A to 46H are graphs showing various aberrations respectively in the middle focal length state when the photographing magnification=−0.01×. FIGS. 47A to 47H are graphs showing various aberrations respectively in the maximum telephoto state when the photographing magnification=−0.01×.

In each graph, FNO is the F-number, NA is the numerical aperture, Y is the image height, A is the half field angle for each image height, and H is the object height for each image height.

In each graph showing astigmatism, the solid curve represents the sagittal image plane, and the dotted curve represents the meridional image plane. In each graph showing spherical aberration, the dotted curve represents the sine condition.

As is apparent from these graphs, in this embodiment, various aberrations are satisfactorily corrected in each photographing distance state and each focal length state.

[Eighth Embodiment]

Figure 48:
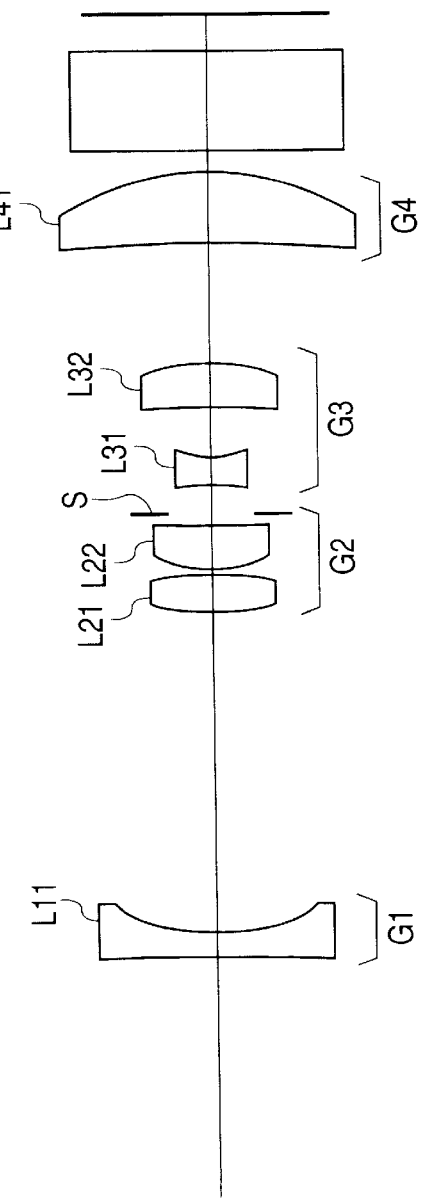
FIG. 48 is a view showing the arrangement of a variable focal length optical system according to the eighth embodiment of the present invention.

FIG. 48 is a view showing the arrangement of a variable focal length optical system according to the eighth embodiment of the present invention.

The variable focal length optical system in FIG. 48 is constituted in the order from the object side by a first lens unit G1 made up of a negative meniscus lens L11 with a convex surface facing the object side, a second lens unit G2 made up of a biconvex lens L21 and a positive meniscus lens L22 with a convex surface facing the object side, a third lens unit G3 made up of a biconcave lens L31 and a biconvex lens L32, and a fourth lens unit G4 made up of a positive meniscus lens L41 with a concave surface facing the object side.

A stop S is disposed between the second lens unit G2 and the third lens unit G3, and moves together with the second lens unit G2 when the focal length of the lens system is varied from the maximum wide-angle state to the maximum telephoto state.

FIG. 48 shows the positional relationship between the respective lens units in the maximum wide-angle state. When the focal length of the lens system is varied to the maximum telephoto state, the lens system moves on the optical axis along zoom orbits indicated by arrows in FIG. 33.

In the eighth embodiment, similar to the sixth embodiment, focusing is performed by moving the third lens unit G3 along the optical axis.

Also in the eighth embodiment, a transparent glass plate (protection glass) is inserted between the fourth lens unit G4 and the image plane, and is fixed in position when the focal length of the lens system is varied.

Table 7 below summarizes the data values of the eighth embodiment of the present invention. In Table 7, f is the focal length, FNO is the F-number, 2ω is the field angle, Y0 is the maximum image height, and D0 is the distance between an object and a surface closest to the object side along the optical axis. The surface number represents the order of lens surfaces from the object side along a direction in which a light ray travels, and the refractive index and the Abbe's number respectively correspond to values for the e-line (λ=546.1 nm). In the lens data of Table 7, the surface with the radius of curvature=∞ (infinity) means a plane. The surface indicating the aperture stop S has the radius of curvature=∞ though no lens surface exists on the surface indicating the aperture stop S.

TABLE 7 f = 6.67 − 13.00 − 18.95
FNO = 4.12 − 5.70 − 7.05
2ω = 50.14 − 26.76 − 18.72°
Y0 = 3.00

| Surface Number | Radius of Curvature | Surface Interval | Refractive Index | Abbe's Number |
|---|---|---|---|---|
| 1 | 218.5428 | 0.800 | 1.77621 | 49.61 |
| 2 | 6.3192 | (D2 = Variable) | | |
| 3 | 9.3877 | 1.100 | 1.83962 | 42.97 |
| 4 | −18.8141 | 0.100 | | |
| 5 | 3.8661 | 1.300 | 1.48914 | 70.45 |
| 6 | 23.8602 | 0.300 | | |
| 7 | ∞ | (D7 = Variable) | | |
| 8 | −11.6608 | 0.800 | 1.85504 | 23.83 |
| 9 | 3.0676 | 1.500 | | |
| 10 | 69.9035 | 1.300 | 1.52033 | 58.96 |
| 11 | −5.9270 | (D11 = Variable) | | |
| 12 | −75.2361 | 2.200 | 1.77621 | 49.61 |
| 13 | −8.4665 | (D13 = Variable) | | |
| 14 | ∞ | 3.050 | 1.51872 | 64.20 |
| 15 | ∞ | 1.000 | | |

[Variable Interval when Focal Length is Varied]

| f | 6.6723 | 12.9992 | 18.9499 |
|---|---|---|---|
| D2 | 9.5600 | 3.5244 | 1.3500 |
| D7 | 1.0000 | 1.5257 | 2.3298 |
| D11 | 3.4900 | 7.0904 | 8.6233 |
| D13 | 0.4847 | 2.4085 | 2.2340 |

| Focal Length f | 6.6723 | 12.9992 | 18.9499 |
|---|---|---|---|
| D0 | 610.5627 | 1198.2178 | 1751.5828 |
| Moving Amount | 0.0107 | 0.0132 | 0.0197 |

(Note that the moving amount from the object side to the image side is positive)

[Conditional Corresponding Values]

β2T=−0.7283
β2W=−0.3027
f3N=−2.7711
f3=−5.4094
f2=4.2535
f4=12.1161
β3T=8.6233
β3W=3.6228

(β2T/β2W)/(ft/fw)=0.847     (5)

f3N/f3=0.512     (6)

np1−np2=0.350     (7)

f2/f4=0.351     (8)

1/(β3T·β3W)=0.032     (9)

FIGS. 49A to 54H are graphs showing various aberrations for the e-line (λ=546.1 nm) in the eighth embodiment. FIGS. 49A to 49H are graphs showing various aberrations respectively upon focusing on an object at infinity position in the maximum wide-angle state. FIGS. 50A to 50H are graphs showing various aberrations respectively upon focusing on an object at infinity position in the middle focal length state. FIGS. 51A to 51H are graphs showing various aberrations respectively upon focusing on an object at infinity position in the maximum telephoto state.

FIGS. 52A to 52H are graphs showing various aberrations respectively in the maximum wide-angle state when the photographing magnification=−0.01×. FIGS. 53A to 53H are graphs showing various aberrations respectively in the middle focal length state when the photographing magnification=−0.01×. FIGS. 54A to 54H are graphs showing various aberrations respectively in the maximum telephoto state when the photographing magnification=−0.01×.

In each graph, FNO is the F-number, NA is the numerical aperture, Y is the image height, A is the half field angle for each image height, and H is the object height for each image height.

In each graph showing astigmatism, the solid curve represents the sagittal image plane, and the dotted curve represents the meridional image plane. In each graph showing spherical aberration, the dotted curve represents the sine condition.

As is apparent from these graphs, in this embodiment, various aberrations are satisfactorily corrected in each photographing distance state and each focal length state.

[Ninth Embodiment]

Figure 55:
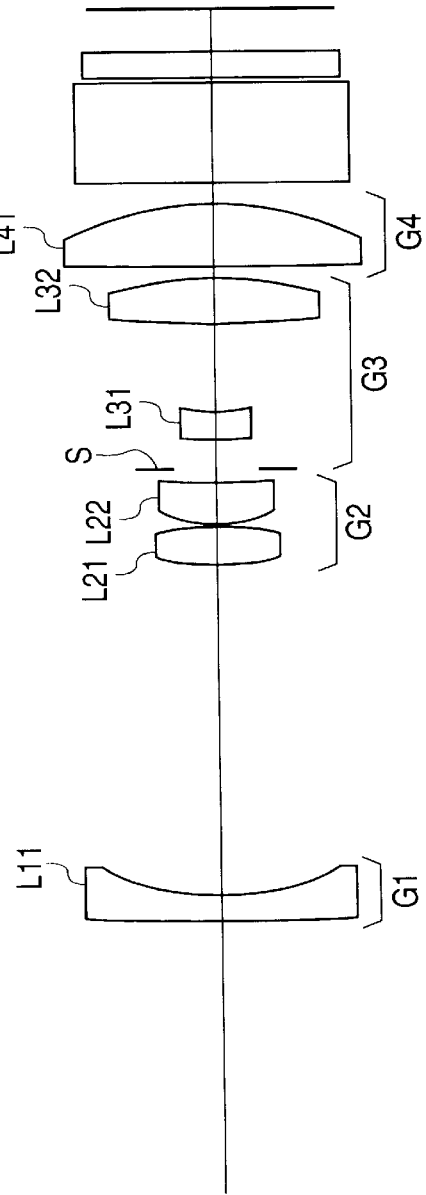
FIG. 55 is a view showing the arrangement of a variable focal length optical system according to the ninth embodiment of the present invention.

FIG. 55 is a view showing the arrangement of a variable focal length optical system according to the ninth embodiment of the present invention.

The variable focal length optical system in FIG. 55 is constituted in the order from the object side by a first lens unit G1 made up of a negative meniscus lens L11 with a convex surface facing the object side, a second lens unit G2 made up of a biconvex lens L21 and a positive meniscus lens L22 with a convex surface facing the object side, a third lens unit G3 made up of a biconcave lens L31 and a biconvex lens L32, and a fourth lens unit G4 made up of a biconvex lens L41.

A stop S is disposed between the second lens unit G2 and the third lens unit G3, and moves together with the third lens unit G3 when the focal length of the lens system is varied from the maximum wide-angle state to the maximum telephoto state.

FIG. 55 shows the positional relationship between the respective lens units in the maximum wide-angle state. When the focal length of the lens system is varied to the maximum telephoto state, the lens system moves on the optical axis along zoom orbits indicated by arrows in FIG. 33.

In the ninth embodiment, focusing is performed by moving the fourth lens unit G4 along the optical axis.

In the ninth embodiment, a low-pass filter and a protection glass are inserted between the fourth lens unit G4 and the image plane, and are fixed in position when the focal length of the lens system is varied.

Table 8 below summarizes the data values of the ninth embodiment of the present invention. In Table 8, f is the focal length, FNO is the F-number, 2ω is the field angle, Y0 is the maximum image height, and D0 is the distance between an object and a surface closest to the object side along the optical axis. The surface number represents the order of lens surfaces from the object side along a direction in which a light ray travels, and the refractive index and the Abbe's number respectively correspond to values for the e-line (λ=546.1 nm). In the lens data of Table 8, the surface with the radius of curvature=∞ (infinity) means a plane. The surface indicating the aperture stop S has the radius of curvature=∞ though no lens surface exists on the surface indicating the aperture stop S.

TABLE 8 f = 6.15 – 12.00 – 17.50
FNO = 4.12 – 5.59 – 6.12
2ω = 53.72 – 28.68 – 19.93°
Y0 = 3.00

| Surface Number | Radius of Curvature | Surface Interval | Refractive Index | Abbe's Number |
| --- | --- | --- | --- | --- |
| 1 | 98.1077 | 0.800 | 1.77621 | 49.61 |
| 2 | 7.4737 | (D2 = Variable) | | |
| 3 | 11.2405 | 1.100 | 1.83962 | 42.97 |
| 4 | −16.2504 | 0.100 | | |
| 5 | 3.8018 | 1.300 | 1.48914 | 70.45 |
| 6 | 11.4220 | (D6 = Variable) | | |
| 7 | ∞ | 1.000 | | |
| 8 | −40.5951 | 0.800 | 1.85504 | 23.83 |
| 9 | 3.1598 | 2.650 | | |
| 10 | 19.5338 | 1.300 | 1.59142 | 61.24 |
| 11 | −11.4717 | (D11 = Variable) | | |
| 12 | 79.5441 | 1.800 | 1.77621 | 49.61 |
| 13 | −8.4665 | 0.500 | | |
| 14 | ∞ | 3.050 | 1.46007 | 67.72 |
| 15 | ∞ | 0.350 | | |
| 16 | ∞ | 0.800 | 1.51872 | 64.20 |
| 17 | ∞ | 0.950 | | |

[Variable Interval when Focal Length is Varied]

| f | 6.1500 | 12.0000 | 17.5000 |
| --- | --- | --- | --- |
| D2 | 9.6920 | 3.9233 | 1.2717 |
| D6 | 1.0000 | 1.5257 | 2.3298 |
| D11 | 0.4080 | 5.8095 | 7.7859 |

[Focusing Moving Amount of Fourth Lens Unit G4 when Photographing Distance=0.8 m]

| Focal Length f | 6.1500 | 12.0000 | 17.5000 |
| --- | --- | --- | --- |
| D0 | 773.0999 | 773.0999 | 773.0999 |
| Moving Amount | 0.0790 | 0.2920 | 0.5939 |

(Note that the moving amount from the object side to the image side is positive)

[Conditional Corresponding Values]

β2T=−0.6399

β2W=−0.2971 f3N=−3.4000 f3=−7.2644 f2=4.6693 f4=12.1124

β3T=4.1788

β3W=3.1630

$$(\beta 2T/\beta 2W)/(ft/fw)=0.757 \tag{5}$$

$$f3N/f3=0.568 \tag{6}$$

$$np1-np2=0.350 \tag{7}$$

$$f2/f4=0.385 \tag{8}$$

$$1/(\beta 3T \cdot \beta 3W)=0.076 \tag{9}$$

FIGS. 56A to 61H are graphs showing various aberrations for the e-line (λ=546.1 nm) in the ninth embodiment. FIGS. 56A to 56H are graphs showing various aberrations respectively upon focusing on an object at infinity position in the maximum wide-angle state. FIGS. 57A to 57H are graphs showing various aberrations respectively upon focusing on an object at infinity position in the middle focal length state. FIGS. 58A to 58H are graphs showing various aberrations respectively upon focusing on an object at infinity position in the maximum telephoto state.

FIGS. 59A to 59H are graphs showing various aberrations respectively in the maximum wide-angle state when the photographing distance=0.8 m. FIGS. 60A to 60H are graphs showing various aberrations respectively in the middle focal length state when the photographing distance=0.8 m. FIGS. 61A to 61H are graphs showing various aberrations respectively in the maximum telephoto state when the photographing distance=0.8 m.

In each graph, FNO is the F-number, NA is the numerical aperture, Y is the image height, A is the half field angle for each image height, and H is the object height for each image height.

In each graph showing astigmatism, the solid curve represents the sagittal image plane, and the dotted curve represents the meridional image plane. In each graph showing spherical aberration, the dotted curve represents the sine condition.

As is apparent from these graphs, in this embodiment, various aberrations are satisfactorily corrected in each photographing distance state and each focal length state.

As described above, according to the embodiments of the present invention, a variable focal length optical system that can attain a size reduction and a high zoom ratio can be realized.

In each of the above embodiments, all or some of lens elements of one of the lens units that constitute the lens system may be decentered as a decentering lens unit to constitute an anti-vibration optical system that can reduce image vibrations. At this time, a vibration detection system for detecting vibrations of the lens system and a driving device for decentering the decentering lens unit to reduce the detected vibrations are combined with the above-mentioned lens system. With this arrangement, a photographing failure caused by image vibrations caused by, e.g., camera shake that tends to be generated in a zoom lens with a high zoom ratio can be avoided.

In the first embodiment, the negative lens L11 in the first lens unit G1 is preferably selected as a decentering lens unit. In the second embodiment, the positive lens L41 in the fourth lens unit G4 is preferably selected as a decentering lens unit. In the third embodiment, the negative lens L11 in the first lens unit G1 is preferably selected as a decentering lens unit. In the fourth embodiment, the positive lens L41 in the fourth lens unit G4 is preferably selected as a decentering lens unit. Also, in the fifth embodiment, the negative lens L11 in the first lens unit G1 is preferably selected as a decentering lens unit.

As the protection glass in each of the above embodiments, a quartz plate that serves as a low-pass filter may be disposed in place of the transparent glass plate.

In each of the above embodiments, the stop S disposed between the second lens unit G2 and the third lens unit G3 moves in the optical axis direction together with the second lens unit G2 or the third lens unit G3 upon varying the focal length of the lens system, but may move independently of the second lens unit G2 or the third lens unit G3.

Therefore, it is intended that the invention not be limited to the preferred embodiments described herein, but that the invention will include all embodiments falling within the scope of the appended claims.

What is claimed is:

1. A variable focal length optical system consisting of, in succession from an object side, a first lens unit having a negative refractive power, a second lens unit having a positive refractive power, a third lens unit having a negative refractive power, and a fourth lens unit having a positive refractive power, wherein when a focal length of the entire lens system is changed while maintaining a constant image plane position, said second lens unit moves in an optical axis direction, said third lens unit moves in the optical axis direction to compensate for variations in image plane position upon movement of said second lens unit, and said first and fourth lens units are fixed in position in the optical axis direction, an aperture stop is disposed at a position on an object side of a position closest to the image side of said third lens unit, said third lens unit is constituted by a negative sub unit disposed on the object side, and a positive sub unit disposed on the image side of said negative sub unit, said negative sub unit includes at least one negative lens, and said positive sub unit includes at least one positive lens, and said negative and positive sub units are disposed to be separated by a gap.

2. An optical system according to claim 1, wherein said third lens unit satisfies:

$$0.1 < n \cdot D/|f3| < 0.5 \qquad (1)$$

where D is the thickness, in the optical axis direction, of the gap formed between said negative and positive sub units, n is the refractive index of a medium that fills the gap between said negative and positive sub units, and f3 is the focal length of said third lens unit.

3. An optical system according to claim 2, wherein a positive lens is disposed at a position closest to the object side in said second lens unit, and said positive lens satisfies:

$$-0.6 < (r2a+r2b)/(r2a-r2b) < 0.4 \qquad (2)$$

where r2a is the radius of curvature of a lens surface on the object side of said positive lens, and r2b is the radius of curvature of a lens surface on the image side of said positive lens.

4. An optical system according to claim 3, wherein a negative lens is disposed at a position closest to the image side in said first lens unit, and said negative lens satisfies:

$$0.4 < (r1a-r1b)/(r1a+r1b) < 2.5 \qquad (3)$$

where r1a is the radius of curvature of a lens surface on the object side of said negative lens, and r1b is the radius of curvature of a lens surface on the image side of said negative lens.

5. An optical system according to claim 1, wherein said first lens unit moves in the optical system upon focusing.

6. An optical system according to claim 4, wherein said optical system satisfies:

$$0.4 < f4/(fw \cdot ft)^{1/2} < 1.3 \qquad (4)$$

where f4 is the focal length of said fourth lens unit, and fw and ft are the focal lengths of the entire lens system respectively in the maximum wide-angle state and the maximum telephoto state.

7. A variable focal length optical system comprising, in succession from an object side, a first lens unit having a negative refractive power, a second lens unit having a positive refractive power, a third lens unit having a negative refractive power, and a fourth lens unit having a positive refractive power, wherein when a focal length of the entire lens system is changed while maintaining a constant image plane position, said second lens unit moves in an optical axis direction, said third lens unit moves in the optical axis direction to compensate for variations in image plane position upon movement of said second lens unit, and said first and fourth lens units are fixed in position in the optical axis direction, and each of said first to fourth lens units is constituted by not more than two lens elements, wherein a negative lens is disposed at a position closest to the image side in said first lens unit, and said negative lens satisfies:

$$0.4<(r1a-r1b)/(r1a+r1b)<2.5 \qquad (3)$$

where r1a is the radius of curvature of a lens surface on the object side of said negative lens, and r1b is the radius of curvature of a lens surface on the image side of said negative lens.

8. An optical system according to claim 7, wherein said third lens unit is constituted by a negative sub unit disposed on the object side, and a positive sub unit disposed on the image side of said negative sub unit, said negative sub unit includes at least one negative lens, and said positive sub unit includes at least one positive lens, said negative and positive sub units are disposed to be separated by a gap, and said third lens unit satisfies:

$$0.1<n\cdot D/|f3|<0.5 \qquad (1)$$

where D is the thickness, in the optical axis direction, of the gap formed between said negative and positive sub units, n is the refractive index of a medium that fills the gap between said negative and positive sub units, and f3 is the focal length of said third lens unit.

9. An optical system according to claim 8, wherein a positive lens is disposed at a position closest to the object side in said second lens unit, and said positive lens satisfies:

$$-0.6<(r2a+r2b)/(r2a-r2b)<0.4 \qquad (2)$$

where r2a is the radius of curvature of a lens surface on the object side of said positive lens, and r2b is the radius of curvature of a lens surface on the image side of said positive lens.

10. An optical system according to claim 7, wherein said first lens unit moves in the optical system upon focusing.

11. An optical system according to claim 7, wherein said optical system satisfies:

$$0.4<f4/(fw\cdot ft)^{1/2}<1.3 \qquad (4)$$

where f4 is the focal length of said fourth lens unit, and fw and ft are the focal lengths of the entire lens system respectively in the maximum wide-angle state and the maximum telephoto state.

12. A variable focal length optical system comprising, in succession from an object side, a first lens unit having a negative refractive power, a second lens unit having a positive refractive power, a third lens unit having a negative refractive power, and a fourth lens unit having a positive refractive power, wherein when a focal length of the entire lens system is changed while maintaining a constant image plane position, said second lens unit moves in an optical axis direction, said third lens unit moves in the optical axis direction to compensate for variations in image plane position upon movement of said second lens unit, and said first unit consists of only one negative lens element, said second lens unit consists of two positive lens elements, said third lens unit consists of a negative lens element and a positive lens unit which is positioned on the object side of the negative lens element, and said fourth lens unit consists of only one positive lens element.

13. A variable focal length optical system according to claim 12, wherein a focal length of the entire lens system is changed while maintaining a constant image plane position, said first and fourth lens units are fixed in position in the optical axis direction.

14. A variable focal length optical system comprising, in succession from an object side, a first lens unit (G1) having a negative refractive power, a second lens unit (G2) having a positive refractive power, a third lens unit (G3) having a negative refractive power, and a fourth lens unit (G4) having a positive refractive power, wherein said first lens unit (G1) is fixed along an optical axis, and said second lens unit (G2) and said third lens unit (G3) move to the object side along the optical axis so as to decrease an air gap between said first lens unit (G1) and said second lens unit (G2), increase an air gap between said second lens unit (G2) and said third lens unit (G3), and increase an air gap between said third lens unit (G3) and said fourth lens unit (G4) when a focal length is changed from the shortest focal length state to the longest focal length state, and the entire lens system satisfies:

$$0.6<(\beta 2T/\beta 2W)/(ft/fw)<0.95 \qquad (5)$$

where β2W is the lateral magnification of said second lens unit (G2) in the shortest local length state, β2T is the lateral magnification of said second lens unit (G2) in the longest focal length state, fw is the focal length of the entire lens system in the shortest focal length state, and ft is the focal length of the entire lens system in the longest focal length state.

15. An optical system according to claim 14, wherein said third lens unit (G3) comprises a negative lens sub-unit (G3N) disposed on the object side and having a negative refractive power, and a positive lens sub-unit (G3P) disposed on an image side and having a positive refractive power, and said third lens unit (G3) satisfies:

$$0.3<f3N/f3<0.6 \qquad (6)$$

where f3N is the focal length of said negative lens sub-unit (G3N), and f3 is the focal length of said a third lens unit (G3).

16. An optical system according to claim 14, wherein said second lens unit (G2) comprises at least two positive lenses, and satisfies:

$$0<np1-np2 \qquad (7)$$

where np1 is the refractive index of, of said positive lenses of said second lens unit (G2), a positive lens (Lp1) disposed on the object side with respect to a reference line, and np2 is the refractive index of, of said positive lenses of said second lens unit (G2), a positive lens (Lp2) disposed on the image side with respect to the reference line.

17. An optical system according to claim 15, wherein said second lens unit (G2) comprises at least two positive lenses, and satisfies:

$$0<np1-np2 \qquad (7)$$

where np1 is the refractive index of, of said positive lenses of said second lens unit (G2), a positive lens (Lp1) disposed on the object side with respect to a reference line, and np2 is the refractive index of, of said positive lenses of said second lens unit (G2), a positive lens (Lp2) disposed on the image side with respect to the reference line.

18. An optical system according to claim 14, wherein the entire lens system satisfies:

$$0.2<f2/f4<0.5 \qquad (8)$$

where f2 is the focal length of said second lens unit (G2), and f4 is the focal length of said fourth lens unit (G4).

19. An optical system according to claim 15, wherein the entire lens system satisfies:

$$0.2<f2/f4<0.5 \qquad (8)$$

where f2 is the focal length of said second lens unit (G2), and f4 is the focal length of said fourth lens unit (G4).

20. An optical system according to claim 16, wherein the entire lens system satisfies:

$$0.2<f2/f4<0.5 \qquad (8)$$

where f2 is the focal length of said second lens unit (G2), and f4 is the focal length of said fourth lens unit (G4).

21. An optical system according to claim 14, wherein an object is focused on by moving said third lens unit (G3) or said fourth lens unit (G4) along the optical axis when a position of the object changes from infinity to a near distance, and said third lens unit (G3) satisfies:

$$1/(\beta 3T \cdot \beta 3W)<0.2 \qquad (9)$$

where $\beta 3W$ is the lateral magnification of said third lens unit (G3) in the shortest focal length state, and $\beta 3T$ is the lateral magnification of said third lens unit (G3) in the longest focal length state.

22. An optical system according to claim 15, wherein an object is focused on by moving said third lens unit (G3) or said fourth lens unit (G4) along the optical axis when a position of the object changes from infinity to a near distance, and said third lens unit (G3) satisfies:

$$1/(\beta 3T \cdot \beta 3W)<0.2 \qquad (9)$$

where $\beta 3W$ is the lateral magnification of said third lens unit (G3) in the shortest focal length state, and $\beta 3T$ is the lateral magnification of said third lens unit (G3) in the longest focal length state.

23. An optical system according to claim 16, wherein an object is focused on by moving said third lens unit (G3) or said fourth lens unit (G4) along the optical axis when a position of the object changes from infinity to a near distance, and said third lens unit (G3) satisfies:

$$1/(\beta 3T \cdot \beta 3W)<0.2 \qquad (9)$$

where $\beta 3W$ is the lateral magnification of said third lens unit (G3) in the shortest focal length state, and $\beta 3T$ is the lateral magnification of said third lens unit (G3) in the longest focal length state.

24. An optical system according to claim 18, wherein an object is focused on by moving said third lens unit (G3) or said fourth lens unit (G4) along the optical axis when a position of the object changes from infinity to a near distance, and said third lens unit (G3) satisfies:

$$1/(\beta 3T \cdot \beta 3W)<0.2 \qquad (9)$$

where $\beta 3W$ is the lateral magnification of said third lens unit (G3) in the shortest focal length state, and $\beta 3T$ is the lateral magnification of said third lens unit (G3) in the longest focal length state.

* * * * *